(12) United States Patent
Boven et al.

(10) Patent No.: US 11,797,550 B2
(45) Date of Patent: Oct. 24, 2023

(54) DATA SCIENCE PLATFORM

(71) Applicant: Uptake Technologies, Inc., Chicago, IL (US)

(72) Inventors: Brad Boven, Buffalo Grove, IL (US); James Lamb, Chicago, IL (US); Charles J. Woolard, Naperville, IL (US); Dan Collins, Chicago, IL (US); Michael Gorman, Chapin, SC (US)

(73) Assignee: UPTAKE TECHNOLOGIES, INC., Chicago, IL (US)

( * ) Notice: Subject to any disclaimer, the term of this patent is extended or adjusted under 35 U.S.C. 154(b) by 688 days.

(21) Appl. No.: 16/663,528

(22) Filed: Oct. 25, 2019

(65) Prior Publication Data

US 2021/0034581 A1    Feb. 4, 2021

Related U.S. Application Data

(60) Provisional application No. 62/798,993, filed on Jan. 30, 2019.

(51) Int. Cl.
*G06F 16/2458*    (2019.01)
*G06F 16/21*    (2019.01)
(Continued)

(52) U.S. Cl.
CPC ...... *G06F 16/2465* (2019.01); *G06F 9/30079* (2013.01); *G06F 16/212* (2019.01); *G06F 18/214* (2023.01); *G06N 3/08* (2013.01)

(58) Field of Classification Search
CPC . G06F 16/212; G06F 9/30079; G06K 9/6256; G06N 3/08
See application file for complete search history.

(56) References Cited

U.S. PATENT DOCUMENTS 5,566,092 A    10/1996 Wang et al.
5,633,800 A    5/1997 Bankert et al.
(Continued)

FOREIGN PATENT DOCUMENTS

KR    101670333 B1    10/2016
KR    20190060021 A    6/2019
(Continued)

OTHER PUBLICATIONS

International Searching Authority International Search Report and Written Opinion for PCT/US2020/057382, dated Feb. 19, 2021, 6 pages.

(Continued)

*Primary Examiner* — Ken Hoang
(74) *Attorney, Agent, or Firm* — MARSHALL, GERSTEIN & BORUN LLP

(57) ABSTRACT

Disclosed herein is a data science platform that is built with a specific focus on monitoring and analyzing the operation of industrial assets, such as trucking assets, rail assets, construction assets, mining assets, wind assets, thermal assets, oil-and-gas assets, and manufacturing assets, among other possibilities. The disclosed data science platform is configured to carry out operations including (i) ingesting asset-related data from various different data sources and storing it for downstream use, (ii) transforming the ingested asset-related data into a desired formatting structure and then storing it for downstream use, (iii) evaluating the asset-related data to derive insights about an asset's operation that may be of interest to a platform user, which may involve data science models that have been specifically designed to analyze asset-related data in order to gain a deeper understanding of an asset's operation, and (iv) presenting derived insights and other asset-related data to platform users.

20 Claims, 22 Drawing Sheets

(51) Int. Cl.
　　　*G06F 9/30*　　　(2018.01)
　　　*G06N 3/08*　　　(2023.01)
　　　*G06F 18/214*　　(2023.01)

(56) References Cited

U.S. PATENT DOCUMENTS

| | | |
|---|---|---|
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 9,529,863 B1* | 12/2016 | Gindin .................. G06Q 40/00 |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0262060 A1 | 9/2015 | Husain et al. |
| 2017/0006135 A1 | 1/2017 | Siebel et al. |
| 2017/0034016 A1 | 2/2017 | Carroll et al. |
| 2017/0185904 A1 | 6/2017 | Padmanabhan et al. |
| 2018/0089290 A1* | 3/2018 | Haggie .............. G06F 16/2255 |
| 2019/0042290 A1 | 2/2019 | Bailey et al. |
| 2019/0278486 A1* | 9/2019 | Naruko .............. G06F 12/0246 |
| 2021/0082577 A1* | 3/2021 | Sharifi .................. G16H 50/30 |

FOREIGN PATENT DOCUMENTS

| | | |
|---|---|---|
| WO | 2011117570 | 9/2011 |
| WO | 2013034420 | 3/2013 |
| WO | 2014145977 | 9/2014 |
| WO | 2014205497 | 12/2014 |

OTHER PUBLICATIONS

Biswas, Trisha. Redundancy-based Approaches in Wireless Multihop Network Design. PhD Dissertation Submitted to Graduate Faculty of North Carolina State University, Raleigh, North Carolina, Mar. 25, 2014, pp. 1-141 [online], [retrieved on May 26, 2015], Retrieved from the Internet <URL:https://repository.lib.ncsu.edu/bitstream/handle/1840.16/9313/etd.pdf?sequence=2&isAllowed=y>.

Isermann, Rolf. Model-based Fault Detection and Diagnosis—Status and Applications. Institute of Automatic Control, Darmstadt University of Technology, Darmstadt, Germany, Jun. 2004, pp.

(56) References Cited

OTHER PUBLICATIONS 1-12.[online], [retrieved on Oct. 8, 2015]. Retrieved from the Internet <URL: http://citeseerx.ist.psu.edu/viewdoc/download?doi=10.1.1.113.9295&rep=rep1&type=pdf>.

Narasimhan et al. Combining Model-Based and Feature-Driven Diagnosis Approaches—A Case Study on Electromechanical Actuators. 21st International Workshop on Principles of Diagnosis 2010, pp. 1-8. [online], [retrieved on Oct. 8, 2015] Retrieved from the Internet <URL:https://ti.arc.nasa.gov/publications/2266/download/>.

Prentzas et al. Categorizing Approaches Combining Rule-Based and Case-Based Reasoning. Expert Systems 24, Apr. 17, 2007, pp. 1-34 [online], [retrieved on Oct. 8, 2015]. Retrieved from the Internet <URL:http://citeseerx.ist.psu.edu/viewdoc/download?doi= 10.1.1.143.2780&rep=rep1&type=pdf>.

Infor M3 Enterprise Management System. Datasheet [online]. Infor, 2014 [retrieved May 19, 2015]. Retrieved from the Internet: <URL:www.infor.com.html>.

Infor Equipment. Datasheet [online]. Infor, 2012 [retrieved May 19, 2015]. Retrieved from the Internet:<URL:www.infor.com.html>.

Infor Introduces Next-Generation Solution for Equipment Dealers and Service Providers. Infor, Feb. 2014 pp. 1-5. [online], [retrieved May 19, 2015]. Retrieved from the Internet:<URL:www.infor.com/company/news/pressroom/pressreleases/M3equipment.html>.

Infor Equipment for Rental. Datasheet [online] Infor, 2013 [retrieved May 19, 2015]. Retrieved from the Internet:<URL:www.infor.com.html>.

Waltermire et al. Applying the Continuous Monitoring Technical Reference Model to the Asset, Configuration, and Vulnerability Management Domains (DRAFT). National Institute of Standards and Technology, U.S. Department of Commerce, Jan. 2012, pp. 1-23 [online], [retrieved Oct. 6, 2015]. Retrieved from the Internet: URL<https://csrc.nist.gov/CSRC/media/Publications/nistir/7800/draft/documents/Draft-NISTIR-7800.pdf.

\* cited by examiner

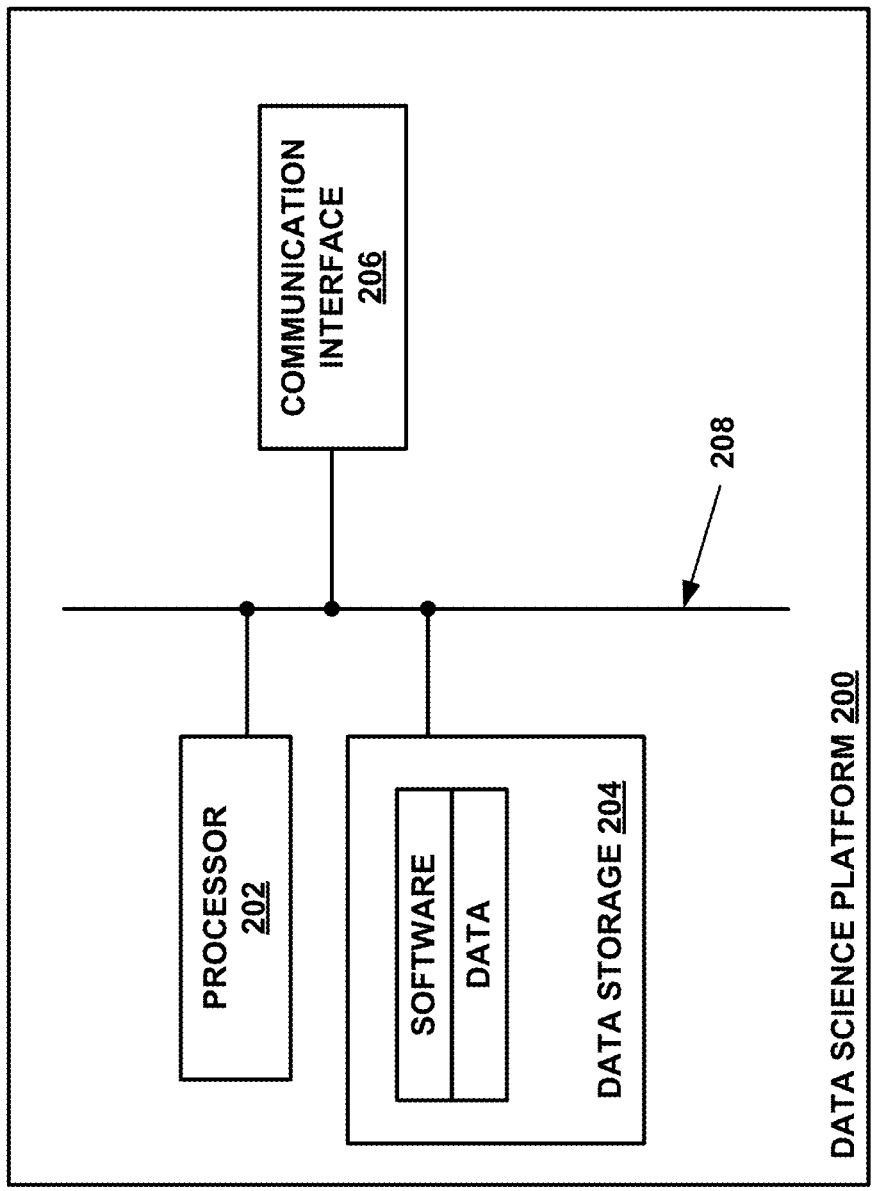

DATA SCIENCE PLATFORM

CROSS-REFERENCE TO RELATED APPLICATION

This application claims the benefit of priority under 35 U.S.C. § 119(e) to U.S. provisional application No. 62/798,993, filed on Jan. 30, 2019 and titled "Data Science Platform," the contents of which is incorporated by reference herein in its entirety.

BACKGROUND

Today, machines (also referred to herein as "assets") are ubiquitous in many industries. From locomotives that transfer cargo across countries to farming equipment that harvest crops, assets play an important role in everyday life. Depending on the role that an asset serves, its complexity, and cost, may vary.

Because of the increasing role that assets play, it is also becoming increasingly desirable to monitor and analyze the operation of assets in a given operating environment. To facilitate this, assets may be equipped with sensors that are configured to monitor various operating parameters of the asset and an on-asset computer that is configured to send data indicative of these operating parameters over a network to a central data analytics platform that is configured to analyze the data, in order to learn more about the operation of the assets.

Overview

In recent years, the primary area of focus for a data analytics platform has been extended to include preemptive prediction of event occurrences and identification of predictive features of asset operations data. The main reason that preemptive prediction of event occurrences has become an area of focus is because unexpected occurrences of certain types of events may result in significant consequences. For instance, if a failure occurs on an asset while it is in use, this may increase the time and/or cost necessary to get the asset back to an operational state, decrease productivity during the downtime, and potentially present a safety risk to individuals in proximity to the asset at the time that it fails. It is thus advantageous to have a single platform not just with the ability to engage in data science operations, but with the ability to engage in data science operations in industrial domains where predictive features are relatively unknown.

To this end, disclosed herein is a data science platform that is built with a specific focus on monitoring and analyzing the operation of industrial assets, such as trucking assets, rail assets, construction assets, mining assets, wind assets, thermal assets, oil and gas assets, and manufacturing assets, among other possibilities. At a high level, the disclosed data science platform is configured to carry out operations that include (i) ingesting asset-related data from any of various different data sources and storing it for downstream use, (ii) transforming the ingested asset-related data into a desired formatting structure (which may be referred to as a "schema") and then storing it for downstream use, (iii) evaluating the asset-related data to derive insights about an asset's operation that may be of interest to a platform user (e.g., a prediction that a given type of event is likely to occur at an asset in the foreseeable future, a determination that an asset is behaving abnormally, etc.), which may involve data science models that have been specifically designed to analyze asset-related data in order to gain a deeper understanding of an asset's operation, and (iv) presenting derived insights and other asset-related data to platform users in a useful manner. These operations may take various forms and are described in further detail below.

Accordingly, in one aspect, disclosed herein is a method that involves (a) receiving a first user input specifying connection information that facilitates connection to a data source, (b) establishing, based on the connection information, a connection to the data source and ingesting from the data source asset-related data, (c) storing the ingested asset-related data in a first data store location, (d) receiving a second user input specifying pipeline configuration data that indicates one or more transformations to apply to portions of the ingested asset-related data, (e) deploying, based on the pipeline configuration data, at least one pipeline that operates to (i) retrieve from the first data store location a portion of the asset-related data, (ii) apply to the portion of the asset-related data the one or more transformations, thereby resulting in transformed asset-related data, and (iii) store the transformed asset-related data in a second data store location, (f) receiving a third user input specifying a set of data science model configuration parameters, the parameters including (i) an indication of a type of data science model to be created, (ii) an indication of a set of asset-related data to use as training data for the data science model to be created, and (iii) an indication of a portion of the transformed asset-related data stored in the second data store to use as inputs for the data science model to be created, (g) based on the data science model configuration parameters, applying a set of machine learning techniques to create a new data science model, (h) receiving a fourth user input specifying application configuration parameters that define one or more ways to visually render asset-related data, (i) executing the created data science model by using the indicated portion of the transformed asset-related data stored in the second data store as inputs to the data science model, and (j) causing at least of portion of an output of the data science model to be rendered according to the application configuration parameters.

In another aspect, disclosed herein is a computing system that includes a network interface, at least one processor, a non-transitory computer-readable medium, and program instructions stored on the non-transitory computer-readable medium that are executable by at least one processor to cause the computing system to carry out the functions disclosed herein, including but not limited to the functions of the foregoing method.

In yet another aspect, disclosed herein is a non-transitory computer-readable storage medium provisioned with software that is executable to cause a computing system to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 2A depicts a simplified block diagram of an example asset data platform from a structural perspective.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, modules, and methods may be rearranged, combined, added to, and/or removed in a variety of manners, each of which is contemplated herein.

I. EXAMPLE NETWORK CONFIGURATION

Figure 1:
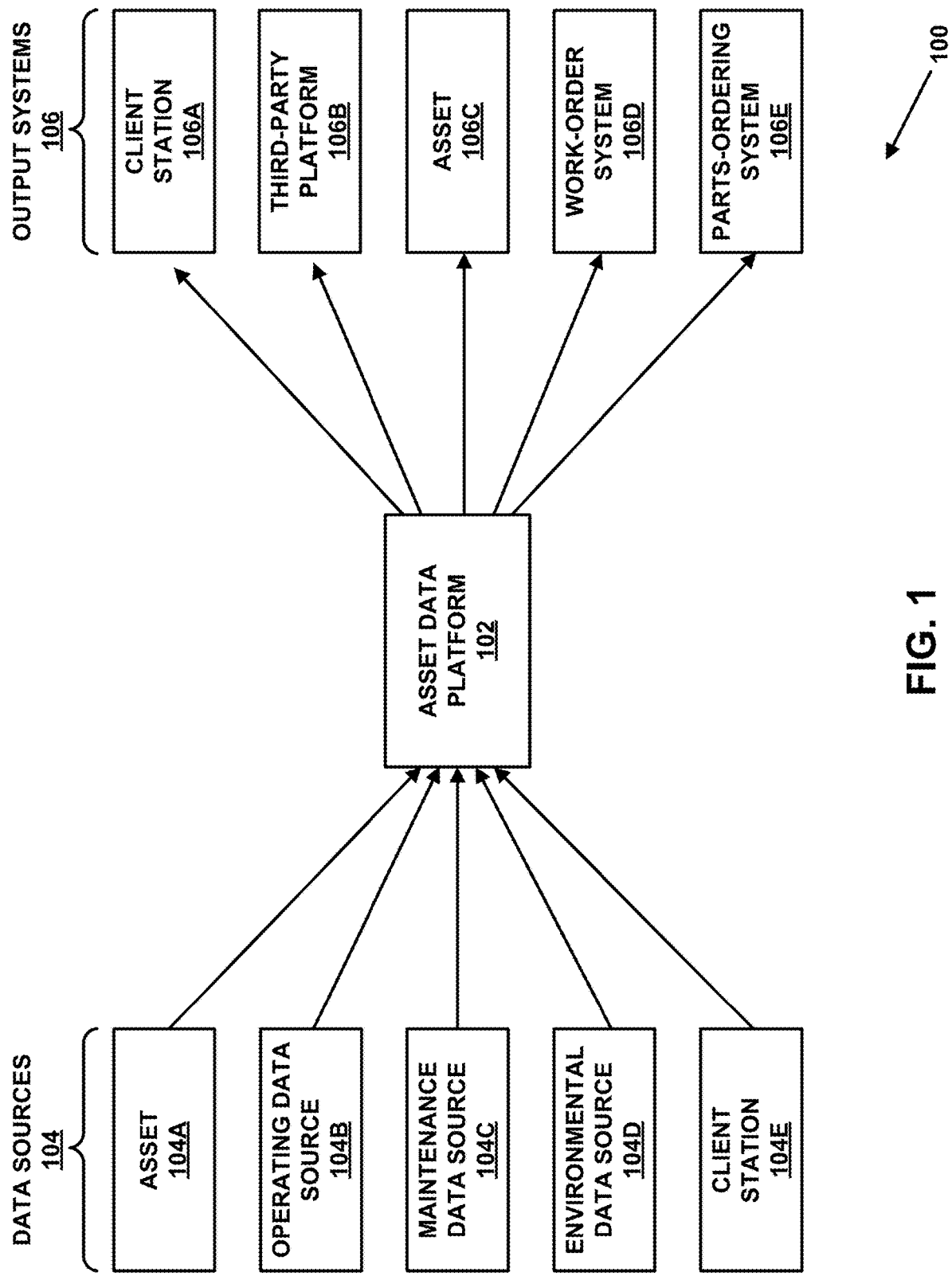
FIG. 1 depicts an example network configuration in which example embodiments may be implemented.

Turning now to the figures, FIG. 1 depicts an example network configuration 100 in which example embodiments may be implemented. As shown, network configuration 100 includes at its core a central computing system 102, which may be communicatively coupled to one or more data sources 104 and one or more output systems 106 via respective communication paths. In such an arrangement, central computing system 102 may generally serve as an "asset data platform" that is configured to perform functions to facilitate the monitoring, analysis, and/or management of various types of "assets," which may take various forms.

For instance, some representative types of assets that may be monitored by asset data platform 102 may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers, solar panels), petroleum production equipment (e.g., gas compressors, distillation columns, pipelines), and data network nodes (e.g., personal computers, routers, bridges, gateways, switches, etc.), among other examples. Additionally, an asset may have various other characteristics that more specifically define the type of asset, examples of which may include the asset's brand, make, model, vintage, and/or software version, among other possibilities. In this respect, depending on the implementation, the assets monitored by asset data platform 102 may either be of the same type or various different types. Additionally yet, the assets monitored by asset data platform 102 may be arranged into one or more "fleets" of assets, which refers to any group or two or more assets that are related to one another in some manner (regardless of whether such assets are of the same type).

Broadly speaking, asset data platform 102 may comprise one or more computing systems that have been provisioned with software for carrying out one or more of the platform functions disclosed herein, including but not limited to receiving data related to the operation and/or management of assets (broadly referred to herein as "asset-related data") from data sources 104, performing data ingestion and/or data analytics operations on the asset-related data received from asset data sources 104, and then outputting data and/or instructions related to the operation and/or management of assets to output systems 106. The one or more computing systems of asset data platform 102 may take various forms and be arranged in various manners.

For instance, as one possibility, asset data platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates asset data platform 102 may either supply its own cloud infrastructure or may obtain the cloud infrastructure from a third-party provider of "on demand" computing resources, such include Amazon Web Services (AWS), Microsoft Azure, Google Cloud, Alibaba Cloud, or the like. As another possibility, asset data platform 102 may comprise one or more dedicated servers that have been provisioned with software for carrying out one or more of the platform functions disclosed herein. Other implementations of asset data platform 102 are possible as well.

Further, in practice, the software for carrying out the disclosed platform functions may take various forms. As one possibility, the platform software may comprise executable program instructions that cause asset data platform 102 to perform data ingestion operations on asset-related data received from data sources 104, including but not limited to extraction, transformation, and loading operations, among other examples. As another possibility, the platform software may comprise executable program instructions that cause asset data platform 102 to perform data analytics operations based on the asset-related data received from data sources 104, including but not limited to failure prediction, anomaly detection, fuel management, noise filtering, image analysis, predictive recommendations, and data integrity operations, among other examples. As yet another possibility, the platform software may comprise executable program instructions that cause asset data platform 102 to output data and/or instructions related to the operation and/or management of assets for receipt by one or more output systems 106.

As one specific example, the platform software may comprise executable program instructions for outputting data related to the operation and/or management of assets that is to be presented to a user (e.g., asset-related data received from data sources 104 and/or the results of the data analytics operations performed by asset data platform 102), and these program instructions may take the form of discrete "applications" that are each tailored for particular end users, particular groups of assets, and/or particular purposes. Some representative examples of such applications may include (i) an asset performance management application, (ii) a service optimization application, or (iii) an asset dealer operations application, among other possible applications.

The software for carrying out the disclosed platform functions may take various other forms as well.

As described above, asset data platform 102 may be configured to receive asset-related data from one or more data sources 104. These data sources—and the asset-related data output by such data sources—may take various forms. To illustrate, FIG. 1 shows some representative examples of data sources 104 that may provide asset-related data to asset data platform 102, which are discussed in further detail below. However, it should be understood that these example data sources are merely provided for purposes of illustration, and that asset data platform 102 may be configured to receive asset-related data from other types of data sources as well.

For instance, one type of data source 104 may take the form of an asset 104A, which may be equipped with components that are configured to capture data that is indicative of the operation of the asset—referred to herein as "operating data"—and then transmit the asset's operating data to asset data platform 102 over the respective communication path between asset 104A and asset data platform 102. In this respect, asset 104A may take any of the various forms described above, including but not limited to a transport vehicle, heavy equipment, manufacturing equipment, electric power generation equipment, and/or petroleum production equipment, among other types of assets. Further, it should be understood that the components of asset 104A for capturing and transmitting the asset's operating data either may be included as part of asset 104A as manufactured or may be affixed to asset 104A at some later date, among other possibilities.

The operating data that is captured and sent by asset 104A may take various forms. As one possibility, an asset's operating data may include sensor data that comprises time-series measurements for certain operating parameters of the asset, examples of which may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others. As another possibility, an asset's operating data may include abnormal-conditions data that indicates occurrences of discrete abnormal conditions at the asset, examples of which include fault codes that indicate the occurrence of certain faults at the asset (e.g., when an operating parameter exceeds a threshold), asset shutdown indicators, and/or other types of abnormal-condition indicators. As yet another possibility, an asset's operating data may include data that has been derived from the asset's sensor data and/or abnormal-conditions data, examples of which may include "roll-up" data (e.g., an average, mean, median, etc. of the raw measurements for an operating parameter over a given time window) and "features" data (e.g., data values that are derived based on the raw measurements of two or more of the asset's operating parameters). An asset's operating data may take various other forms as well.

In practice, an asset's operating data may also include or be associated with data that identifies the origin of the operating data. This origin data may take various forms. For example, such origin data may include identifying information for the originating asset (e.g., an asset ID and/or data indicating the asset's type, brand, make, model, age, software version, etc.) and/or identifying information for the component of asset 104A that captured the operating data (e.g., a sensor ID), among other possibilities. As another example, such origin data may include data indicating the time at which the operating data was captured (e.g., a timestamp) and/or the asset's location when the operating data was captured (e.g., GPS coordinates), to the extent that such location is not otherwise included in the operating data. Asset data platform 102 may receive other types of data from asset 104A as well.

Further, asset data platform 102 may be configured to receive operating data from asset 104A in various manners. As one possibility, asset 104A may be configured to send its operating data to asset data platform 102 in a batch fashion, in which case asset data platform 102 may receive periodic transmissions of operating data from asset 104A (e.g., on an hourly, daily, or weekly basis). As another possibility, asset data platform 102 may receive operating data from asset 104A in a streaming fashion as such operating data is captured by asset 104A. As yet another possibility, asset data platform 102 may receive operating data from asset 104A in response to sending a request for such data to asset 104A, in which case asset data platform 102 may be configured to periodically send requests for operating data to asset 104A.

Asset data platform 102 may be configured to receive operating data from asset 104A in other manners as well.

Another type of data source 104 may take the form of operating data source 104B, which may comprise a computing system that is configured to receive operating data from one or more upstream sources of operating data (e.g., assets) and then provide this operating data to asset data platform 102 over the respective communication path between operating data source 104B and asset data platform 102. Such an operating data source may take various forms. As one possibility, operating data source 104B may comprise an existing data platform of a third-party organization that receives and/or maintains operating data for one or more assets, such as a data platform operated by an asset owner, an asset dealer, an asset manufacturer, an asset repair shop, or the like. As another possibility, operating data source 104B may comprise an intermediary system that compiles operating data from a plurality of upstream sources of operating data and then provides that compiled operating data to asset data platform 102. For example, such an intermediary system may take the form of a computing system located in proximity to a fleet of assets (e.g., at a job site or wind farm) that is configured to compile operating data for the fleet of assets or a computing system that is configured to compile operating data maintained by several third-party data platforms, among other possibilities. Operating data source 104B may take other forms as well.

The operating data that is maintained and sent by operating data source 104B may take various forms, including but not limited to any of the forms described above. In addition to the operating data received from the one or more upstream sources, the operating data provided by operating data source 104B may also include additional operating data that is generated by operating data source 104B itself, such as operating data that operating data sources 104B derives based on the operating data received from the one or more upstream sources (e.g., abnormal-conditions data, roll-up data, features data, etc.).

Further, as with asset 104A, asset data platform 102 may be configured to receive operating data from operating data source 104B in various manners. As one possibility, operating data source 104B may be configured to send its operating data to asset data platform 102 in a batch fashion, in which case asset data platform 102 may receive periodic transmissions of operating data from operating data source 104B (e.g., on an hourly, daily, or weekly basis). As another possibility, asset data platform 102 may receive operating data from operating data source 104B in a streaming fashion as such operating data is received and/or otherwise generated by operating data source 104B. As yet another possibility, asset data platform 102 may receive operating data from operating data source 104B in response to sending a request for such data to operating data source 104B, in which case asset data platform 102 may be configured to periodically send requests for operating data to operating data source 104B. As still another possibility, asset data platform 102 may receive operating data from operating data source 104B by accessing an Application Programming Interface (API) that has been made available by operating data source 104B, subscribing to a service provided by operating data source 104B, or the like. Asset data platform 102 may be configured to receive operating data from operating data source 104B in other manners as well.

Yet another type of data source 104 may take the form of an asset maintenance data source 104C, which may comprise a computing system that is configured to generate and/or receive data related to the maintenance of a plurality of assets—referred to herein as "maintenance data"—and then send this maintenance data to asset data platform 102 over the respective communication path between asset maintenance data source 104C and asset data platform 102. In this respect, asset maintenance data source 104C may take various forms. As one possibility, asset maintenance data source 104C may comprise an existing data platform of a third-party organization that is interested in monitoring the maintenance of assets, such as an asset owner, asset dealer, asset manufacturer, asset repair shop, or the like. As another possibility, asset maintenance data source 104C may comprise an intermediary system that compiles asset maintenance data from multiple upstream sources (e.g., multiple repair shops) and then provides that compiled maintenance data to asset data platform 102. Asset maintenance data source 104C may take other forms as well.

The asset maintenance data that is maintained and sent by asset maintenance data source 104C may take various forms. As one example, the asset maintenance data may include details regarding inspections, maintenance, servicing, and/or repairs that have been performed or are scheduled to be performed on assets (e.g., work order data). As another example, the asset maintenance data may include details regarding known occurrences of failures at assets (e.g., date of failure occurrence, type of failure occurrence, etc.). Other examples are possible as well. As with the operating data, the asset maintenance data may also include or be associated with data indicating the origins of the asset maintenance data (e.g., source identifier, timestamp, etc.).

Further, asset data platform 102 may be configured to receive operating data from asset maintenance data source 104C in various manners, including but not limited to any of the manners discussed above with respect to operating data source 104B.

Still another type of data source 104 may take the form of environmental data source 104D, which may comprise a computing system that is configured to generate and/or receive data about an environment in which assets operate—referred to herein as "environmental data"—and then send this data to asset data platform 102 over the respective communication path between environmental data source 104D and asset data platform 102. In this respect, environmental data source 104D—and the environmental data provided thereby—may take various forms.

As one possibility, environmental data source 104D may take the form of a weather data source that provides information regarding the weather at locations where assets operate (e.g., ambient temperature, air pressure, humidity, wind direction, wind speed, etc.). As another possibility, environmental data source 104D may take the form of a geospatial data source that provides information regarding the geography and/or topology at locations where assets operate. As yet another possibility, environmental data source 104D may take the form of a satellite image data source that provides satellite imagery for locations where assets operate. As still another possibility, environmental data source 104D may take the form of a traffic data source that provides information regarding ground, air, and/or water traffic at locations where assets operate. Environmental data source 104D may take other forms as well.

Further, in practice, asset data platform 102 may be configured to receive operating data from asset environmental data source 104D in various manners, including but not limited to any of the manners discussed above with respect to operating data source 104B.

Another type of data source 104 may take the form of client station 104E, which may comprise any computing device that is configured to receive user input related to the operation and/or management of assets (e.g., information entered by a fleet operator, a repair technician, or the like) and then send that user input to asset data platform 102 over the respective communication path between client station 104E and asset data platform 102. In this respect, client station 104E may take any of various forms, examples of which may include a desktop computer, a laptop, a netbook, a tablet, a smartphone, and/or a personal digital assistant (PDA), among other possibilities.

The user input that is entered into client station 104E and sent to asset data platform 102 may comprise various different kinds of information, including but not limited to the kinds of information discussed above with respect to the other data sources. For instance, as one possibility, the user input may include certain kinds of operating data, maintenance data, and/or environmental data that may be input into asset data platform 102 by a user rather than being received from one of the aforementioned data sources. As another possibility, the user input may include certain user-defined settings or logic that is to be used by asset data platform 102 when performing data ingestion and/or data analytics operations. The user input that is entered into client station 104E and sent to asset data platform 102 may take various other forms as well.

The aforementioned data sources 104 are merely provided for purposes of illustration, and it should be understood that the asset data platform's data sources may take various other forms as well. For instance, some or all of the forgoing types of data described above with respect to the various data sources 104A-E may ultimately be provided to the asset data platform in the form of physical media. In this example, a user may provide to an operator of asset data platform 102 one or more non-volatile storage mediums, such as read-only memory, a hard-disk drive, a solid-state drive, flash memory, an optical-storage device, etc., whereupon an operator of asset data platform 102 may load this data into the asset-data platform 102. Additionally, while FIG. 1 shows several different types of data sources 104, it should be understood that asset data platform 102 need not be configured to receive asset-related data from all of these different types of data sources, and in fact, asset data platform 102 could be configured to receive asset-related data from as little as a single data source 104. Further, while data sources 104A-E have been shown and described separately, it should be understood that these data sources may be combined together as part of the same physical computing system (e.g., an organization's existing data platform may serve as both operating data source 104B and maintenance data source 104C). Further yet, it should be understood that asset data platform 102 may be configured to receive other types of data related to the operation and/or management of assets as well, examples of which may include asset management data (e.g., route schedules and/or operational plans), enterprise data (e.g., point-of-sale (POS) data, customer relationship management (CRM) data, enterprise resource planning (ERP) data, etc.), and/or financial markets data, among other possibilities.

As shown in FIG. 1, asset data platform 102 may also be configured to output asset-related data and/or instructions for receipt by one or more output systems 106. These output systems—and the data and/or instructions provided to such output systems—may take various forms. To illustrate, FIG. 1 shows some representative examples of output systems 106 that may receive asset-related data and/or instructions from asset data platform 102, which are discussed in further detail below. However, it should be understood that these example output systems are merely provided for purposes of illustration, and that asset data platform 102 may be configured to output asset-related data and/or instructions to other types of output systems as well.

For instance, one type of output system 106 may take the form of client station 106A, which may comprise any computing device that is configured to receive asset-related data from asset data platform 102 over the respective communication path between client station 106A and asset data platform 102 and then present such data to a user (e.g., via an application that is defined by asset data platform 102). In this respect, client station 106A may take any of various forms, examples of which may include a desktop computer, a laptop, a netbook, a tablet, a smartphone, and/or a PDA, among other possibilities. Further, it should be understood that client station 106A could either be a different device than client station 104E or could be the same device as client station 104E.

The asset-related data that is output for receipt by client station 106A may take various forms. As one example, this asset-related data may include a restructured version of asset-related data that was received by asset data platform 102 from one or more data sources 104 (e.g., operating data, maintenance data, etc.). As another example, this asset-related data may include data that is generated by asset data platform 102 based on the asset-related data received from data sources 104, such as data resulting from the data analytics operations performed by asset data platform 102 (e.g., predicted failures, recommendations, alerts, etc.). As yet another example, data that is output for receipt by client station 106A may include platform configuration data, examples of which may include data that describes how the asset-data platform is configured, data that describes the various data sources 104, and data that describes the various output systems 106. Other examples are possible as well.

Along with the asset-related data that is output for receipt by client station 106A, asset data platform 102 may also output associated data and/or instructions that define the visual appearance of an application (e.g., a graphical user interface (GUI)) through which the asset-related data is to be presented on client station 106A. Such data and/or instructions for defining the visual appearance of an application may take various forms, examples of which may include Hypertext Markup Language (HTML), Cascading Style Sheets (CSS), and/or JavaScript, among other possibilities. However, depending on the circumstance, it is also possible that asset data platform 102 may output asset-related data to client station 106A without any associated data and/or instructions for defining the visual appearance of an application.

Further, client station 106A may receive asset-related data from asset data platform 102 in various manners. As one possibility, client station 106A may send a request to asset data platform 102 for certain asset-related data and/or a certain application, and client station 106A may then receive asset-related data in response to such a request. As another possibility, asset data platform 102 may be configured to "push" certain types of asset-related data to client station 106A, such as scheduled or event-based alerts, in which case client station 106A may receive asset-related data from asset data platform 102 in this manner. As yet another possibility, asset data platform 102 may be configured to make certain types of asset-related data available via an API, a service, or the like, in which case client station 106A may receive asset-related data from asset data platform 102 by accessing such an API or subscribing to such a service. Client station 106A may receive asset-related data from asset data platform 102 in other manners as well.

Another type of output system 106 may take the form of a data platform 106B operated by a third-party organization that may be interested in the operation and/or management of assets, such as an asset owner, an asset dealer, an asset manufacturer, an asset repair shop, or the like. For instance, a third-party organization such as this may have its own data platform 106B that already enables users to access and/or interact with asset-related data through applications that have been created by the third-party organization, but data platform 106B may not be programmed with the capability to ingest certain types of asset-related data or perform certain types of data analytics operations (and/or data platform 106B may have the capability to perform such operations but it may nevertheless be undesirable for data platform 106B to do so). In such a scenario, asset data platform 102 may be configured to output certain asset-related data for receipt by data platform 106B.

The asset-related data that is output for receipt by data platform 106B may take various forms, including but not limited any of the forms described above in connection with the output to client station 106A. However, unlike for client station 104A, the asset-related data that is output for receipt by data platform 106B typically need not include any associated data and/or instructions for defining the visual appearance of an application, because data platform 106B may be performing operations on the asset-related data from asset data platform 102 beyond presenting it to a user via an application.

Further, data platform 106B may receive asset-related data from asset data platform 102 in various manners, including but not limited to any of the manners discussed above with respect to client station 106A (e.g., by sending a request to asset data platform 102, having data "pushed" by asset data platform, or accessing an API or service provided by asset data platform 102).

Yet another type of output system 106 may take the form of asset 106C, which may be equipped with components that are configured to receive asset-related data and/or instructions from asset data platform 102 and then act in accordance with the received data and/or instructions. In this respect, asset 106C may take any of the various forms described above, including but not limited to a transport vehicle, heavy equipment, manufacturing equipment, electric power generation equipment, and/or petroleum production equipment, among other types of assets. Further, it should be understood that asset 106C could either be a different asset than asset 104A or could be the same asset as asset 104A.

The asset-related data and/or instructions that are output for receipt by asset 106C may take various forms. As one example, asset data platform 102 may be configured to send asset 106C certain data that has been generated by asset data platform 102 based on the asset-related data received from data sources 104, such as data resulting from a data analytics operation performed by asset data platform 102 (e.g., predicted failures, recommendations, alerts, etc.), in which case asset 106C may receive this data and then potentially adjust its operation in some way based on the received data. As another example, asset data platform 102 may be configured to generate and send an instruction for asset 106C to adjust its operation in some way (e.g., based on the asset-related data received from data sources 104), in which case asset 106C may receive this instruction and then potentially adjust its operation in accordance with the instruction. As yet another example, asset data platform 102 may be configured to generate and send an instruction for asset 106C to perform a data analytics operation locally at asset 106C, in which case asset 106C may receive the instruction and then locally perform the data analytics operation. In some cases, in conjunction with sending asset 106C an instruction to perform a data analytics operation, asset data platform 102 may also provide asset 106C with executable program instructions and/or program data that enable asset 106C to perform the data analytics operation (e.g., a predictive model). However, in other cases, asset 106C may already be provisioned with executable program instructions for performing the data analytics operation. Other examples are possible as well.

Further, in practice, asset 106C may receive asset-related data and/or instructions from asset data platform 102 in various manners, including but not limited to any of the manners discussed above with respect to client station 106A.

Still another type of output system 106 may take the form of work-order system 106D, which may comprise a computing system that is configured to receive asset-related data and/or instructions from asset data platform 102 over the respective communication path between work-order system 106D and asset data platform 102 and then generate a work order in accordance with the received data and/or instructions.

A further type of output system 106 may take the form of parts-ordering system 106E, which may comprise a computing system that is configured to receive asset-related data and/or instructions from asset data platform 102 over the respective communication path between parts-ordering system 106E and asset data platform 102 and then generate a parts order in accordance with the received data and/or instructions.

The aforementioned output systems 106 are merely provided for purposes of illustration, and it should be understood that output systems in communication with asset data platform 102 may take various other forms as well. For instance, while FIG. 1 shows several different types of output systems 106, it should be understood that asset data platform 102 need not be configured to output asset-related data and/or instructions for receipt by all of these different types of output systems, and in fact, asset data platform 102 could be configured to asset-related data and/or instructions for receipt by as little as a single output system 106. Further, while output systems 106A-E have been shown and described separately, it should be understood that these output systems may be combined together as part of the same physical computing system. Further yet, it should be understood that asset data platform 102 may be configured to output asset-related data and/or instructions for receipt by other types of output systems as well.

As discussed above, asset data platform 102 may communicate with the one or more data sources 104 and one or more output systems 106 over respective communication paths. Each of these communication paths may generally comprise one or more communication networks and/or communications links, which may take any of various forms. For instance, each respective communication path with asset data platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with asset data platform 102 may be wireless, wired, or some combination thereof, and may carry data according to any of various different communication protocols. Moreover, in some embodiments, the respective communication paths with asset data platform 102 may represent transfers of data to or from one or more non-volatile storage mediums, such as read-only memory, a hard-disk drive, a solid-state drive, flash memory, an optical-storage device, etc.

Although not shown, the respective communication paths with asset data platform 102 may also include one or more intermediate systems. For example, it is possible that a given data source 104 may send asset-related data to one or more intermediary systems, such as an aggregation system, and asset data platform 102 may then be configured to receive the asset-related data from the one or more intermediary systems. As another example, it is possible that asset data platform 102 may communicate with a given output system 106 via one or more intermediary systems, such as a host server (not shown). Many other configurations are also possible.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. STRUCTURAL ARCHITECTURE OF DATA SCIENCE PLATFORM

Turning now to FIG. 2A, this figure is a simplified block diagram illustrating some structural components that may be included in an example data science platform 200, which could serve as asset data platform 102 in FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 2A, data storage 204 may be provisioned with software components that enable the platform 200 to carry out the functions disclosed herein. These software components may generally take the form of program instructions that are executable by the processor 202 to carry out the disclosed functions, which may be arranged together into software applications, microservices, virtual machines, software development kits, toolsets, or the like.

Further, data storage 204 may be arranged to store asset-related data in one or more databases, file systems, or the like. For example, data storage 204 may be configured to store data using technologies such as Apache Cassandra, Apache Hadoop, Apache Kafka, PostgreSQL, MongoDB, and/or Cloud Native Object Storage technologies (e.g., S3 or Azure Blob), among other possibilities. Data storage 204 may take other forms and/or store data in other manners as well.

Communication interface 206 may be configured to facilitate wireless and/or wired communication with data sources and output systems, such as data sources 104 and output systems 106 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

III. EXAMPLE ASSET

As discussed above with reference to FIG. 1 and as will be discussed below in more detail with respect to FIG. 3, asset data platform 102 may be configured to perform functions to facilitate the monitoring, analysis, and/or management of various types of assets, examples of which may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples.

Broadly speaking, an asset may comprise a combination of one or more electrical, mechanical, electromechanical, and/or electronic components that are designed to perform one or more tasks. Depending on the type of asset, such components may take various forms. For instance, a transport vehicle may include an engine, a transmission, a drivetrain, a fuel system, a battery system, an exhaust system, a braking system, a generator, a gear box, a rotor, and/or hydraulic systems, which work together to carry out the tasks of a transport vehicle. However, other types of assets may include other various other types of components.

Figure 2B:
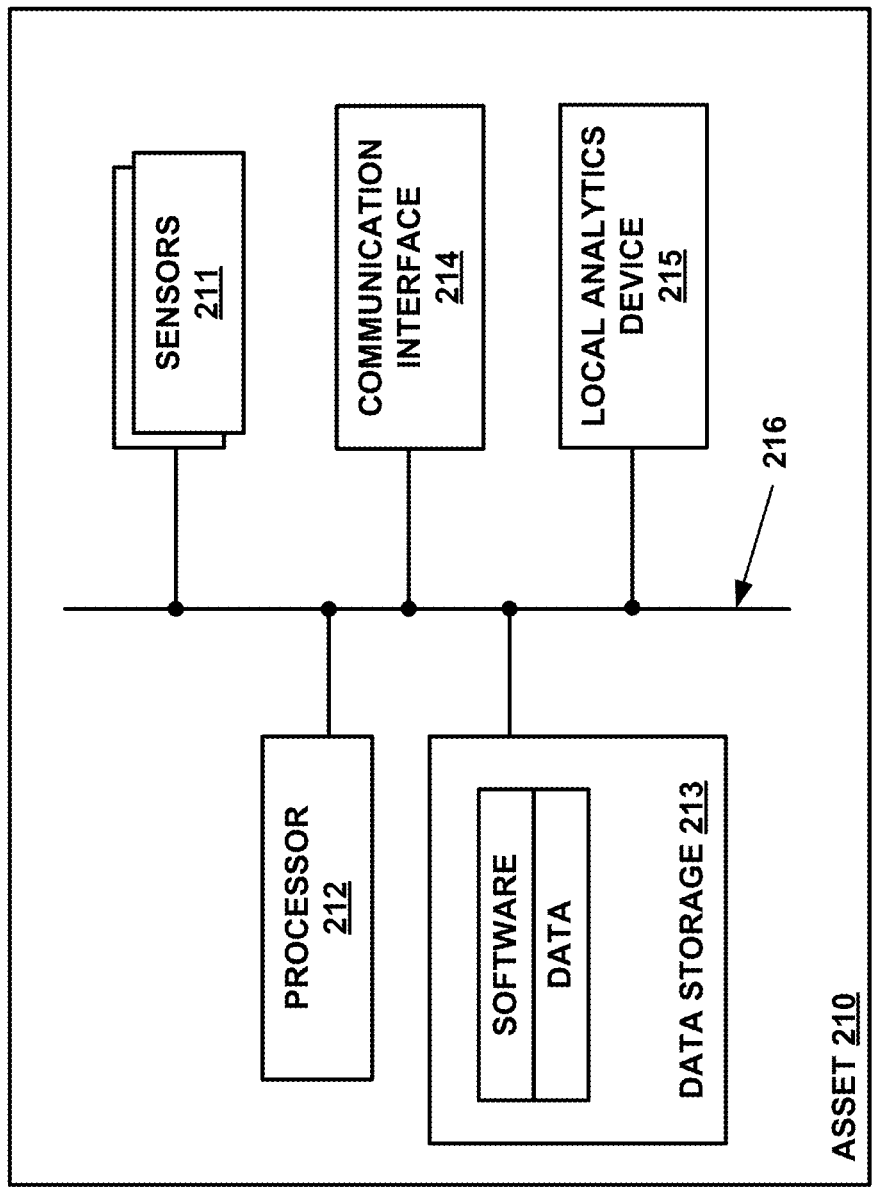
FIG. 2B depicts a simplified block diagram of the on-board components of an example asset.

In addition to the aforementioned components, an asset may also be equipped with a set of on-board components that enable the asset to capture and report operating data. To illustrate, FIG. 2B is simplified block diagram showing some on-board components for capturing and reporting operating data that may be included within or otherwise affixed to an example asset 210. As shown, these on-board components may include sensors 211, a processor 212, data storage 213, a communication interface 214, and perhaps also a local analytics device 215, all of which may be communicatively coupled by a communication link 216 that may take the form of a system bus, a network, or other connection mechanism.

In general, sensors 211 may each be configured to measure the value of a respective operating parameter of asset 210 and then output data that indicates the measured value of the respective operating parameter over time. In this respect, the operating parameters of asset 210 that are measured by sensors 211 may vary depending on the type of asset, but some representative examples may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others.

In practice, sensors 211 may each be configured to measure the value of a respective operating parameter continuously, periodically (e.g., based on a sampling frequency), and/or in response to some triggering event. In this respect, each sensor 211 may have a respective set of operating parameters that defines how the sensor performs its measurements, which may differ on a sensor-by-sensor basis (e.g., some sensors may sample based on a first frequency, while other sensors sample based on a second, different frequency). Similarly, sensors 211 may each be configured to output data that indicates the measured value of its respective operating parameter continuously, periodically (e.g., based on a sampling frequency), and/or in response to some triggering event.

Based on the foregoing, it will be appreciated that sensors 211 may take various different forms depending on the type of asset, the type of operating parameter being measured, etc. For instance, in some cases, a sensor 211 may take the form of a general-purpose sensing device that has been programmed to measure a particular type of operating parameter. In other cases, a sensor 211 may take the form of a special-purpose sensing device that has been specifically designed to measure a particular type of operating parameter (e.g., a temperature sensor, a GPS receiver, etc.). In still other cases, a sensor 211 may take the form of a special-purpose device that is not primarily designed to operate as a sensor but nevertheless has the capability to measure the value of an operating parameter as well (e.g., an actuator).

In still other cases, a sensor 211 may take the form of logic or other program code for producing error codes, where such logic or other program code may or may not be also coupled to or integrated with of any of the foregoing types of sensing devices. Sensors 211 may take other forms as well.

Processor 212 may comprise one or more processor components, such as general-purpose processors, special-purpose processors, programmable logic devices, controllers, and/or any other processor components now known or later developed. In turn, data storage 213 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 2B, data storage 213 may be arranged to contain executable program instructions (i.e., software) that cause asset 210 to perform various functions related to capturing and reporting operating data, along with associated data that enables asset 210 to perform these operations. For example, data storage 213 may contain executable program instructions that cause asset 210 to obtain sensor data from sensors 211 and then transmit that sensor data to another computing system (e.g., asset data platform 102). As another example, data storage 213 may contain executable program instructions that cause asset 210 to evaluate whether the sensor data output by sensors 211 is indicative of any abnormal conditions at asset 210 (e.g., by applying logic such as threshold-based rules to the measured values output by sensors 211), and then if so, to generate abnormal-condition data that indicates occurrences of abnormal conditions. The executable program instructions and associated data stored in data storage 213 may take various other forms as well.

Communication interface 214 may be configured to facilitate wireless and/or wired communication between asset 210 and various computing systems, including an asset data platform such as asset data platform 102. As such, communication interface 214 may take any suitable form for carrying out these functions, examples of which may include a chipset and antenna adapted to facilitate wireless communication, an Ethernet interface, a serial bus interface (e.g., Firewire, USB 2.0, on-board diagnostics (OBD), etc.), and/or any other interface that provides for wireless and/or wired communication. Communication interface 214 may also include multiple communication interfaces of different types. Other configurations are possible as well. It should also be understood that asset 210 may not be equipped with its own on-board communication interface.

In some circumstances, it may also be desirable to perform certain data analytics operations locally at asset 210, rather than relying on a central platform to perform data analytics operations. Indeed, performing data analytics operations locally at asset 210 may reduce the need to transmit operating data to a centralized platform, which may reduce the cost and/or delay associated with performing data analytics operations at the central platform and potentially also increase the accuracy of certain data analytics operations, among other advantages.

In this respect, in some cases, the aforementioned on-board components of asset 210 (e.g., processor 212 and data storage 213) may provide sufficient computing power to locally perform data analytics operations at asset 210, in which case data storage 213 may be provisioned with executable program instructions and associated program data for performing the data analytics operations. However, in other cases, the aforementioned on-board components of asset 210 (e.g., processor 212 and/or data storage 213) may not provide sufficient computing power to locally perform certain data analytics operations at asset 210. In such cases, asset 210 may also optionally be equipped with local analytics device 215, which may comprise a computing device that is capable of performing data analytics operations and other complex operations that go beyond the capabilities of the asset's other on-board components. In this way, local analytics device 215 may generally serve to expand the on-board capabilities of asset 210.

Figure 2C:
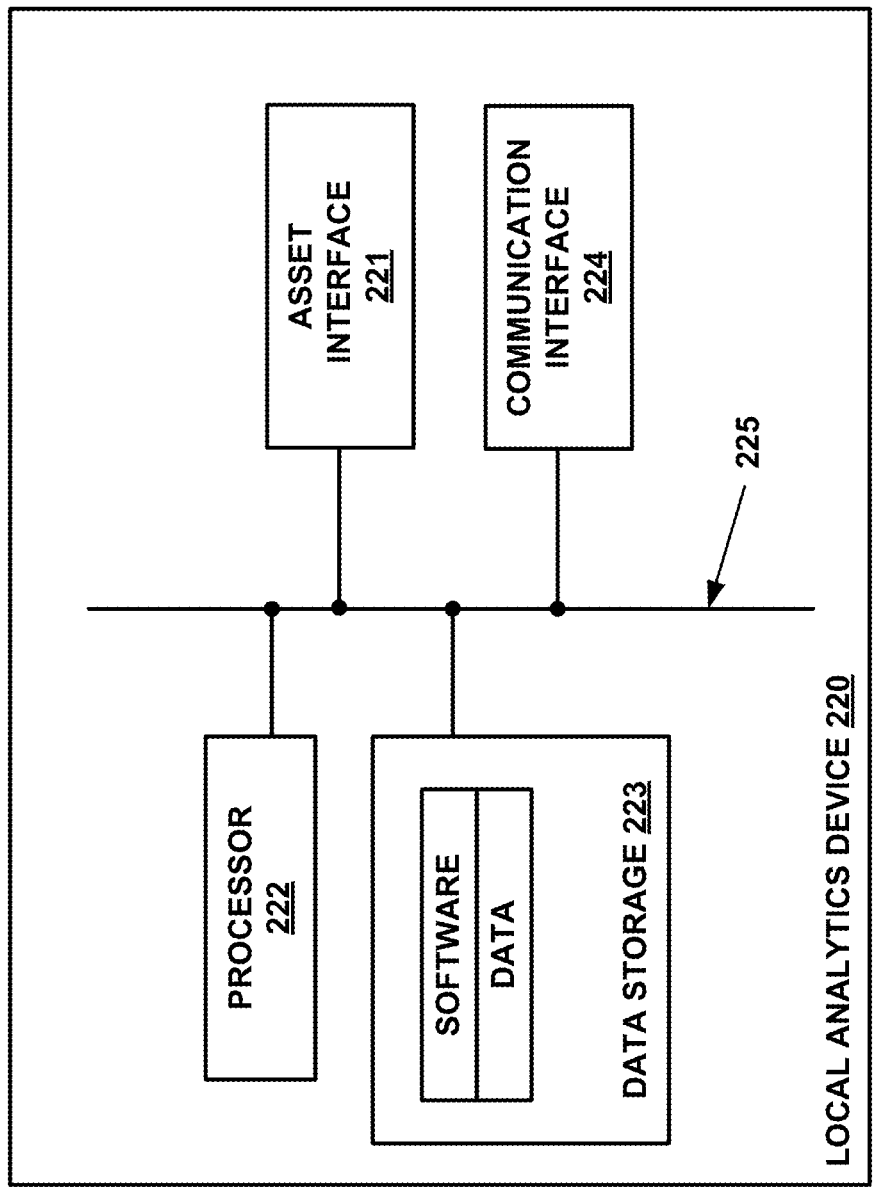
FIG. 2C depicts a simplified block diagram of an example local analytics device.

FIG. 2C illustrates a simplified block diagram showing some components that may be included in an example local analytics device 220. As shown, local analytics device 220 may include an asset interface 221, a processor 222, data storage 223, and a communication interface 224, all of which may be communicatively coupled by a communication link 225 that may take the form of a system bus, a network, or other connection mechanism.

Asset interface 221 may be configured to couple local analytics device 220 to the other on-board components of asset 210. For instance, asset interface 221 may couple local analytics device 220 to processor 212, which may enable local analytics device 220 to receive data from processor 212 (e.g., sensor data output by sensors 211) and to provide instructions to processor 212 (e.g., to control the operation of asset 210). In this way, local analytics device 220 may indirectly interface with and receive data from other on-board components of asset 210 via processor 212. Additionally or alternatively, asset interface 221 may directly couple local analytics device 220 to one or more sensors 211 of asset 210. Local analytics device 220 may interface with the other on-board components of asset 210 in other manners as well.

Processor 222 may comprise one or more processor components that enable local analytics device 220 to execute data analytics programs and/or other complex operations, which may take the form of general-purpose processors, special-purpose processors, programmable logic devices, controllers, and/or any other processor components now known or later developed. In turn, data storage 223 may comprise one or more non-transitory computer-readable storage mediums that enable local analytics device 220 to execute data analytics programs and/or other complex operations, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 2C, data storage 223 may be arranged to contain executable program instructions (i.e., software) that cause local analytics device 220 to perform data analytics operations and/or other complex operations that go beyond the capabilities of the asset's other on-board components, as well as associated data that enables local analytics device 220 to perform these operations.

Communication interface 224 may be configured to facilitate wireless and/or wired communication between local analytics device 220 and various computing systems, including an asset data platform such as asset data platform 102. In this respect, local analytics device 220 may communicate the results of its operations to an asset data platform via communication interface 224, rather than via an on-board communication interface of asset 210. Further, in circumstances where asset 210 is not equipped with its own on-board communication interface, asset 210 may use communication interface 224 to transmit operating data to an asset data platform. As such, communication interface 224 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 224 may also include multiple communication interfaces of different types. Other configurations are possible as well.

In addition to the foregoing, local analytics device 220 may also include other components that can be used to expand the on-board capabilities of an asset. For example, local analytics device 220 may optionally include one or more sensors that are configured to measure certain parameters, which may be used to supplement the sensor data captured by the asset's on-board sensors. Local analytics device 220 may include other types of components as well.

Returning to FIG. 2B, although not shown, asset 210 may also be equipped with hardware and/or software components that enable asset 210 to adjust its operation based on asset-related data and/or instructions that are received at asset 210 (e.g., from asset data platform 102 and/or local analytics device 215). For instance, as one possibility, asset 210 may be equipped with one or more of an actuator, motor, value, solenoid, or the like, which may be configured to alter the physical operation of asset 210 in some manner based on commands received from processor 212. In this respect, data storage 213 may additionally be provisioned with executable program instructions that cause processor 212 to generate such commands based on asset-related data and/or instructions received via communication interface 214. Asset 210 may be capable of adjusting its operation in other manners as well.

Further, although not shown, asset 210 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the on-board components of asset 210.

One of ordinary skill in the art will appreciate that FIGS. 2B-C merely show one example of the components of an asset, and that numerous other examples are also possible. For instance, the components of an asset may include additional components not pictured, may have more or fewer of the pictured components, and/or the aforementioned components may be arranged and/or integrated in a different manner. Further, one of ordinary skill in the art will appreciate that two or more of the components of asset 210 may be integrated together in whole or in part. Further yet, one of ordinary skill in the art will appreciate that at least some of these components of asset 210 may be affixed or otherwise added to asset 210 after it has been placed into operation.

IV. FUNCTIONAL ARCHITECTURE OF DATA SCIENCE PLATFORM

Disclosed herein is a data science platform that is built with a specific focus on monitoring and analyzing the operation of industrial assets, such as trucking assets, rail assets, construction assets, mining assets, wind assets, thermal assets, oil and gas assets, and manufacturing assets, among other possibilities.

At a high level, the disclosed data science platform is configured to carry out operations that include (i) ingesting asset-related data from any of various different data sources and storing it for downstream use, (ii) transforming the ingested asset-related data into a desired formatting structure (which may be referred to as a "schema") and then storing it for downstream use, (iii) evaluating the asset-related data to derive insights about an asset's operation that may be of interest to a platform user (e.g., a prediction that a given type of event is likely to occur at an asset in the foreseeable future, a determination that an asset is behaving abnormally, etc.), which may involve data science models that have been specifically designed to analyze asset-related data in order to gain a deeper understanding of an asset's operation, and (iv) presenting derived insights and other asset-related data to platform users in a useful manner. These operations may take various forms and are described in further detail below.

In practice, the disclosed data science platform may be viewed as a collection of functional modules that are responsible for handling different aspects of the platform's functionality (i.e., different services provided by the platform). For instance, the disclosed data science platform may comprise a data ingestion module that is responsible for handling the platform's data ingestion functionality, a data transformation module that is responsible for handling the platform's data transformation functionality, a data analytics module that is responsible for handling the platform's data analytics functionality, an application service module that is responsible for driving applications that are presented to platform users, and an interface module that is responsible for handling the interaction with external systems seeking access to the platform, as well as a staging data store that serves as an initial repository for ingested data and a core data store module that serves as both the primary repository for asset-related data in the platform and also as a repository for information regarding the configuration of the platform. However, it should be understood that these functional modules are merely exemplary, and that the platform's functional architecture may take various other forms as well.

Further, in practice, the functional modules of the disclosed data science platform may be implemented in various manners. As one possible implementation, the various functional modules may be implemented in hardware or software form, with a respective functional module possibly including one or more hardware components (such as a processor, data storage, and a communication interface) and/or one or more software components (such as program code and or other data), where the hardware or software components of one functional module may overlap and be shared by one or more other functional modules of the disclosed data science platform. In some arrangements, the functional modules of the disclosed data science platform may be implemented as a microservices architecture in which each functional operation takes the form of a configurable service, which improves the overall configurability and flexibility of the disclosed data science platform. In such an implementation, each configured service of the platform may have an associated set of configuration data that is stored by the platform.

Further yet, in line with the overall focus of the platform, the functional modules of the platform may be built with a specific focus on monitoring and analyzing the operation of industrial assets. For instance, as one possibility, the platform's data transformation module may be configured to transform the ingested data into a schema that is specifically designed for asset-related data, which may in turn lead to improvements in the performance and functionality of the platform. For example, when ingested data is transformed into a schema that is specifically designed for asset-related data, this may improve the performance of functional modules that access that data—such as the data analytics module, the application service module, and the interface module—in terms of the computing resources that are utilized by these functional modules when accessing such data. As another example, when ingested data is transformed into a schema that is specifically designed for asset-related data, this in turn enables the platform to make use of predefined data science models and applications that are specifically designed to consume data in that schema, which provides advantages over platforms that may require all data science models and applications to be custom built. Transforming the ingested data into a schema that is specifically designed for asset-related data may lead to other improvements as well.

As another possibility, the platform's core data store module may be designed with a focus on storing asset-related data in a way that maximizes the performance of the platform, in terms of the computing resources that are utilized to both write and read such asset-related data. In this respect, as described in further detail below, the core data store module may comprise at least two different types of data stores—one that is designed for storing higher-volume asset-related data such as high-volume sensor data (referred to herein as the "readings data store") and another that is designed for storing lower-volume asset-related data such as lower-volume sensor data, fault code data, event data, and the like (referred to herein as the "non-readings data store"). In addition, the non-readings data store may be configured to store platform configuration data as well, including data describing the schema of the stored asset-related data, which may enable other functional modules of the platform to get visibility as to what asset-related data is stored in the readings data store without having to access the readings data store itself. Such optionality in the platform's core data store module may generally improve the platform's ability to integrate with new and varied data sources that have various different constraints.

As yet another possibility, the platform's data analytics module may be designed to create and deploy data science models in a manner that is optimized for analyzing asset-related data. For example, when creating a particular type of data science model for analyzing asset-related data, the platform's data analytics module may be configured to use model parameters and/or machine learning techniques that have been found to be well-suited for creating that particular type of data science model. As another example, when creating and/or deploying a particular type of data science model for analyzing asset-related data, the platform's data analytics module may be configured to tailor the input data for the model in way that has been found to achieve the most reliable results for the particular type of data science model (e.g., by using a particular "lookback window" for the input data). As yet another example, the data analytics module may employ an approach for executing data science models that has been found to be well-suited for data science models that are designed to analyze asset-related data. The data analytics module's approach for creating and/or deploying data science models may be optimized for analyzing asset-related data in other manners as well.

As still another possibility, the platform's application service module may be designed to drive applications that are specifically designed for presenting information regarding asset operation in a useful manner.

Several aspects of the disclosed data science platform set this platform apart from solutions that may be provided by other entities—as will be discussed herein and will become apparent to those of skill in the art with the benefit of the present disclosure. First, as a general matter, the disclosed platform has been designed based on the knowledge and experience of over one hundred data scientists particularly experienced with industrial data sets from OEM integrations, safety monitoring systems, and backend aggregation and analytics platforms commonly used in industrial settings (e.g., SCADA, PLC, among others).

Second, the disclosed data science platform offers an out-of-the-box data modeling solution for common industrial, asset performance, and supply-chain-management-specific use cases (e.g., events, work orders, faults, preventative maintenance strategies, etc).

Third, to be sure, most data platforms focus on ingestion and analysis of data in varying forms; however, the disclosed data science platform focuses on ingesting and analyzing data specifically for integrating data science into industrial use cases. This impacts every aspect of the disclosed platform—from data ingestion through reporting, dashboarding, and application building. Advantageously, the disclosed data science platform enables such key performance indicators as "time to first insight" and "time to first outcome." Indeed, the disclosed data science platform is tuned for receiving feedback, evaluating model performance against real-life industrial assets that, in some cases, have been operating for years and only using their aggregated data for diagnostics and routine checkups. The disclosed data science platform fundamentally changes the usefulness and usability of data for the purpose of preemptive prediction, preventative maintenance, and reducing operational cost in industrial settings, among other examples.

Fourth, this extends into the data science models and analysis carried out by the disclosed data science platform. Instead of merely offering simple neural net modeling or more generic anomaly detection, the disclosed data science platform offers specialized data science functionality such as an asset fuel optimization engine, wind turbine power curve optimization, automated work order, and inventory label correction, among several others. In other words, the disclosed data science platform brings everything to the table that a non-industrial data science platform does, plus layering what is desired for industrial use cases.

Fifth, the disclosed data science platform is built to evolve and extend a common industrial data model that has already been built and includes both asset-based contextual data (e.g. asset hierarchy, units of measure, fault events, etc.) and high-volume telemetry data. Many platforms tend to over generalize and as a result are difficult to tune for both high- and low-velocity data ingestion as well as high and low data veracity as can be seen in integrations with long-running industrial data systems.

Sixth, the disclosed data science platform additionally integrates with and curates data sets that are particularly useful in industrial data science applications. Such data sets may include weather data, lightning strike data, population density data, geological data, among others. Additionally, the disclosed data science platform brings industry-specific preventative maintenance strategies together with the disclosed data science platform so that insights generated can be integrated into costing models and revenue forecasting for retailers, operators, and OEMs of industrial assets.

Seventh, the disclosed data science platform is particularly differentiated by the industrial data sets that have been analyzed and the industry partners that have had data assessments done. Such exposure has helped build patterns into the disclosed data science platform that are tuned specifically for industrial data sets (e.g., ephemeral sensor data ingestion that accounts for data ordering, reprocessing, windowing).

Eighth, the disclosed data science platform differentiates industrial data science as a result of the long-term value investments that have been made in the systems that have been built to support the disclosed data science platform. The disclosed data science platform is not simply sentiment analysis or ad-impression correlation that integrates with modern data sets and will be replaced in the next several years. The disclosed data science platform is built around and takes advantage of patterns in industrial data integration that have been collected over the course of 30 years. The systems that support the platform's data integration, data science engine runtimes, and application building have all been specially honed to improve the efficiency of operations in industry. Very infrequent failure events are accounted for, as well as data retention, monitoring, quarantine, and validation processes unique to industrial data integrations and use cases. Other platforms may enable a tenant to put together some of these building blocks, but only the disclosed data science platform brings them together with purpose for industry.

It should be understood that these design principles of the platform's functional modules are merely exemplary, and that the design principles of the platform's functional modules may take various other forms as well.

Further details as to how the platform's functional modules may be built with a focus on monitoring and analyzing the operation of industrial assets are described below in connection with the example functional architecture of the platform.

In addition to performing the services described above for monitoring and analyzing the operation of industrial assets, the disclosed data science platform also provides a set of tools that enable any organization (referred to herein as a "tenant" of the platform) to configure an instance of the data science platform for the organization's own specific purposes. For instance, as described in further detail below, the disclosed data science platform may provide tools that enable an organization to create and/or deploy schemas for formatting and storing the organization's asset-related data, connections for ingesting the organization's asset-related data, pipelines for transforming the organization's asset-related data into a desired format, data science models for analyzing the organization's asset-related data, and applications for presenting the organization's asset-related data and insights derived therefrom, among other possibilities.

Further, these tools may also provide an organization with access to certain predefined functional components of the platform that have already been designed with a focus on monitoring and analyzing the operation of assets, such as predefined schemas that are specifically designed for formatting and storing asset-related data, predefined pipelines that are specifically designed for transforming asset-related data, predefined data science models that are specifically designed for performing certain types of data analytics operations on asset-related data, and predefined applications that are specifically designed for presenting asset-related data and insights derived therefrom. In this respect, when configuring its instance of the data science platform via the provided tools, an organization can choose to use these predefined functional components, create its own functional components, or do some combination thereof.

As each organization uses the disclosed tools to configure its own respective instance of the disclosed data science platform, the disclosed data science platform may store the configuration data for the organization in the platform's core data store module in the form of platform configuration data, and the functional modules of the disclosed data science platform may then use this platform configuration data to deploy the organization's instance of the platform. In this way, the disclosed data science platform can use the same underlying functional modules to provide multiple different instances of the platform.

Notably, providing an already-built data science platform along with a set of tools that allows organization to configure its own instance of that already-built data science platform gives rise to several advantages over an approach where a brand new data science platform for the organization is built from scratch. For example, building a new platform from scratch is very costly (typically on the order of several hundred million dollars) and requires significant amount of lead time (typically three or more years). On the other hand, with the disclosed data science platform and associated tools, an organization can build its own instance of a data science platform and get it is up and running within a few weeks. This is possible because much of the work in creating the backbone of the platform has already been done by the industry experts that built the pre-established base packages of platform components. Indeed, building an instance of the disclosed data science platform may be accomplished by simply engaging in a few configuration operations that take advantage of the pre-packaged and ready-to-deploy components of the disclosed platform, at which point the disclosed platform may be operable to being ingesting asset-related data, executing data science models, and providing insights about the asset-related data. This approach may save an immense amount of time and energy, leaving the origination's resources to be utilized in a more productive manner.

Further, organizations that attempt to integrate data science and machine learning into their existing analytics systems often become too general and cannot efficiently serve their existing use cases in addition to data science use cases. Indeed, data science as a practice is relatively new and data science for industry is especially specialized. The disclosed platform has been designed and built based on the knowledge and experience of over one hundred data scientists specializing in industrial use cases and is designed to evolve based on unique insight gained through existing work in industrial data science. An organization building or integrating third-party data science tooling into their back office may not have the same advantages that are provided by the disclosed data science platform, which will continue to evolve given the platform's reach across industry and a wide variety of industrial use cases.

Further, the total cost of ownership in a purpose-built data science platform typically does not align well with existing organization objectives. In many cases, it tends to be infeasible for small to mid-size industrial asset operators to stand-up their own data science platform. The disclosed data science platform is a right-out-of-the-box experience that enables organizations in these circumstances to quickly gain actionable outcomes for a fraction of the cost of their own data engineering and/or data science department.

Figure 3:
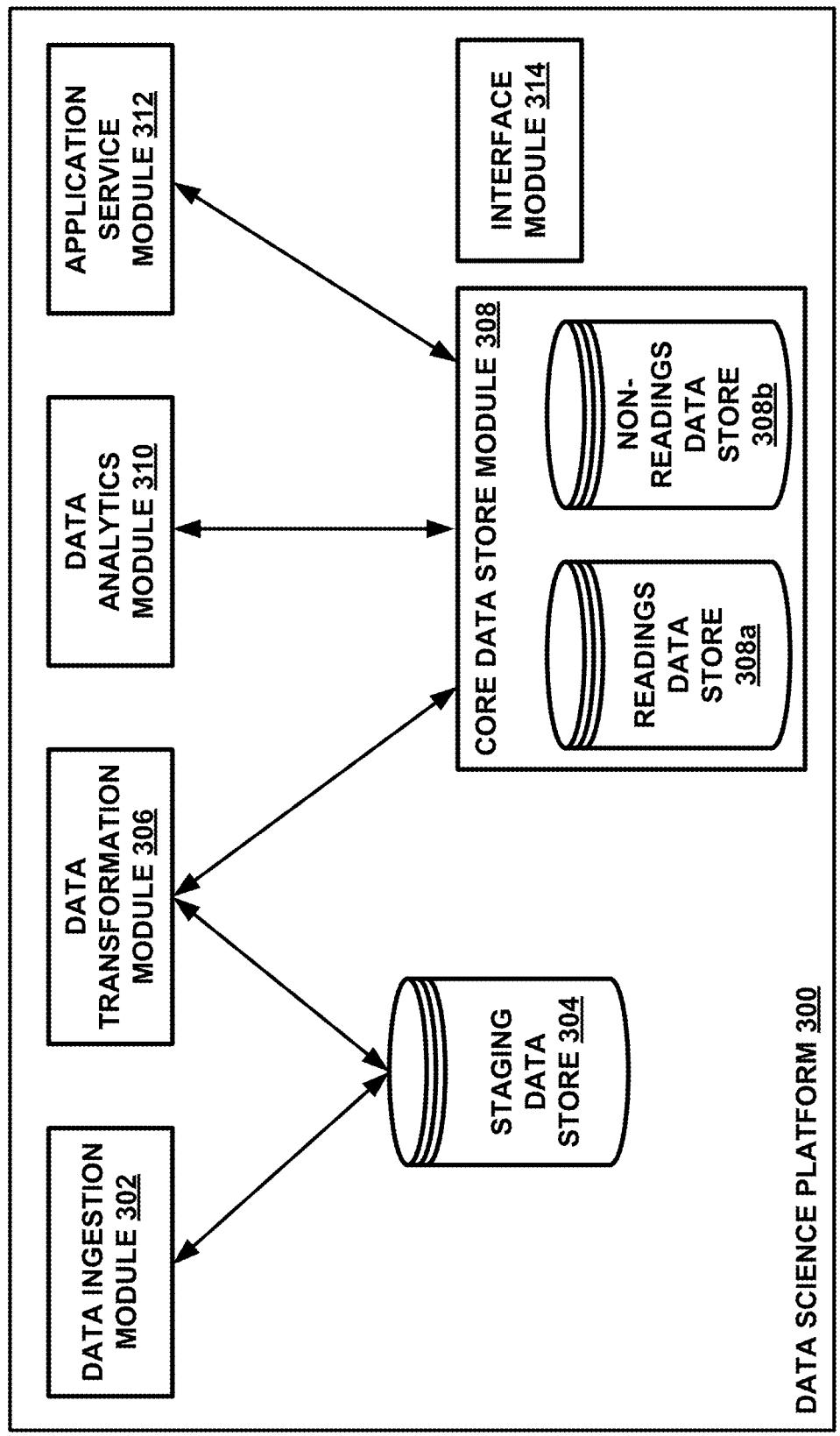
FIG. 3 depicts a simplified block diagram of an example data science platform from a functional perspective

Turning now to FIG. 3, a simplified block diagram provided to illustrate an example functional architecture of an example data science platform 300. For instance, as shown, the example platform 300 may include a data ingestion module 302, a staging data store 304, a data transformation module 306, a core data store module 308 that may include both a "readings" data store 308a and a "non-readings" data store 308b, a data analytics module 310, an application service module 312, and an application service module 312, each of which comprises a combination of software and hardware elements that are configured to carry out particular functions. In line with the discussion above, these functional modules may be implemented on one or more computing systems, which may take the form of computing infrastructure of a public, private, and/or hybrid cloud or one or more dedicated servers, among other possibilities.

A. Data Ingestion Module 302

At a high level, data ingestion module 302 may function to ingest asset-related data from one or more data sources (e.g., one or more data sources 104) so that the data can be passed to the other platform modules. To do this, the data ingestion module 302 may utilize what are called "connections" to connect to and ingest asset-related data from these one or more data sources. And to facilitate utilizing these connections to connect to and ingest asset-related data from these one or more data sources, the platform 300 may contain "schema" data that serves to inform the modules of platform 300, including data ingestion module 302, what asset-related data channels will be ingested into the platform and how this data is structured.

Turning first to the schema data, schema data in general describes how many and what type of assets the data ingestion module 302 will ingest data from, what kinds of data the data ingestion module 302 will ingest, what format this data is collected in, and how this data is collected, among other possibilities. By knowing this information, data ingestion module 302, and the platform 300 generally, can efficiently ingest asset-related data, store it in an appropriate location, apply appropriate transformations to this data, and make the data available to other modules in the platform 300 in formats that these modules expect.

Within the platform 300, schema data may be represented by a set of data structures called "objects" and the relationships between these objects. An object is a data structure that describes one specific aspect of a schema. By way of example, a schema may include objects that describe assets, objects that describe data channels, objects that describe events, and/or objects that describe data sources from which the data ingestion module 302 will ingest data. Other types of objects are possible as well, such as an insight object, which may contain data that describes various aspects of one or more types of insights that may be derived by parts of the platform 300, including the data analytics module 310, and an application object, which may contain data that defines the configuration, visual appearance, and functionality of one or more applications that may be created and/or driven by the application service module 312. A relationship is a data structure that describes how two or more objects relate together. Together, a set of objects comprising a schema and the relationships between these objects form the framework within which the data ingestion module 302 ingests data.

Objects may have various properties that serve to further define the specific aspect of the schema represented by the object. For instance, an object may have (i) data fields, (ii) records, (iii) channel mappings, and (iv) views, although other properties are possible. A data field is a definitional aspect that applies to the object. An object's data fields may define the set of descriptive information for that specific object. Objects may have as few as one data field, or as many has dozens or hundreds of data fields, depending on the implementation. Further, the specific data fields included in an object may vary on an object-by-object basis.

As one example, an "asset" object may have, among other possibilities, an "ID" field for describing an asset's ID, a "model number" field for describing an asset's model number, a "purchase date" field for describing the date of purchase of the asset, a "manufacturing year" field for describing the year that the asset was manufactured, and a "production date" field for describing the date the asset was produced, and a "cost" field for describing the cost of the asset. Other data fields are possible as well.

Objects may have a hierarchal relationship with one another. That is, an object may refer to "parent" objects and/or "children" objects. A "child" object may inherent all the data fields of its "parent" object and may include additional data fields that are relevant to the specific "child" object. In this way, the "child" object may be considered a more specific type of the "parent." By way of example, an "asset" object may be a parent to a "truck asset" object or a "turbine asset" object, with, for instance, the "truck asset" object including all of the data fields of its parent "asset" object and including additional data fields that are specific to truck assets. For instance, a "truck asset" object may have, among other possibilities, an "ID" field for describing a truck asset's ID, a "composition" field for describing a truck asset's set of components, a "make" field for describing the make of a truck asset, a "model" field for describing the model of a truck asset, a "year" field for describing the year a truck asset was built, and/or an "engine type" field for describing certain aspects about a truck asset's engine, and/or a "channels" field for describing the type of data collected by the truck asset, which may be ingested into the platform 300 by data ingestion module 302.

As another example, a "channel" object may have, among other possibilities, a "sensor type" field for describing the type of data sensor collecting data for the specific data channel, a "format" field for describing the format the data collected by the data sensor is in, and a "grain" field for describing the size of the window drawn for aggregated data. For instance, if a particular channel contains the mean of the underlying values over some window of time, it may have an example grain size of one hour, meaning that the data received via this channel will be in aggregates covering one-hour periods, such as the mean of all readings received from 1:00 AM to 2:00 AM on one channel on one day. In other examples, other data fields are possible as are other objects.

As indicated, objects may have records. Records are an object's underlying data. Each record may populate one or more of the object's data fields with data. Continuing with the truck asset example above, if there are 10 "truck" assets described by its "truck asset" object, then the "truck asset" object may include 10 records, where each record relates to one of the 10 "truck" assets. For instance, one truck record may contain "0001" for the "ID" field, "24' box, lift gate" for the "composition" field, "International" for the "make" field, "CV" for the "model" field, "2015" for the "year" field, "TractorTrailer" for the "engine type" field, and "engine temperature, oil pressure" for the "channels" field; whereas another data record may contain "0002" for the "ID" field, "flat bed" for the "composition" field, "International" for the "make" field, "MV" for the "model" field, "2012" for the "year" field, "TractorTrailer" for the "engine type" field, and "engine temperature, oil pressure, coolant level" for the "channels" field.

For channel objects, records may similarly populate the channel object's data fields. Continuing with the example above, if there are several sensors that read engine temperature for one or more of the truck assets, then the channel object may include records that describe each of these sensors. For instance, one record for the "engine temperature channel" object may contain "temperature sensor" for the "sensor type" field, "Celsius, double" for the format field, and "one hour" for the "grain" field.

Additionally, records for a channel object may contain a "master channel" designation indication. A master channel designation may serve to reduce ambiguity in the data ingestion process by indicating to the data ingestion module 302 and the platform 300 what real-world concept is measured by a data channel. Several types of master channel designations may be possible, such as oil temperature, engine temperature, cabin temperature, oil pressure, brake fluid pressure, etc. Thus, if a data source referred to a particular data channel as simply "temperature" but a record of a channel object for this particular data channel indicated that the master channel designation for this data channel was "engine temperature," then the modules of platform 300, including data ingestion module 302 may understand that this particular data channel measures "engine temperature" data as opposed to some other kind of "temperature" data. Other kinds of master channel designations are possible as well.

As also indicated above, certain types of objects may have channel mappings. A channel mapping is generally an indication that a given data channel measures some aspect represented by a given object. To illustrate, if there are several data channels that measure aspects of truck assets, then each of the data channel objects that represent these data channels would contain an asset-channel mapping indication identifying the "truck asset" object. Likewise, the "truck asset" object may contain asset-channel mapping indications that identify each of the various data channel objects that measure aspects of the truck asset.

As also indicated above, objects may have views. A view is generally a visual representation of the object generated by the data ingestion platform and provided to a user via a GUI. Views may take various forms. As one possibility, a view may be in a tabular format. For instance, in tabular format, a view of an asset object may be presented as a table, where the columns are represented by the data fields of the asset object and the rows of the table are represented by the records of the asset object. As another possibility, a view may be presented in a simplified block diagram format. For instance, in block diagram format, a view of multiple objects may be displayed, with each asset object being represented as a block and each channel object represented as a circle, although other examples are possible. Objects that are related to other objects, though an asset-channel mapping, for instance, may be connected via a line. In this way, a user by be presented with an overview of its schema. Other forms of views may be possible as well.

As described in further detail below, the schema for the platform 300 may be defined in various manners. As one possibility, the platform 300 may be pre-provisioned with various packages of predefined objects—such as packages of predefined objects that are specific to industrial assets—in which case at least some aspects of the platform's schema may be defined using these predefined objects. For example, during configuration of a new instance of the platform 300, a tenant may select one or more packages of predefined objects and then either use the predefined objects as is or extend those predefined objects to better fit the tenant's asset-related data. As another possibility, a tenant may create its own custom set of objects that serve to define case at least some aspects of the platform's schema (e.g., via a tool provided by the platform). The schema for the platform 300 may be defined in other manners as well.

To facilitate ingesting asset-related data from multiple different types of data sources, each of which may provide data in proprietary formats and may involve different protocols for accessing the asset-related data, the data ingestion module 302 may be configured to utilize "connections." Generally, a connection is a data structure that describes how the data ingestion module 302 connects to and ingests asset-related data from a particular data source. For instance, a connection designed to connect to a particular data source may specify, among other possibilities, (i) what type of "connector" the connection uses and the configuration data of that connector, (ii) the location of the data source (e.g., a web address, IP address, or other network location identifier), (iii) the format of the data available at the data source (e.g., a comma-separated values format or a proprietary data format), (iv) the type of data that will be received from the data source, (v) an identification of which data from the data source will be ingested into the platform 300 through the connection, (vi) how often the data will be ingested (e.g., on a real-time basis, or a batch upload basis), and/or (vii) any credentials or other authenticating information that may be necessary for accessing the data source (e.g., username/password, pre-shared keys, etc.). Advantageously, configuration data for the connector used by a given connection will generally be tightly integrated with the security and authorization mechanisms of the Platform. This may help to ensure the data ingested by the Platform is properly entitled and available only to such personnel who have been authorized to access it. Additionally, the mechanisms for creating platform connectors may enable the integration of third-party tooling as well as the use of custom client connectors during solution engineering.

As mentioned, the connection may specify the type of data being ingested via the connection. The data ingestion module 302 may ingest various types of asset-related data. As one possibility, the data ingestion module 302 may ingest what are called "readings" data and "non-readings" data. As a general matter, readings data may refer to asset-related data that is collected on a "high-volume" basis. For instance, readings data may include time-series data that is ingested from data channels that provide data readings at a rate of hundreds, thousands, tens of thousands, or even hundreds of thousands of times per second. For some data sources, the data ingestion module 302 may be configured to ingest readings data from these data sources as soon as the readings data is collected by the data source. As such, the readings data that is ingested into the platform 300 from such data sources may be considered to be ingested on a real-time or near real-time basis and may be referred to as "instantaneous" readings data. For other data sources, the data ingestion module 302 may be configured to ingest readings data once a threshold amount of such readings data has been collected at the data source or once the readings data has been collected for a threshold amount of time, among other possibilities. As such, readings data that is ingested into the platform 300 from such data sources may be considered to be ingested on a batched basis and may be referred to as "staged readings" data.

As another possibility, non-readings data may refer to asset-related data that is collected aperiodically (such as fault-code data channels, work-order data channels, repair activity data channels, etc.) or data that is collected periodically but may not rise to the level of what may constitute "high-volume" data (such as data that may be ingested from data channels that provide data readings on a per minute or per hour basis). Other types of asset-related data may be possible.

In a typical configuration, the data ingestion module 302 may utilize one connection per data source from which the data ingestion module 302 will ingest data. In the example arrangement depicted in FIG. 1, if it is desired that the platform ingest asset-related data from each data source 104A-E, then the data ingestion module 302 may utilize one connection for each data source 104. In some situations, however, the data ingestion module 302 may utilize more than one connection per data source from which the data ingestion module 302 will ingest data. The data ingestion module 302 may do this, for instance, when it will ingest some data from a data source in one way (real-time processing) and other data from the data source in another way (e.g., batched processing). The data ingestion module may utilize connections in other ways as well.

As described in further detail below, the connections for the platform 300 may be defined in various manners. As one possibility, the platform 300 may be pre-provisioned with various packages of predefined connections, such as packages of predefined connections that may be specific to certain industrial asset-related data sources. For example, during configuration of a new instance of the platform 300, a tenant may select one or more packages of predefined connections and then either use the predefined connections as is or extend those predefined connections to better fit the data sources from which the platform will ingestion asset-related data. As another possibility, a tenant may create its own custom set of connections that may be used by the data ingestion module 302. The connections used by the platform 300 may be defined in other manners as well.

Once asset-related data is ingested by the data ingestion module 302, it is stored in a staging data store 304 and made available to the data transformation module. Staging data store 304 may comprise one or more data storage entities that are configured to store data ingested into the platform 300 by data ingestion module 302 prior to this data being retrieved by the data transformation module 306 and persistently stored in the platform's core data store module 308. As such, the staging data store 304 may serve as a data source for some of the other modules in platform 300, including the data transformation module 306. Staging data store may be employed using any various technologies, such as Apache Cassandra, Apache Hadoop, Apache Kafka, PostgreSQL, MongoDB, and/or Cloud Native Object Storage technologies (e.g., S3 or Azure Blob), among other possibilities. Staging data store 304 may take other forms and/or store data in other manners as well.

Employing a staging data store like the one discussed above may result in several advantages for the platform. As one example, the staging data store may help to optimize long-term cost. For instance, staging initial data allows for further feature engineering and the ability remove unnecessary data before or accelerate the archival of a particular set of raw data Additionally, staging data increases the durability of the data sets ingested by the platform. For instance, if real-time connectivity is severed or data systems are retired at a tenant site, the platform will continue to have a copy of that data unless and until the tenant removes it or it is archived. This, advantageously, reduces strain on tenant integrations such that tenant systems are not taxed for data replay or remediation. Instead, the staged raw data may simply be reused, if necessary.

B. Data Transformation Module 306

The data transformation module 306 may be configured to retrieve ingested asset-related data from the staging data store 304, optionally apply one or more transformations to the asset-related data and store the data in an appropriate location within the platform's core data store module 308. The data transformation module may accomplish this process by utilizing what are called "pipelines."

As a general matter, a pipeline is a data structure that generally describes where data is coming from, where data will be stored in the core data store module 308, and what, if any, transformations to apply to this data before storing it in the core data store module 308. In this respect, a pipeline may generally have three components: (i) a source component that identifies the location in the staging data store 304 at which a given set of asset-related data set is stored; (ii) an optional transformation component that identifies a set of one or more transformations that are applied to some or all of the given set of asset-related data before it is stored in the core data store module 308; and (iii) a sink component that identifies the location in the core data store module 308 at which the given set of asset-related data will be stored. In this way, a pipeline may function to move a given set of asset-related data from the staging data store 304 to the core data store module 308 and to arrange this data into a format that may be expected by the other modules in the platform (e.g., the data analytics module 310 and the application service module 312, among others).

Turning to the individual components of a pipeline, the source component of a given pipeline may identify a particular type of asset-related data stored in the staging data store 304 and/or a particular set of data channels. As explained above, there may be various types of asset-related data ingested by the platform and stored in staging data store 304. In particular, there may be staged readings data, instantaneous readings data, and/or non-readings data ingested into the platform by data ingestion module 302 and stored in staging data store 304. The source component of a given pipeline may identify one of these categories of asset-related data and may further identify a set of data channels from one of these types. Other types of asset-related data may be ingested by data ingestion module 302 and stored in staging data store 304 as well.

The transformation component of a given pipeline may function to change the asset-related data identified by the source component in one or more ways prior to storing it in the core data store module 308. In general, a transformation is any qualitative or quantitative manipulation to the asset-related data such that, once transformed, the transformed asset-related data represents the original asset-related data in a different way. The data transformation module may provide the ability to apply various types of transformations. Among other possible transformations, data transformation module may provide the ability to apply transformations that (a) add a constant to one or more data values of certain asset-related data; (b) perform a calculation using one or more data values of certain asset-related data (e.g., calculate a running average of a data value over time); (c) omit or truncate certain data fields of certain asset-related data; (d) change the format of one or more data values of certain asset-related data (e.g., changing the date format from MM-DD-YYYY format to YYYY-MM-DD format); (e) change the name of one or more data fields of certain asset-related data; (f) selectively filter one or more data values of certain asset-related data; (g) change the unit of measure of one or more data values of certain asset-related data (e.g., change Fahrenheit temperature units to Celsius temperature units); and/or (h) roll-up one or more data values of certain asset-related data (e.g., sum up the number of alerts generated for a given asset component into a daily aggregate). Many other types of transformations are possible as well, and it should be appreciated that the foregoing examples were provided for the sake of brevity, and that in practice, tens or even hundreds of different transformations for asset-related data may be possible.

It may be desirable to apply one or more transformations to asset-related data in order to put the asset related data into a format expected by the other modules of the platform. For example, a particular data science model, which would be executed by the data analytics module 310, may expect to receive hourly Fahrenheit engine temperature readings in order to produce engine-failure prediction alerts. If the platform 300 ingests Celsius engine temperature readings on a minute-by-minute basis, then, in order to use the particular data science model, the platform 300 may use a pipeline for this engine temperature data that includes (i) a unit-conversion transformation (to convert the Celsius readings to Fahrenheit readings), and (ii) a calculation transformation (to obtain hourly average engine temperature readings). Similarly, the data transformation module 306 may transform asset-related data via one or more pipelines in order to put this data into a form usable by one or more applications. For example, a dashboard application may present a graph of engine temperature as a function of oil pressure. If the platform 300 does not ingest a data channel that provides engine temperature as a function of oil pressure, then the platform 30 may utilize a pipeline that includes a transformation to compute engine temperature as a function of oil pressure. Other examples of using transformations are possible as well.

The sink component of a given pipeline may identify a particular location in the core data store module 308 at which to persistently store the asset-related data coming through the pipeline. Each data sink used in a pipeline may serve as a data source for other downstream modules in platform 300, such as the data analytics module 310 and the application service module 312. As will be explained below in further detail, asset-related data may be stored in the core data store module 308 in certain locations depending on the particular type of asset-related data. As one example, high-volume time-series data readings (such as either instantaneous readings data or staged readings data) may be stored in a "readings" data store 308a that may be specially optimized for high-frequency write operations. On the other hand, low-volume, time-series data or other aperiodic asset-related data may be stored in a "non-readings" data store 308b that may be optimized for other purposes, such as ad-hoc querying or fast-read operations. Thus, the sink component of a given pipeline may reflect the type of asset-related data coming through the given pipeline. Thus, possible sink components may include a "staged readings sink," an "instantaneous readings sink," and a "non-readings sink," although other examples may be possible.

The pipelines utilized by the data ingestion module 306 may be stored in the core data store module 308 as pipeline configuration data. As explained below, pipeline configuration data may include data describing the various pipelines used by the data transformation module 306, including data describing the source components, the transformations, and the sink components of various pipelines. In addition to this, the data transformation module 310 may be configured to derive insights based on pipelines utilized by the data ingestion module 306. Generally, an insight derived by the data ingestion module 306 may take the form of any data that may be of interest to a platform user that relates to the data ingestion process. Such insights may be stored in the core data store module 308 as one or more insight objects.

As described in further detail below, the pipelines for the platform 300 may be defined in various manners. As one possibility, the platform 300 may be pre-provisioned with various predefined pipelines or packages of predefined pipelines, such as packages of predefined pipelines that may be specific to certain data science models (e.g., pipelines that function to transform data values such that they can be used in one or more pre-defined data science models). For example, during configuration of a new instance of the platform 300, a tenant may select one or more packages of predefined pipelines and then either use the predefined pipelines as is or extend those predefined pipelines to better fit desired transformations. As another possibility, a tenant may create its own custom set of pipelines that may be used by the data transformation module 302. The pipelines used by the platform 300 may be defined in other manners as well.

In addition to retrieving ingested asset-related data from the staging data store 304, optionally applying one or more transformations to the asset-related data, and storing the data in an appropriate location within the platform's core data store module 308, the data transformation module 306 may be configured to perform various quality checks on the asset-related data before passing it through any pipelines and onto to the core data store module 308. For example, data ingestion module 306 may assess the reliability (or "health") of certain asset-related data ingested into the staging data store and take certain actions based on this assessed reliability, such as removing from the staging data store 304 any data deemed unreliable. As another example, data ingestion module 302 may "de-dup" certain asset-related data ingested into the staging data store 304 by comparing it against data that has already been received into staging data store 304 and then ignoring or removing from staging data store 304 any duplicative data. As yet another example, data ingestion module 302 may determine that certain asset-related data ingested into the staging data store 304 is related to data already stored in the platform's data stores (e.g., a different version of the same data) and then merge the ingested data and stored data together into one data structure or record. Other examples are possible as well.

C. Data Analytics Module 310

As discussed above, one of the core aspects of the platform 300 is its ability to evaluate asset-related data ingested by the platform 300 using various data science models, each of which is configured to receive a given set of data channels as input data, apply one or more data analytics operations to the input data, and then output a result that can be used to derive insights regarding the ingested asset-related data. By way of example, in some implementations, a data science model may take the form of an executable program which, when given an input in a particular format, produces one or more "scores" which may take the form of a single number, a sequence of numbers, a single string, among other possibilities; however, other forms of data science models are possible as well. The internal structure of this executable program may be written in code or, more often, "fit" to data using one or more "machine learning" approaches. To facilitate this core aspect of the platform 300, the data analytics module 310 may be configured to perform operations that include (1) creating new data science models, (2) deploying data science models, and (3) deriving insights based on the outputs of deployed data science models. The types of data science models that may be created and/or deployed by the data analytics module 310 (and the corresponding insights produced based on such data science models) may take various forms.

One type of data science model that may be created and/or deployed by the data analytics module 310 may take the form of an "event prediction model," which is a data science model that is configured to predict whether a given type of event is likely to occur within some period of time in the foreseeable future (sometimes referred to as an "event duration" or an "event window"). The given type of event that is predicted by such an event prediction model may take various forms, including but not limited to a given type of failure at an asset (e.g., a failure of a particular type of asset component or a failure of a particular asset subsystem), a given type of change in an asset's operation (e.g., an asset shutdown), a given type of external event that may impact an asset's operation (e.g., a particular weather event or a particular change in an environment where an asset is operating), among other possibilities.

Further, the input data for an event prediction model may generally include any type of data that may be suggestive of whether or not an event occurrence of the given type is forthcoming. In this respect, depending on the given type of event, the event prediction model's input data may take any of various forms. For instance, when the given type of event is related to the operation of an asset (e.g., an asset failure), the input data may include operating data for the asset (e.g., sensor data, abnormal-conditions data, and/or data derived therefrom), asset maintenance data for the asset, and/or environmental data for the asset, among other possibilities. The input data for an event prediction model may take various other forms as well.

Further yet, the output of an event prediction model may take various forms. In one implementation, an event prediction model may be configured such that each time it evaluates input data to render a prediction of whether an event occurrence of the given type is forthcoming, the event prediction model may output a metric reflecting a likelihood of the given type of event occurring within some period of time in the foreseeable future (e.g., within the next 2 weeks), such as a predicted probability of the given type of event occurring that may be represented on a scale of 0 to 100, 0.0 to 1.0, etc. However, the output of an event prediction model may take various other forms as well.

Still further, the insights that may be derived based on the output of an event prediction model may take any of various different forms. For instance, an insight derived based on the output of an event prediction model may take the form of an indication that the given type of event is likely enough to occur in the foreseeable future that it may warrant further attention. In this respect, such an insight may be derived by evaluating whether the output of the event prediction model satisfies threshold criteria for determining whether the likelihood of the given type of event occurring in the foreseeable future is high enough to warrant further attention. For example, in an implementation where an event prediction model's output takes the form of a predicted probability of the given type of event occurring within some period of time in the foreseeable future, the threshold criteria may take the form of a threshold probability (e.g., a probability of 75%) that, when met, triggers the data analytics module 310 to produce an insight indicating that the given type of event is likely enough to occur in the foreseeable future that further attention may be warranted. Other examples are possible as well.

In addition to providing an indication that the given type of event is likely enough to occur in the foreseeable future that further attention may be warranted, the insight derived based on the output of an event prediction model may include other information as well, examples of which may include an indication of the severity level of the given type of event that is predicted to occur and/or a recommendation that is based on the prediction that the given type of event is likely to occur in the foreseeable future (e.g., a recommended operating mode of the asset that is determined based on both the model's output and the severity level of the given type of failure), among other possibilities. An insight derived based on the output of an event prediction model may include other information as well.

It should be understood that the foregoing discussion of event prediction models is merely provided for purposes of illustration, and that the data analytics module 310 may be configured to create and/or deploy event prediction models that take other forms as well. For instance, the data analytics module 310 may be configured to create and/or deploy a "combined" event prediction model that comprises a collection of multiple individual event prediction models and is configured to evaluate whether any one or more different types of events are predicted to occur within some period of time in the future. One specific example of such a combined event prediction model may comprise a collection of individual failure models that are each configured to evaluate whether a respective failure type of a group of failure types is predicted to occur at an asset in the foreseeable future, and the output of such a model may take the form of a metric reflecting a likelihood of at least one failure type in the group of failure types occurring at the asset in the foreseeable future (or the complement thereof).

Further details regarding event prediction models that may be created and/or deployed by the data analytics module 310 can be found in U.S. application Ser. Nos. 14/732,258, 16/125,335, and 16/256,992, which are incorporated by reference herein in their entirety.

Another type of data science model that may be created and/or deployed by the data analytics module 310 may take the form of a "anomaly detection model" (sometimes referred to as a "system anomaly model"), which is a data science model that is configured to evaluate whether multivariate data from a set of related data channels, or univariate data from a single data channel, is anomalous relative to the "normal" behavior for that set of related data channels, or single data channel, using techniques such as principal component analysis (PCA), kernel-based methods, autoencoders, or autoregression, among other possibilities. Such an anomaly detection model may take various forms.

For instance, the set of related data channels to which such an anomaly detection model may be applied could take various forms. As one possible example, the set of related data channels may take the form of a set of data channels that are associated with the operation of a particular component or subsystem of an asset (e.g., an asset's engine, cooling system, etc.), in which case the anomaly detection model's output may provide an indication of whether there is a potential problem with that particular component or subsystem of the asset. However, the set of related data channels may take other forms as well.

Further, the output of an anomaly detection model may take various forms. In one implementation, an anomaly detection model may be configured to (1) for each snapshot of data for the set of related data channels that is input into the model, determine a "score" that is reflective of how much the snapshot of data differs from "normal" behavior for the set of related data channels, and then (2) evaluate the "score" for each snapshot of data using a set of anomaly thresholds to determine whether that snapshot of data exceeds any of the anomaly thresholds such that it should be deemed an "exceedance." Thus, in such an implementation, the anomaly detection model's output may comprise an indication of the extent to which the input data for the set of related data channels is considered to be anomalous, where such an indication may take the form of a count or a rate of exceedances that have been detected over some prior window, among other possibilities. However, the output of an anomaly detection model may take other forms as well.

Further yet, the insights that may be derived based on the output of an anomaly detection model may take any of various different forms. For instance, an insight derived based on the output of an anomaly detection model may take the form of an indication that the input data for the set of related data channels has been anomalous enough to be deemed an "anomaly" that is indicative of a potential problem worthy of further attention. In this respect, such an insight may be derived by evaluating whether the output of the anomaly detection model satisfies threshold criteria for determining whether the input data for the set of related data channels has been anomalous enough to warrant further attention. For example, in an implementation where an anomaly detection model's output takes the form of a count or rate of exceedances over some prior window, the threshold criteria may take the form of a threshold count or rate of exceedances that, when met, triggers the data analytics module 310 to produce an insight indicating that the input data for the set of related data channels has been anomalous enough to be deemed an "anomaly" that is indicative of a potential problem worthy of further attention. Other examples are possible as well.

In addition to providing an indication that the input data for the set of related data channels has been anomalous enough to be deemed an "anomaly," an insight derived based on the output of an anomaly detection model may include other information as well, examples of which may include a measure of how significant the anomaly is and/or a recommendation that is based on the detection of the anomaly. An insight derived based on the output of an anomaly detection model may include other information as well.

It should be understood that the foregoing discussion of anomaly detection models is merely provided for purposes of illustration, and that the data analytics module 310 may be configured to create and/or deploy anomaly detection models that take other forms as well. Further details regarding anomaly detection models that may be created and/or deployed by the data analytics module 310 can be found in U.S. application Ser. Nos. 15/367,012, 15/788,62, and 16/161,003, which are incorporated by reference herein in their entirety.

Still another type of data science model that may be created and/or deployed by the data analytics module 310 may take the form of an "outlier detection model" (sometimes referred to as a "channel anomaly model"), which is a data science model that is configured to evaluate whether data from a single data channel is anomalous relative to the "normal" behavior for that data channel by fitting one or more empirical distributions from historical data and comparing current values to those distributions, among other techniques. Such an outlier detection model may take various forms.

For instance, the data channel to which such an anomaly detection model may be applied could take any of various forms, one example of which may include data from a particular sensor at an asset, among other possibilities.

Further, the output of an outlier detection model may take various forms. In one implementation, an outlier detection model may be configured to (1) for each snapshot of data for the data channel that is input into the model, determine a "score" that is reflective of how much the snapshot of data differs from "normal" behavior for the data channel, and then (2) evaluate the "score" for each snapshot of data using one or more anomaly thresholds (e.g., a "high" threshold, a "low" threshold, or both) to determine whether that snapshot of data exceeds at least one anomaly threshold such that it should be deemed an "exceedance." Thus, in such an implementation, the outlier detection model's output may comprise an indication of the extent to which the input data for the data channel is considered to be anomalous, where such an indication may take the form of a count or a rate of exceedances that have been detected over some prior window, among other possibilities. However, the output of an outlier detection model may take other forms as well.

Further yet, the insights that may be derived based on the output of an outlier detection model may take any of various different forms. For instance, an insight derived based on the output of an outlier detection model may take the form of an indication that the input data for the data channel has been anomalous enough to be deemed an "outlier" that is indicative of a potential problem worthy of further attention. In this respect, such an insight may be derived by comparing the output of the outlier detection model to a threshold that encodes how aggressively a data scientist wants a model to alert. For example, in an implementation where an outlier detection model's output takes the form of a count or rate of exceedances over some prior window, the threshold criteria may take the form of a threshold count or rate of exceedances that, when met, triggers the data analytics module 310 to produce an insight indicating that the input data for data channel has been anomalous enough to be deemed an "outlier" that is indicative of a potential problem worthy of further attention. Other examples are possible as well.

In addition to providing an indication that the input data for the data channel has been anomalous enough to be deemed an "outlier," an insight derived based on the output of an outlier detection model may include other information as well, examples of which may include a measure of how significant the outlier is and/or recommendation that is based on the detection of the outlier. An insight derived based on the output of an anomaly detection model may include other information as well.

It should be understood that the foregoing discussion of outlier detection models is merely provided for purposes of illustration, and that the data analytics module 310 may be configured to create and/or deploy outlier detection models that take other forms as well.

The data analytics module 310 is capable of creating and/or deploying various other types of data science models as well, examples of which may include (a) a preventative maintenance model that is configured to identify and output preventative maintenance strategies for an asset's components and/or subsystems based on historical data regarding failure modes and/or maintenance of those components and/or subsystems, (b) a recommendation model that is configured to identify and output recommended actions for maintaining, fixing, avoiding, or otherwise addressing issues with assets (including but not limited to predicted failures, anomalies, outliers, etc.), (c) a fuel model that is configured to evaluate the fuel efficiency of assets and/or operators, (d) a condition monitoring model that is configured to identify various operating conditions of assets and output recommended actions for maintaining, fixing, avoiding, or otherwise addressing such asset conditions (including but not limited to predicted failures, anomalies, outliers, etc.), (e) an image analytics model that is configured to analyze image data to determine situational change analytics, (f) a noise filtering model that is configured to filter out noise from raw data that is received from a data source, (g) a data integrity model that is configured to analyze and update maintenance records for accurate labeling of information, and (h) a custom model implemented by a data scientist, e.g. in Python code using common data science dependencies. Many other examples are possible as well.

Turning to the functionality of the data analytics module 310, the operation of creating a new data science model may be carried out in various manners. According to one implementation, the data analytics module 310 may begin the operation of creating a new data science model by establishing an initial set of model parameters for the new data science model. This initial set of model parameters may take various forms, which may depend on the type of data science model being created.

For example, if an event prediction model is being created, the initial set of model parameters for the event prediction model may include a name and/or description of the model, an identification of the given type of event to be predicted, an identification of the type(s) of assets for which events of the given type are to be predicted, an identification of the set of data channels that are to serve as inputs for the event prediction model, an identification of the event duration for the event prediction model, and threshold criteria to use for deriving insights based on the output of the model, among other possibilities.

As another example, if an anomaly detection model is being created, the initial set of model parameters for the anomaly detection model may include a name and/or description of the model, an identification of the type(s) of assets for which anomalies are to be detected, and an identification of the set of data channels that are to serve as inputs for the anomaly detection model, a "sensitivity" level of the model (e.g., in terms of how the model reacts to variability in the input data, how the model determines what qualifies as an exceedance, or both), and threshold criteria to use for deriving insights based on the output of the model, among other possibilities.

As yet another example, if an outlier detection model is being created, the initial set of model parameters for the outlier detection model may include a name and/or description of the model, an identification of the type(s) of assets for which outliers are to be detected, an identification of the particular data channel that is to serve as input for the outlier detection model, an identification of the types of outliers that are to be detected by the model (e.g., "high" outliers, "low" outliers, or both), a "sensitivity" level of the model (e.g., in terms of how the model reacts to variability in the input data, how the model determines what qualifies as an exceedance, or both), and threshold criteria to use for deriving insights based on the output of the model, among other possibilities.

The initial set of model parameters may take various other forms as well.

Further, in practice, the data analytics module 310 may establish the initial set of model parameters for a new data science model in various manners. As one possibility, the data analytics module 310 may establish certain of these model parameters based on user input (e.g., user input received from a tenant via a model configuration workflow). As another possibility, the data analytics module 310 may establish certain of these model parameters based on predefined parameters data associated with the type of data science model being created (e.g., predefined threshold criteria for deriving insights, etc.). As yet another possibility, the data analytics module 310 may establish certain of these model parameters based on an analysis of other data available to the data analytics module 310, such as the ingested asset-related data. For example, the set of data channels that is to serve as input for an event prediction model or an anomaly detection model may be established based at least in part on the data analytics module's analysis of the particular data channels that have been ingested into the platform 300. The data analytics module 310 may establish the initial set of model parameters for a new data science model in other manners as well. Further, it should be understood that the initial set of model parameters may be established based on a combination of user input, predefined parameters data, and/or data analysis by the data analytics module 310.

After establishing the initial set of model parameters for the new data science model, the data analytics module 310 may then obtain a set of training data for use in training the data science model. The process of obtaining a set of training data for use in training the data science model may be referred to as "feature engineering." This set of training data may take various forms, which may depend on the type of data science model being created.

For example, if an event prediction model is being created, the set of training data may include historical data for the set of data channels selected to serve as input for the event prediction model from times that are known to be associated with past occurrences of the given type of event being predicted (e.g., time periods that fall within the event duration of each past occurrence of the given type of event), and perhaps also from times that are known not to be associated with past occurrences of the given type of event being predicted.

As another example, if an anomaly detection model is being created, the set of training data may include historical data for the set of related data channels selected to serve as input for the anomaly detection model from times that are known to be associated with normal behavior of the entity with which the set of related data channels is associated (e.g., a particular component or subsystem of an asset).

As yet another example, if an outlier detection model is being created, the set of training data may include historical data for data channel selected to serve as input for the outlier detection model from times that are known to be associated with normal data for the data channel.

The set of training data may take various other forms as well.

Further, the set of training data may originate from various different sources. As one possibility, the set of training data may exclusively originate from sources that are associated with one particular tenant, such as assets that are owned or operated by the tenant or other asset-related data sources that are owned or operated by the tenant, in which case the data science model that is created may be specific to that particular tenant. As another possibility, the set of training data may include some data originating from sources that are associated with one particular tenant (e.g., assets and/or other operating data sources) and other data originating from sources that are not associated with any particular tenant (e.g., environmental data sources), in which case the data science model that is created may again be specific to that particular tenant but informed by a broader range of asset-related data sources that are accessible to the platform 300. As still possibility, the set of training data may include data originating from any of various different sources accessible to the platform 300 regardless of tenant association, in which case the data science model that is created may then be deployed and used by various different tenants. The set of training data may originate from various other sources as well.

Further yet, in practice, the data analytics module 310 may obtain the set of training data for use in training the data science model in various manners. As one possibility, the data analytics module 310 may first establish a set of query parameters for use in obtaining the training data, which may include the particular set of one or more data channels that are to be included in the set of training data, the general timeframe of the historical data that is to be included in the set of training data, and other applicable filters that are to be applied to the historical data that is to be included in the set of training data (e.g., data only from times that are known to be associated with past occurrences of the given type of event being predicted, data only from times that are known to be associated with normal behavior, data only from a particular universe of assets, data only from a particular tenant, etc.), among other possibilities. In this respect, as with the initial set of model parameters, the data analytics module 310 may establish the set of query parameters based on user input, predefined parameters data associated with the type of data science model being created, and/or data analysis performed by the data analytics module 310, among other possibilities. In turn, the data analytics module 310 may use the set of query parameters to access and obtain the set of training data from the core data store module 308. The data analytics module 310 may obtain the set of training data for use in training the data science model in other manners as well.

After the data analytics module 310 has obtained the set of training data, the data analytics module 310 may then apply a machine learning technique to the set of training data and thereby derive the data science model. In this respect, there are various different machine learning techniques that could be applied by the data analytics module 310 to derive the data science model, examples of which may include regression, random forest, support vector machines (SVM), artificial neural networks, Naïve Bayes, decision trees, dimensionality reduction, k-nearest neighbor (kNN), gradient boosting, clustering, and association. However, in practice, the particular machine learning technique that is applied to the set of training data may be dictated based on factors such as the type of data science model being created, the initial set of model parameters, and/or the platform provider's recommendations, among other possibilities. Further, the form of the data science model that is produced by the machine learning technique may take various forms, which may also vary depending on the type of data science model being created.

For example, if an event prediction model is being created, the machine learning technique may produce a model object that embodies a relationship between the input data values for the set of data channels that are selected to serve as the model's input and a likelihood that an event of the given type is going to occur within some period of time in the foreseeable future.

As another example, if an anomaly detection model is being created, the machine learning technique may produce (i) a model object that is used to score input data for the set of related data channels that are selected to serve as the model's input and (ii) a set of anomaly thresholds that are used to evaluate the scored data and thereby determine whether the input data is anomalous.

As yet another example, if an outlier detection model is being created, the machine learning technique may produce (i) a model object that is used to score input data for the data channel that is selected to serve as the model's input and (ii) one or more anomaly thresholds that are used to evaluate the scored data and thereby determine whether the input data is anomalous.

The form of the data science model that is produced by the machine learning technique may take other forms other forms as well.

As will be explained further herein, the performance of these data science models can be reviewed and the models can be refactored as a result of feature engineering based on model comparisons. Further, during the creation of a particular data science model, a user may supply various model configuration parameters that affect how the model behaves. In this way, the platform is built for experimentation, for providing fast feedback, and allows for users to exhibit creativity when creating data science models and other aspects of the platform.

After the data analytics platform 310 has created a new data science model in the manner described above, the data analytics platform 310 may store a representation of that data science model in the core data store module 308. Thereafter, the data science model can be deployed by the data analytics module 310.

In addition to data science models that are created by the data analytics platform 310 in the manner described above, the data analytics platform 310 may also have the capability to deploy other data science models as well. For instance, as one possibility, the platform 300 may be pre-provisioned with one or more data science models that are stored in the core data store module 308, such as data science models that have previously been created by the platform provider based on other training data that is available to the platform provider, in which case the data analytics module 310 may be capable of deploying one or more of these pre-provisioned data science models. (It should be understood that the platform provider may also periodically update the platform 310 with additional pre-provisioned data science models as well.) As another possibility, the platform 300 may provide an interface for importing "custom" data science models that have been previously created outside of the platform 300, in which case the data analytics module 310 may be capable of deploying one or more of these custom data science models. The data analytics module 310 may be capable of deploying data science models that originate in other manners as well.

Referring again to the functionality of the data analytics module 310, the operation of deploying a data science model may be carried out in various manners. According to one implementation, the operation of deploying a data science model may begin with an initial sequence of configuration functions, which may include (i) creating a new instance of a data science engine (DSE), which is a particular type of platform service that is designed to execute data science models, (ii) configuring the DSE to execute a particular data science model (e.g., an event prediction model, an anomaly detection model, an outlier detection model, an preventative maintenance model, a recommendation model, a fuel model, a condition monitoring model, a noise filtering model, and/or a data integrity model, among other possibilities), and (iii) establishing one or more pipelines that are configured to transfer data that has been ingested for the model's one or more input data channels from the core data store module 308 to the DSE. Thereafter, the DSE may begin executing the data science model based on data that is provided to the DSE via the one or more pipelines and outputting the results of the data science model, which may be stored in the core data store module 308.

Depending on the implementation, the particular approach employed by the DSE for executing a data science model may also take various forms. For instance, in one implementation, the DSE's approach for executing a data science model may have three defining characteristics that are designed to improve the perform of model execution. First, the DSE may employ a "streaming" approach to executing a data science model, in the sense that the DSE may watch for the arrival of relevant data for a data science model and only produce a new model result when "triggered" by the arrival of such relevant data. Second, the DSE's approach to executing a data science model may be "stateful," in the sense that the DSE may include its own data store, which avoids the need for redundant data to be provided to the DSE each time it re-runs the data science model (e.g., in a scenario where the data science model is to be applied to a rolling window of data for its input data channels). Third, the DSE is designed to handle "heterogeneous" data (e.g., seamless merging of multiple data sources whose observations may have different schemas, arrive at different frequencies, exhibit different data lateness, etc.) during the execution of a data science model. However, it should be understood that these aspects of the DSE's approach to executing a data science model are merely exemplary, and that the DSE's approach to executing a data science model may take various other forms as well.

The foregoing approach for creating and deploying data science models may result in various advantages. For instance, the process described above for establishing the initial set of model parameters and engaging in feature engineering to obtain the set of training data is easily scalable, in that the process can be utilized for smaller, local implementations as well as for larger scale implementations without impacting the runtime.

In addition, DSEs may provide a standardized deployment and operations runtime for the data science models regardless the various individual characteristics of different data science models. More particularly, the DSE configurations described above account for the myriad ways in which client data is integrated and thus the data science models do not need to account for this complexity. This leads to an improved reusability and generally decreases the problem space that data models must accommodate. Further, DSEs may handle the complexity of bin-packing and orchestration. This means that data science models themselves do not need to account for capacity planning and thus the platform may be scaled up and used with new and varied client data integrations without reforming the data science models.

Referring once more to the functionality of the data analytics module 310, while a DSE is executing a data science model and producing model outputs, the data analytics module 310 may also derive insights based on results produced by the model. In line with the discussion above, these insights may take various forms, which may depend in part on the type of data science model being executed. Further, in line with the discussion above, the function of deriving insights based on results produced by the model may generally involve (i) evaluating whether each result produced by the model satisfies certain threshold criteria associated with an insight of a given type and (ii) if the threshold criteria is met, creating and storing an object that represents the insight in the core data store module 308. However, the function of deriving insights based on results produced by a data science model may take other forms as well.

D. Application Service Module 312

The application service module 312 may be configured to create and drive applications that make use of asset-related data ingested into the platform via data ingestion module 302 and/or insights generated by data science platform 300 based on such asset-related data. An application may generally be a software module that is configured to present asset-related data, insights, or the like to a user in various forms and/or take an action responsive to detecting some trigger or other threshold associated with the platform data. An application may also be configured to receive user input, such as user requests and/or user data. Applications may perform other functions as well. Examples of applications may include an asset performance management application, a service optimization application, and/or an asset dealer operations application, among other possibilities.

The application service module 312 may make available to a user certain pre-defined applications and may also provide the ability to create a new application. Such functionality may be embodied in various tools made available by the application service module 312 and discussed further herein below.

The application service module 312 may engage in various functionality that facilitates the execution of applications. The application service module 312 may facilitate this in various ways. For instance, in one implementation the application service module 312 may function as a runtime environment for the applications that are available to tenants of the platform 300. In this way, the application service module 312, in the context of executing an application, may (i) retrieve from the core data storage module 308 a set of platform configuration data that may take the form of application instructions that define the configuration, visual appearance, and functionality of an application, (ii) retrieve from the core data storage module 308 certain data called for by the application instructions, such as asset-related data, insights, or the like, and (iii) operate as a renderer by providing some or all of the retrieved data as well as other instructions to a client device (e.g., client station 106A) or other rendering device that defines the visual appearance of the application and/or how the application presents the retrieved data to a user.

As mentioned above, an application may generally take the form of program instructions (or other pseudocode) that define the configuration, visual appearance, and functionality of an application, and may be stored in the data storage module 308 as a type of object, which may be referred to as an application object. Generally, the program instructions that define an application will, among other functionality, specify what data to retrieve from core data store module 308 (e.g., asset-related data, insights, etc.), and how to visually present this data. Thus, the application service module 312, in its capacity as functioning as a runtime environment for the execution of an application, may engage in "fetch" queries of the platform's core data store module 308. In this way, the application service module 312, may, based on the platform data called for by a given application, formulate respective queries for one or more of the various data stores in core data store module 308 and process these queries.

In some cases, however, an application may call for platform data that intersects between two data different data stores. For instance, an application may call for the most recent reading of a given readings data channel. In this example, a single data source in core data store module 308 may not store data describing the most recent reading data received on this channel. Rather, the reading data store 308a may store the raw data values, whereas the non-readings data store 308b may store the times these values were received and the locations in the readings data store 308a where these values are located. To address this issue, the application service module 312 may be configured to create what is referred to as a "derived field" based on querying multiple data sources and programmatically merging or deriving the desired results. Thus, when retrieving data corresponding to a particular object, the application service module 312 may, on the fly, append a new field for this object and programmatically populate this new field with data derived by the application service module 312 based on its queries of the same of other data stores. The application data service module 312 may then utilize this new field when executing applications, even though this new field may not be ultimately stored in either the reading data store 308a, non-readings data store 308b, or any other data store. Other examples of runtime functionality may be possible as well.

Applications may perform various functions. For instance, some applications may be configured to take some action upon the occurrence of some trigger condition associated with an aspect of the platform, such as when the platform ingests new data of a particular type (e.g., new work order data) or when the platform receives an update to existing data of a particular type (e.g., an update to existing work order data). Additionally or alternatively, some applications may be configured to take some action upon the detection that certain asset-related data has reached, exceeded, or dipped to, some threshold level, and/or upon the detection of a certain type of insight. Possible responsive actions to any of these occurrences may include the application causing a module to transmit a notification (e.g., an SMS message, an email, or some other electronic notification) to appropriate personnel or the application triggering some kind of asset operation, such as an asset shut-off or kicking off a back-up system of some kind. In this way, the application service module 312 can be thought of as housing what is referred to as "business logic," in that the application service module 312 can cause the platform to carry out certain actions in response to triggering events that are specific to a particular organization. Other actions are possible as well.

It may be desirable for some applications, particularly applications that provide notifications in response to certain triggering events (e.g., the production of insights of a certain type of value, or when certain asset-related data reaches or dips to a threshold level), to persistently run in the background so that they can take action immediately (or as near as possible) upon the occurrence of the triggering event. In such cases, the platform 300 may deploy such an application as a "microservice" that can be thought of as running "independently" of the other modules of platform 300. In other words, the platform 300 may be configured to execute these microservices constantly, without waiting for any user input or user invocation of a particular application.

The application service module 312 may function to execute certain microservices that take action depending on the value or type of insight derived by the data analytics module based on the output of a data science model. In some configurations of platform 300, the data analytics module 310 may pass any derived insights to the application service module 312 prior to storing the insights in the core data store module 308 so that the application service module 312 can take any necessary immediate action. As one example, such a microservice may include a notification generator responsive to receiving a fuel data channel anomaly. The data analytics module 310 may deploy a data science model configured to detect anomalies associated with data channels relating to fuel levels (e.g., data channels for fuel consumption, data channels for fuel level, etc.) and, based on the output of such a mode, may derive insights indicating that these data channels are experiencing anomalous behavior. In response to receiving an indication that the data analytics module 310 has derived such an insight, the application service module 312 may be configured to transmit a notification to appropriate personnel (such as an asset manager or operator) so that the anomaly can be rectified before it results in a negative outcome, such as asset downtime or an asset failure). Other examples of microservices that may be executed by application service module 312 are possible as well.

In addition, conditional actions that may be enabled by the application service module 312 (such as the example set forth above) may allow for the ability to appropriately address operational aspects that are desired by a particular tenant. For example, for some tenants, it may be desired to track a particular set of asset failures while disregarding another particular set of assets, which may be desired to be tracked but not acted on immediately. The application service module 312 may enable this functionality. Additional functionality of the application service module 312 is described below in connection with the various platform configuration tools.

E. Interface Module 314

The platform 300 may also include an interface module 314, which as a general matter, may be configured to make the platform's functional modules accessible to external computing devices. The interface module 314 may do this by providing various APIs, services, or the like, whereby accessing such an API or subscribing to such a service external computing devices may connect to the platform, receive asset-related data and/or insights from platform 300, and/or provide data to the platform 300. As examples, platform 300 may be configured to utilize interface module 314 to output asset-related data and/or instructions for receipt by other output modules, such as third-party data platforms, assets, work-order systems, parts-ordering systems, or the like. External computing devices may receive asset-related data and/or insights from the platform 300 in other manners as well.

F. Core Data Store Module 308

The core data store module 308 may be configured to persistently store various different types of data for the platform 300, including asset-related data, model results and insights, alerts, and platform configuration data.

For instance, one type of data stored in the core data store module 308 may take the form of asset-related data that has been ingested by the data ingestion module 302 and passed through one or more pipelines via the data transformation module 306. In this respect, asset-related data passed through one or more pipelines via the data transformation module 306 may be persistently stored in an appropriate location in the core data store module as dictated by the various data sinks of the one or more pipelines. Within the core data store module 308, at least certain portions of the asset-related data may adhere to a predefined schema for the platform 300, and in this way, certain downstream services of the platform 300 (e.g., data science applications and/or applications) can make use of such data without little to no additional configuration of those services. Thus, the data ingestion module 302 and data transformation module 306 function together as a mechanism configured to receive a tenant's asset-related data in any of a number of different formats, convert it to a uniform format, and store it in a persistent data store so that certain predefined models can utilize this asset-related data.

Further, in addition to storing asset-related data that has been ingested for a tenant, the core data store module 308 may also store other asset-related data as well. For instance, as one possibility, the core data store module 308 may store asset-related data ingested from data sources that are not associated with any particular tenant, such as environmental data sources (e.g., a weather data source, traffic data source, etc.). As another possibility, the core data store module 308 may store asset-related data that is curated by the platform provider itself. One specific example of a curated asset-related dataset may take the form of an "asset library" that includes curated information about possible failure modes and maintenance strategies for various different types of components and/or subsystems for assets of various different types. Another specific example of a curated asset-related dataset may take the form of a curated environmental dataset that is created by the platform provider based on data received from other environmental data sources. The asset-related data stored in the core data store module 308 may take various other forms as well. As with asset-related data originating from a tenant, this asset-related data can be used by the data analytics module to run data science models and/or derive insights, and can also be presented to users via the application service module, among other possibilities.

Another type of data stored in the core data store module 308 may take the form of model results and/or insights that are derived by the data analytics module 310 based on asset-related data.

Yet another type of data stored in the core data store module 308 may take the form of alerts or the like that are generated by the application service module 312 based on asset-related data, model results, and/or insights.

Still another type of data stored in the core data store module 308 may take the form of platform configuration data, which may generally define the configuration of the platform 300 and its functional modules. As examples, platform configuration data may include data describing a tenant's schema (such as objects, records, etc.), data describing the connections (such as connector configuration data and connection configuration data), data describing pipelines (such as data describing source components, transformations, and sink components of pipelines), data related to the data analytics operations (such as data science model configuration data), and data related to the application service module, and/or data related to the application service module.

In some implementations, core data store module 308 may include at least two persistent data stores, each of which may be specially configured to store the platform configuration data as well as different types of asset-related data. In one particular implementation, core data store module may include a readings data store 308a that may be configured to store high-volume readings data, and a non-readings data store 308b that may be configured for storing non-readings data as well as the platform configuration data. However, other implementations are possible in which core data store module 308 includes more or fewer data stores, as well as data sources configured to store other kinds of data.

As a general matter, readings data may refer to asset-related data that is collected on a "high-volume" basis. For instance, readings data may include time-series data that is ingested from data channels that provide data readings at a rate of hundreds, thousands, tens of thousands, hundreds of thousands, or even millions of times per second. The readings data store 308a may be advantageously optimized for high-speed write actions, although this may sacrifice some ability to perform fast read actions. The readings data store 308a may employ technology such as Apache Cassandra, among other possibilities.

Non-readings data may refer to asset-related data that is collected aperiodically (such as fault-code data channels, work-order data channels, repair activity data channels, etc.)

or data that is collected periodically but may not rise to the level of what may constitute "high-volume" (such as data that may be ingested from data channels that provide data readings on a per minute or per hour basis).

Additionally, non-readings data store 308b may store model results, insights, alerts, or the like that are derived by the platform 300.

Additionally yet, as also mentioned, non-readings data store 308b may store platform configuration data, which may take various forms. As one example, the platform configuration data may include schema configuration data. Schema configuration data may include data describing a tenant's schema as well as data describing any pre-packaged objects or packages of objects available for use by a tenant. Such data may include data describing the objects that comprise the tenant's schema and the pre-packaged objects, including the properties of such objects (e.g., the data fields, the records, the views, the relationships, etc.). The non-readings data store 308b, is some embodiments, is specially designed to flexibly model tenant and platform schemas (e.g., both well-proven systems that have been deployed for over 25 years in the field and brand new APIs delivered as third-party integrations).

As another example, platform configuration data may include ingestion configuration data. Ingestion configuration data may include data describing connectors and connections, including connector configuration data and connection configuration data, examples of which are described below in connection with platform tools.

As another example, platform configuration data may include pipeline configuration data. Pipeline configuration data may include data describing the various pipelines used by the data transformation module 306, including describing the source components, the transformations, and the sink components of various pipelines, examples of which are described below in connection with platform tools. Pipeline configuration data may also include data describing pipelines that able to, but may not yet, be established, such as possible pipelines that have been or may be suggested by the data transformation module, examples of which are also described below in connection with platform tools.

As yet another example, platform configuration data may also include data defining data science models that have been created and/or deployed by the data analytics module 310 as well as any associated threshold criteria for generating insights based on the outputs of such data science models.

As yet another example, and as mentioned above, platform configuration data may include data that defines applications that are driven by the application service module 312. Data that defines applications may include data and/or instructions that defines the various visual components used by the application to present information to a user as well as how the application presents this data to a user. Such data and/or instructions may include data and/or instructions that define the visual appearance of a application (e.g., a GUI) through which the data is to be presented to a user. Data and/or instructions that define the visual appearance of a application may take various forms, examples of which may include Hypertext Markup Language (HTML), Cascading Style Sheets (CS S), and/or JavaScript, among other possibilities.

As yet another example, platform configuration data may include ingestion metric data. Ingestion metric data may include data that describes various aspects of the ingested asset-related data, including by way of example, data describing how many data channels are ingested by the data ingestion module 302, how often the data ingestion module 302 ingests data from each channel, how long ago did certain channels ingest certain types of data, and where the data ingested from various data channels is stored within the readings data store, among other possibilities.

Those of skill in the art will appreciate that the foregoing examples were merely illustrative and in practice the non-readings data store may be used to store other types of data and data produced by the other modules.

The core data store module 308 may generally employ technology that functions to communicate certain aspects of the core data storage module 308 to the other functional modules of platform 300. As one non-limiting example, core data store module 308 may operate to communicate to the application service module 312 when either or both of the readings data store 308a and the non-readings data store 308b engage in an insert operation, a update operation, and/or a delete operation. As mentioned above, the application service module 312 may itself, or through the execution of one or more applications, monitor these communications and take one or more responsive actions upon the detection of a qualifying event. For instance, the application service module 312 may be configured to detect the insertion of new work-order data into the core data store module 308, and when application service module 312 detects the insertion of any new work-order data, the application service module 312 may function to notify appropriate personnel (e.g., a repair facility manager) of this occurrence. Other examples are possible as well.

Non-readings data store may generally employ technology that facilitates ad-hoc querying of non-readings data store, such as PostgreSQL, among others. To this end, platform 300 may, as a general matter, provide a user interface that allows a user to issue ad-hoc queries to non-readings data store and to view the results of such queries. Additionally, other modules of platform 300 may issue ad-hoc queries to non-readings data store to facilitate the features and functionality employed by the individual modules, and these modules may issue such ad-hoc queries with or without the use of a user interface. By way of example, various modules of platform 300 may access the non-readings data store by issuing HTTP requests, although other examples of accessing the non-readings data store are possible.

As a result of (i) being deployed alongside a separate, high-volume readings data store, (ii) storing the various types of data described above, and/or (iii) employing technology that facilitates ad-hoc querying, the non-readings data store 308b may advantageously function as a kind of "data service." In this respect, the non-readings data store 308b may be used to "sample" high-volume data without disturbing the intake process of such high-volume data. For example, the non-readings data store 308b may support queries in the nature of "how many battery voltage readings has the platform ingested over the last month," or "what are the makes and models of any asset that has had a battery voltage below 7.0 volts in the last 18 hours." This ability to generalize data analysis and make it available to tenants using a uniform schema through sampling (i.e., allowing the platform to derive and curate additional data sets) advantageously improves the ability of the platform to reduce the time it takes to generate actionable insights.

Moreover, because the non-readings data store 308b may be used to store data describing where within the readings data store certain ingested data is stored, the non-readings data store 308b may provide this data to the other modules of platform 300 to facilitate more efficient operation. As one example of this, if a particular data science model designed to receive as an input a particular high-volume, time-series data channel, the data analytics module 310 (described further below) may first query the non-readings data store 308b for information describing the particular high-volume, time-series data channel. In response, the non-readings data store 308b may return to the data analytics module 310 information identifying where in the readings data store 308a the particular high-volume, time-series data channel data is stored. By way of example, this information may include an ID or set of IDs that identify which records in the readings data store 308a correspond to the particular high-volume, time-series data of interest. The data analytics module 310 may utilize this information to engage in a more focused read operation of the readings data store 308a, which may help to conserve processing resources that may otherwise be consumed by the readings data store 308a and the data analytics module 310. Although the foregoing examples were merely illustrative, the core data store module may, in some implementations, include additional data stores and/or data stores that employ other technologies. For instance, in other implementations high-volume, time-series data channel data may be "enriched" with contextual data prior to consumption. In this way, the platform provides flexibility to choose whether to optimize on read operations or write operations.

G. Other Data Services

The foregoing description of platform 300 has been by way of reference to various exemplary functional modules. These functional modules can be thought of as representing packages of inter-related services that the platform 300 is configured to, as a whole, engage in. For instance, the data ingestion module 302 can be thought of as representing a package of services related to ingesting asset-related data from one or more data sources so that the data can be passed to the other platform modules or services, including a staging date store; the data transformation module 304 can be thought of as representing a package of services related to retrieving ingested asset-related data from the staging data store 304, optionally applying one or more transformations to the asset-related data, and storing the data in an appropriate location within the platform's core data store module 308; the data analytics system 310 can be thought of as representing a package of services related to evaluating asset-related data ingested by the platform 300 using various data science models, and the application service module 312 can be thought of as representing a package of services related to creating and driving applications that make use of asset-related data ingested into the platform. It should be understood that the features, functionality, and services described above may be organized or packaged together in various other manners, and, in this way, the modules mentioned above can take other forms, or be thought of as representing different or additional packages of services.

It should also be understood that platform 300 may also include, in one way or another, various other services, such as services that process asset-related data to produce insights, which may in turn be stored in the core data store module 308. However, these other services can operate to process data other than asset-related data, such as processing insight data to produce additional insights, or the like. In general, the platform may be configured to employ a service that processes any data available in the platform, whether ingested directly by the platform, transformed by the platform, or otherwise generated by the platform or by a tenant or other user of the platform. These services may, like other services, produce output data as a result of their processing and then store that output data back in the core data store system 308. Other examples of services are possible as well.

V. PLATFORM CONFIGURATION TOOLS

As indicated above, platform 300 may provide various tools that facilitate establishing and customization of certain platform configuration data. As a general matter, the tools provided by the platform may take the form of end-user facing software modules made accessible to a user via a GUI. To help describe these various tools, several flow diagrams are described herein. It should be understood that such flow diagrams are provided for the purposes of illustration, and while the example operations embodied by the blocks in the various flow diagrams are described as being carried out by platform 300, it should be understood that other platforms or other entities may perform the example operations. Likewise, it should be understood that the disclosed processes are merely described in this manner for the sake of clarity and explanation and that example embodiments may be implemented in various other manners, including the possibility that certain functions may be added, removed, rearranged into different orders, combined into fewer blocks, and/or separated into additional blocks, depending upon the particular embodiment.

A. Data Ingestion Tools

Figure 4A:
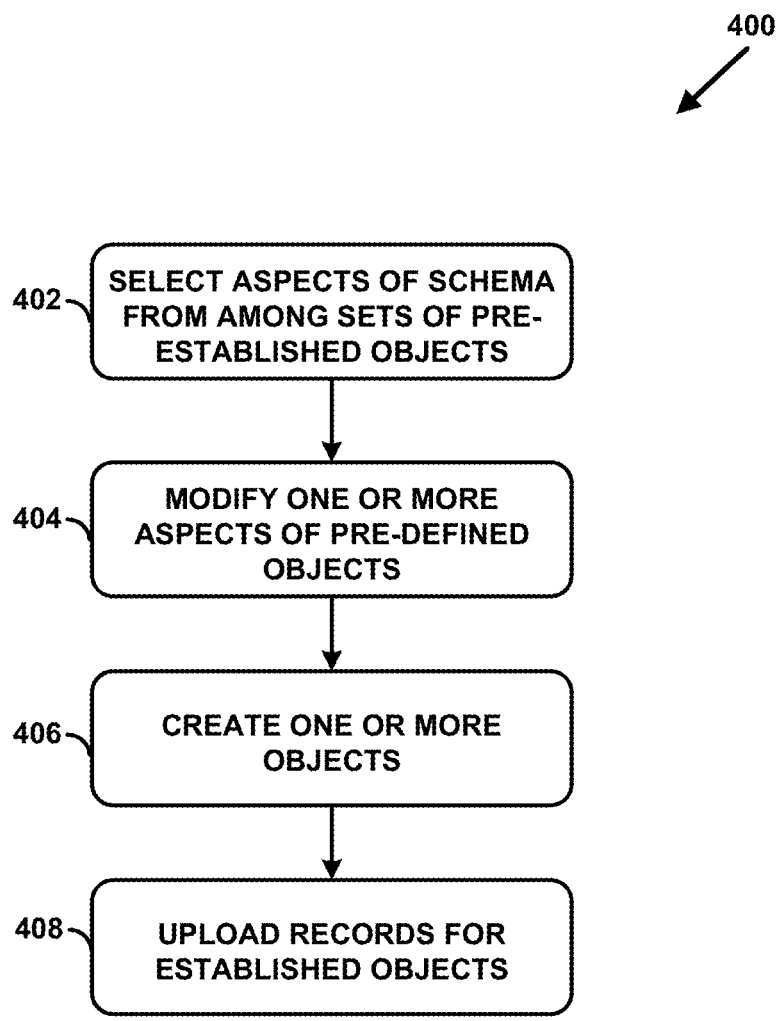
FIG. 4A is a flow diagram showing some example operations that may be included in a process for configuring a tenant's schema, according to an example embodiment.

One type of tool that the platform may provide is a schema configuration tool that facilitates configuration of a tenant's schema. The tool may provide various functionality. To help illustrate such functionality, FIG. 4A is a flow diagram 400 that depicts several example steps.

Turning first to block 402, the schema configuration tool may provide the ability to select various aspects of a schema from among sets of pre-established objects.

For instance, the platform 300 may maintain in the non-readings data store 308b certain pre-established objects and relationships and may make these pre-established objects available for use by tenants. The platform 300 may also provide sets of pre-established objects, which are organized into packages based on industry type. As one example, platform 300 may provide a "wind-turbine" package comprising a set of objects that may be specific for tenants that operate in the wind-turbine industry. Similarly, platform 300 may provide a "vehicle" package comprising a set of objects that may be specific for tenants that operate with vehicle assets, such as shipping companies. Other packages are possible as well. Providing pre-defined packages of objects may reduce the complexity of establishing a tenant's schema. In this way, the platform 300 may facilitate a more efficient setup process for new tenants, which, among other advantages, may decrease the time required before a new tenant can begin to onboard its data to the platform 300 and to receive insights.

The platform 300 may make these pre-established objects and/or packages of objects available to tenants through a GUI. And through this GUI, a tenant may select pre-established objects for use in the tenant's schema. For example, the platform 300 may provide a menu or other listing of certain pre-packaged objects from which a user can select one or more pre-packaged objects or relationships and adopt them as part of a tenant's schema. Once a pre-packaged object is selected by a user, the platform 300 may store in non-readings data store 308b in indication that the pre-packaged object is now part of the tenant's schema. Other ways of selecting various aspects of a schema from among sets of pre-established objects may be possible as well.

Turning next to block 404, the schema configuration tool may provide the ability to modify one or more aspects of the pre-defined objects. For instance, the platform may provide through a GUI various menus through which a user may select a pre-defined object, select a property of that object, and then provide a user input that modifies that property (e.g., to rename a pre-established object field, add a new field, etc.).

Figure 5A:
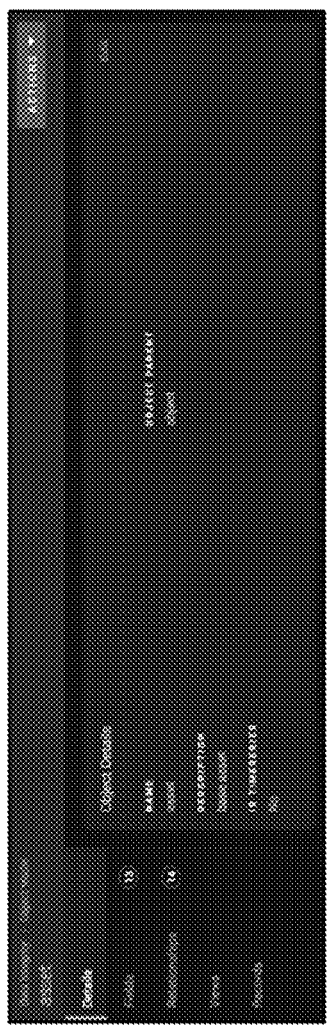
FIG. 5A is a snapshot of a GUI that may be provided by an example schema configuration tool, according to an example embodiment.

To illustrate this, FIG. 5A depicts an example snapshot of a menu 502 for an "asset" object that may be provided by the schema configuration tool through a GUI. Though this menu 502, the platform 300 may receive user inputs to modify certain aspects of the "asset" object. For instance, the menu 502 may provide various pages that display certain properties of the "asset" object, such as "Details," "Fields," "Relationships," "Views," and "Records." As depicted in FIG. 5A, the "Details" page may be selected in order to display certain details about the object, such as the object's name, description, whether the object is a time-series object, and what the object's parent is. As described above, an object parent may refer to an object from which the current object inherits certain properties. As also depicted, the menu may provide the ability to select an "edit" button, which may then provide the ability to edit various details displayed on the page. Other ways of providing the ability to modify one or more aspects of the pre-defined objects may be possible as well.

Figure 5B:
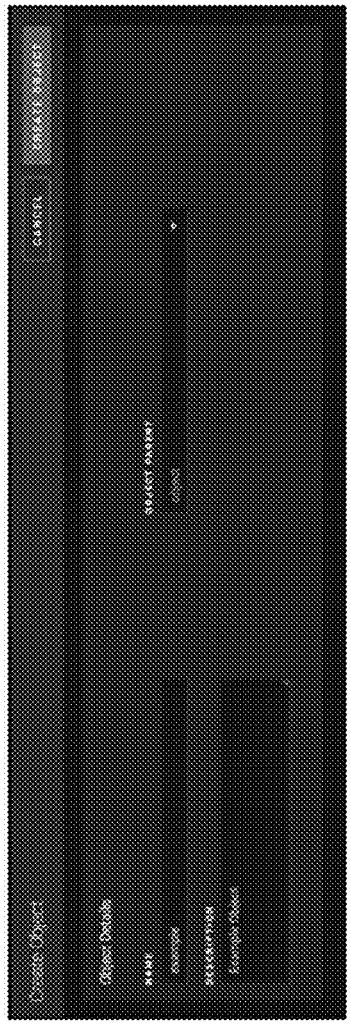
FIG. 5B is a snapshot of a GUI that may be provided by an example schema configuration tool, according to an example embodiment.

Turning next to block 406, the schema configuration tool may provide the ability to create one or more objects. For instance, the platform may provide various menus through which a user may provide user input to create a new object and provide certain definitional information for that object. To illustrate one example of this, FIG. 5B depicts an example snapshot of an object creation page 504 that maybe provided by the schema configuration tool through a GUI. Via this page 504, the platform 300 may receive user inputs to provide a name for the new object, a description for the new object, and a drop-down list to select a parent for the new object from which the new object may inherit certain properties, such as fields, relationships, views, etc. The page 504 may also provide a "create object" button, which when selected by a user may cause the platform 300 to store the new object in non-readings data store 308*b*. Other ways to create one or more objects are possible as well.

Turning next to block 408, the schema configuration tool may provide the ability to upload records for established objects. For instance, the platform may provide a record-upload page for an object through which a user may provide user inputs to upload a file that contains records for that object. To facilitate this upload, the platform 300 may generate and make available to tenants a template file (e.g., a CSV file) formatted specifically for the object for which the user is uploading records. For instance, if a given object has 25 data fields, some of which may have been part of a pre-established object and some of which may have been defined by a user, the platform 300 may generate and make available to the user a template file formatted specifically with these 25 fields, so that a user can add records to this template file and upload the template file to platform 300. Once received, the platform 300 may store the records in non-readings data store 308*b*.

Figure 5C:
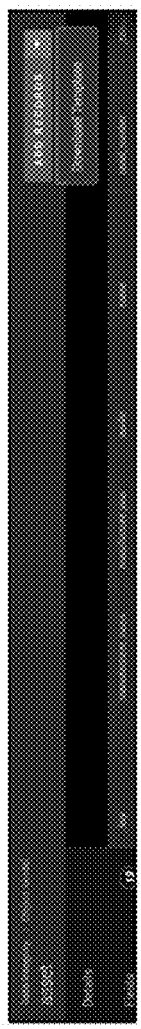
FIG. 5C is a snapshot of a GUI that may be provided by an example schema configuration tool, according to an example embodiment.

To help illustrate, FIG. 5C depicts an example snapshot of a record upload page 506 for an example "asset" object that may be provided by the schema configuration tool through a GUI. On this record upload page 506, the platform 300 may receive a user input to download a generated template, such as by selecting the "download template" button. Once a template is downloaded, the "download template" button may change to an "upload records" button, which when selected may cause platform 300 to provide a file-selection window through which a user can provide to the platform the template form filled in with the user's records. Other ways to provide the ability to upload records for established objects are possible as well.

Figure 4B:
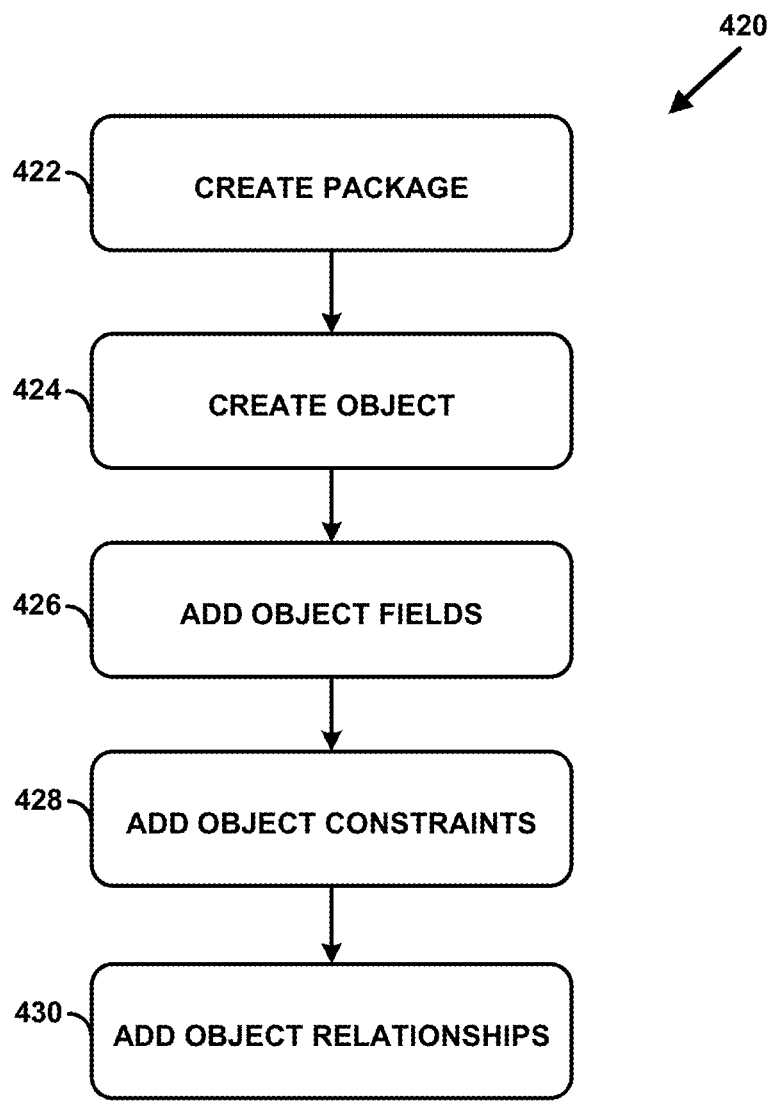
FIG. 4B is a flow diagram showing some example operations that may be included in a process for creating an object, according to an example embodiment.
Figure 4C:
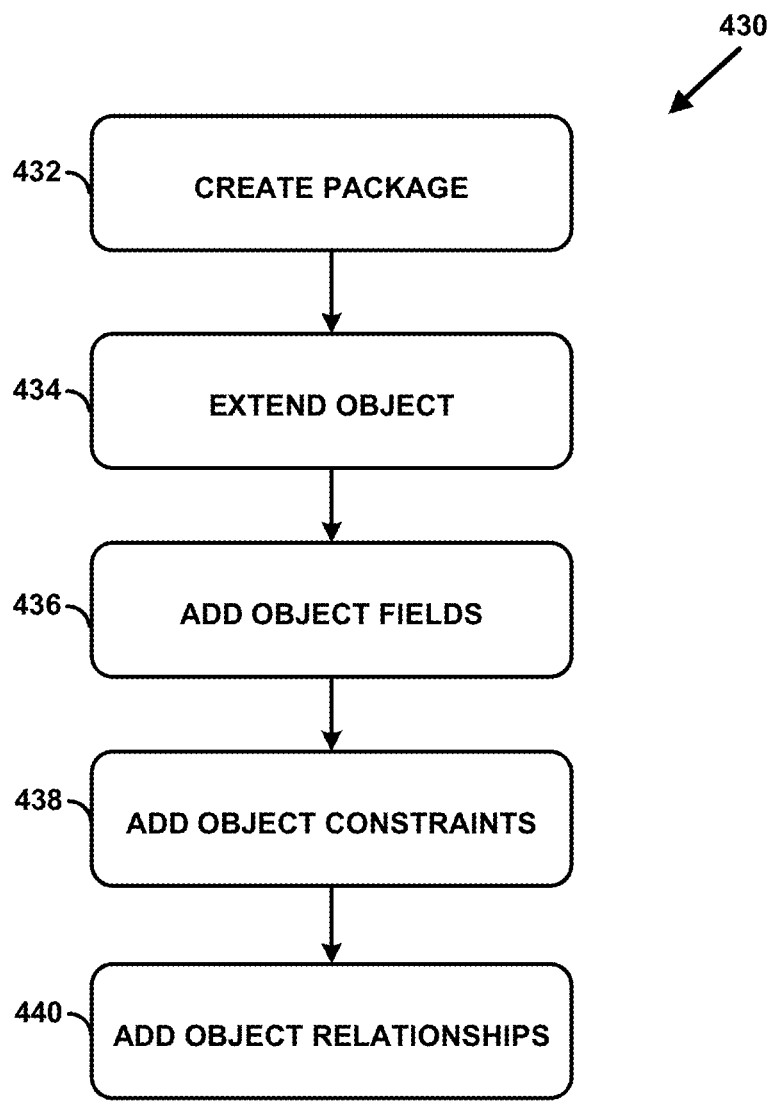
FIG. 4C is a flow diagram showing some example operations that may be included in a process for extending an object, according to an example embodiment.

In addition to creating objects, as mentioned above with respect to block 406, the schema configuration tool may also provide the ability to create an entire schema from scratch as well as extend existing objects. As mentioned, the platform 300 may enable dynamic schema creation which allows the platform provider as well as platform tenants to create custom schema representing real-world processes, workflows, ontologies, and dependencies. Object and schema creation on the platform may take any of various forms, examples of which are described below with respect to FIGS. 4B and 4C, which depict respective example flow diagrams 420 and 440. To facilitate processes such as these, the schema creation tool may provide various GUIs, though which a user may provide various user inputs in order to engage with the schema creation tool and establish the aspects of the schema.

Turning first to flow diagram 420, at block 422 object creation may begin with the schema creation tool creating a package. As used herein, a package is generally a namespace that defines a versioned boundary for object definitions. Creating a package functions to namespace and version the object definitions categorically. This allows users (which in this context may be referred to as "data modelers") to decompose their problem space and group similar object definitions for evolution together. Flow proceeds next to block 424 where the schema creation tool creates the object. Here, a specific object name is established along with a description for its intended use. Next, at block 426, the schema creation tool creates object fields, which are generally "places" that are added to the object to specify each field (or column) of the object. Next, at block 428, the schema creation tool adds object constraints to the object, such as type and requirements, which are said to be "layered" on these fields. Finally, at block 430, the schema creation tool adds object relationships, which operate to link object records together and ensure validation across references between object definitions.

Turning now to flow diagram 430, an example process for extending an object is described. As mentioned, platform objects are extensible. Once they are defined, they can then be extended with new fields and new schema as desired. For example, the platform could extend the definition for asset object in the platform's industrial core package of objects with new object called truck with a new field for load capacity. When this happens the original asset object's fields and constraints are inherited by the truck asset object. Just as with a new object, the object extension must be defined within the scope of a package, and thus the schema creation tool may begin this process by creating a package, similar to that described above with respect to block 422. Once the package is created, a user may select an existing object and create a new object definition as an extension at block 434. With these new object definitions, we the schema creation tool may then add object fields (at block 436), object constraints (at block 438), and object relationships (at block 440), similar to that described above with respect to flow diagram 420. Those skilled in the art will appreciate that the foregoing was merely an example of schema creation and object extension and other ways for creating and extending schema and objects are possible as well.

Figure 6:
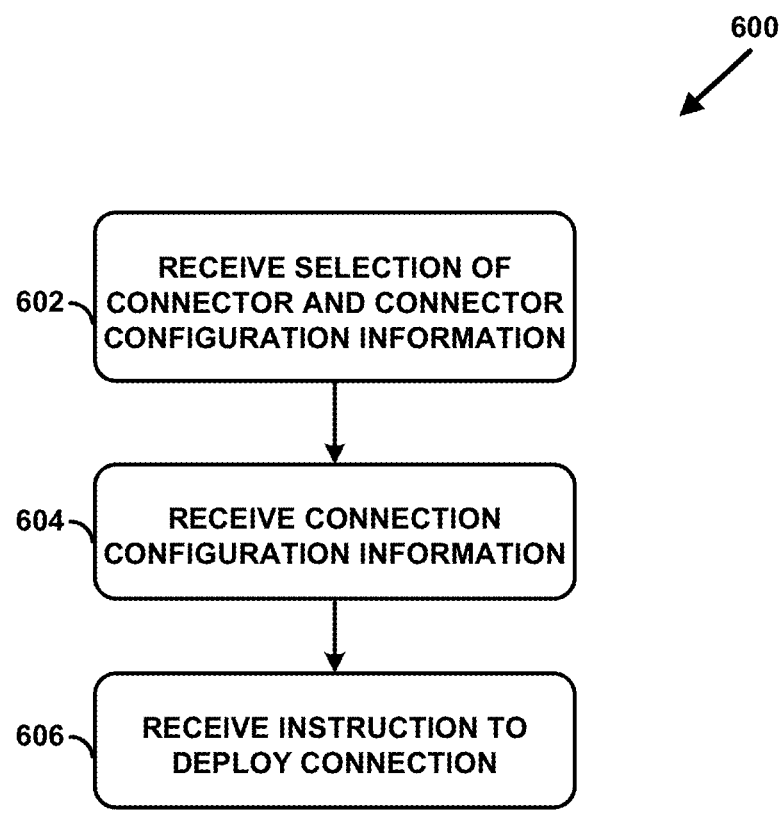
FIG. 6 is a flow diagram showing some example operations that may be included in a process for establishing, configuring, and deploying connections, according to an example embodiment.

Another type of tool that the platform 300 may provide is a connection configuration tool. The tool may provide various functionality, including the ability for a user to establish, configure, and deploy connections that function to connect the platform 300 to one or more disparate data sources (e.g., data sources 104) and receive the tenant's data from these disparate data sources into data ingestion module 302 of the platform 300. In one implementation, the connector configuration tool may include a series of screens having various form fields through which a user may enter or modify connector configuration information, among other possibilities. To help illustrate the functionality of the connection configuration tool, FIG. 6 is a flow diagram 600 that depicts several example steps.

Turning first to block 602, the connection configuration tool may facilitate the platform's receipt of a selection of a connector and certain connector configuration information to use for the connection. As described above, the platform 300 may provide certain pre-established connectors for use depending on the data format of the data source to which the connection is connection. For instance, one type of connector provided by the platform 300 may be an "Object Storage" connector, which may be used for connections to data sources that store asset-related data in "Object Storage" format. Another type of connector provided by the platform 300 may be a "Asset Telemetry" connector, which may be used for connections to data sources that store asset-related data in "Asset Telemetry" format. Other connectors may be possible as well.

Figure 7A:
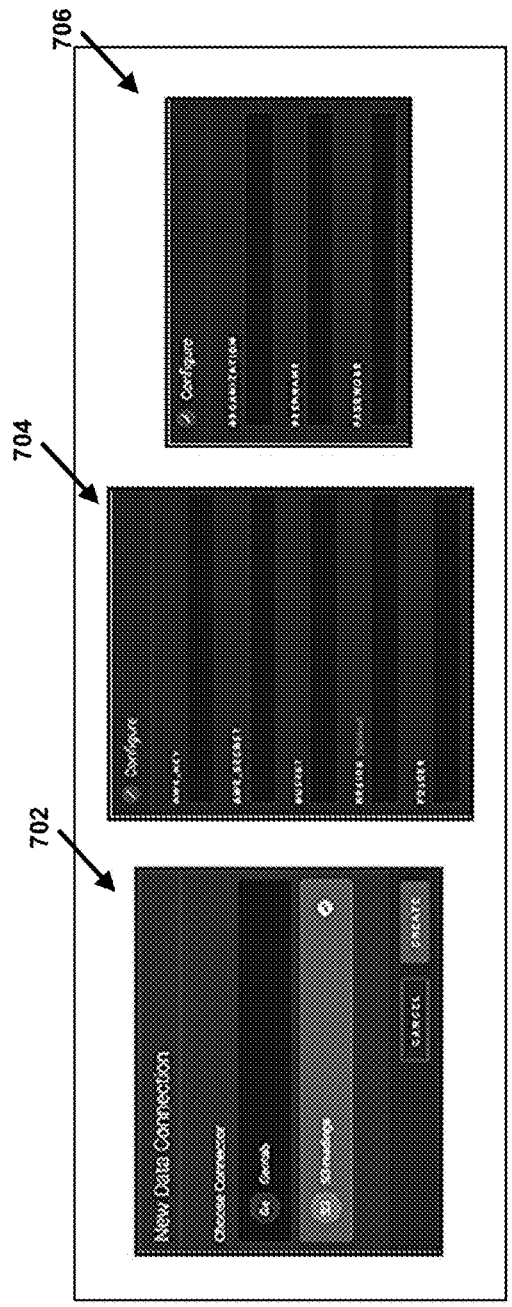
FIG. 7A is a snapshot of a GUI that may be provided by an example connection configuration tool, according to an example embodiment.

To help illustrate this, FIG. 7A depicts a set of example screens that may be provided by the connection configuration tool through a GUI. Through these screens, or similar screens, a user may select a connector and provide certain connector configuration information. As depicted, the set of screens may include a connector selection screen 702 that may include a menu through which a user may select a connector to use for the connection. Once selected, the user may select a "create" button to continue on to an appropriate connector configuration screen. For instance, if the "Object Storage" connector was selected in the connector selection screen, the connection configuration tool may display an Object Storage configuration screen 704, though which a user may provide configuration information relevant to an Object Storage connector, such as "Key" information, "Secret" information, "Bucket" information, "Region" information, "Folder" information, among other possibilities. If the "Asset Telemetry" connector was selected in the connector selection screen, the connection configuration tool may display a Geotab configuration screen 706, through which a user may provide information relevant to a Geotab connector, such as "Organization" information, "username" information, and "password" information, among other possibilities. Other types of configuration information may be provided for use with other types of connectors. Other types of screens may be possible as well.

Figure 7B:
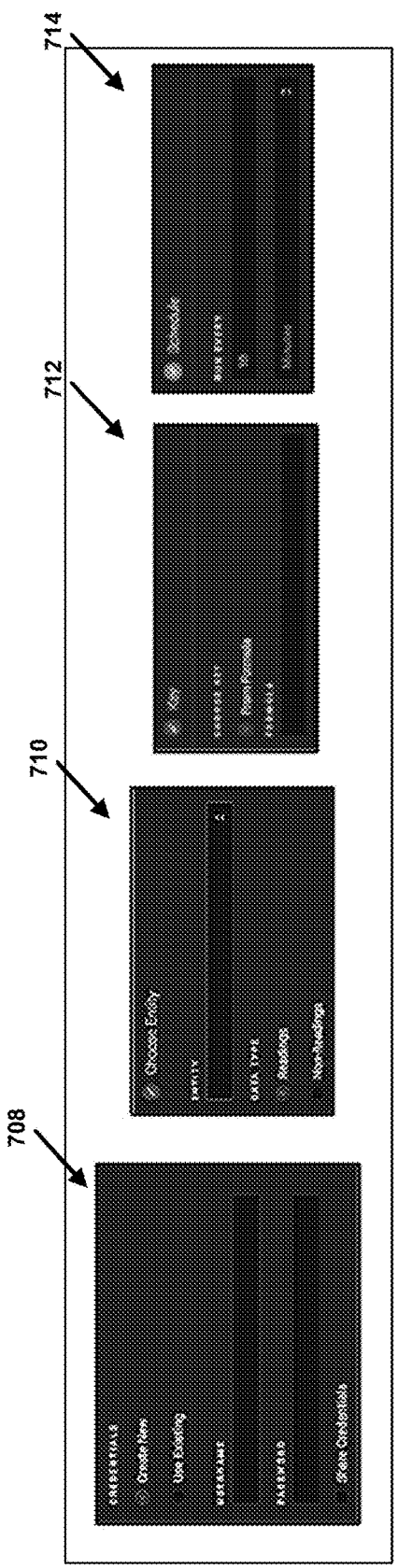
FIG. 7B is a snapshot of a GUI that may be provided by an example connection configuration tool, according to an example embodiment.

Turning next to block 604, the connection configuration tool may receive connection configuration information. To facilitate this, the connection configuration tool may provide a series of screens that contain various form fields and/or drop-down menus for receiving user inputs that provide or select this configuration information. To help illustrate, FIG. 7B depicts some example configuration screens that may be provided by the connection configuration tool through a GUI. As depicted, the configuration screens may include a credentials screen 708 for receiving credential information (e.g., username and password) that may be required for accessing the asset-related data at the data source; an entity screen 710 for receiving information that identifies the data entity to which the incoming data will be mapped (e.g., asset, channel reading, etc.); a key screen 712 for receiving information for assigning a unique identifier to the incoming data; and/or a schedule screen 714 for receiving information regarding how often to retrieve the incoming data. It should be understood that the forgoing screens are merely examples, and that in other implementations of the connection configuration tool, other types of screens may be possible.

Turning next to block 606, the connection configuration tool may facilitate the platform's receipt of an instruction to deploy the connection. The connection configuration tool may do this, for instance, via a user input selecting a "deploy" button or the like. Once a connection is deployed, the platform 300 may store the connection in the non-readings data store 308b, by for instance, storing the configuration information for the connection (which as described above may include the type of connector, connector configuration information, and connection configuration information, among, perhaps, other types of information). Once a connection is deployed, data may flow from the data source specified by the connection into the data ingestion module 302.

B. Data Transformation Tools

Another type of tool that the platform may provide is a pipeline creation tool. The pipeline creation tool may engage in various functionality to facilitate establishing pipelines.

In one respect, the pipeline creation tool may be configured to automatically establish pipelines for a given tenant with little to no user involvement. For example, the platform 300 may know the types and formats of asset-related data ingested into the platform 300 by the data ingestion module 302 and stored in staging data store 304, and platform 300 may know the types and formats of input data expected by certain data science models and/or certain applications. Using this information, the pipeline creation tool may identify certain "ideal" pipelines, which if established, would unlock the ability for the tenant to utilize certain data science models and/or certain applications. Accordingly, the pipeline creation tool may then create these ideal pipelines and store them in the non-readings data store 308b. As indicated above, a pipeline may have a source component, an optional transformation component, and a sink component. As such, storing a pipeline in the non-readings data store 308b may include storing data describing the various components of the pipeline.

The pipeline creation tool may then either automatically deploy the "ideal" pipelines, or the pipeline creation tool may present a user with the option to select and deploy one or more of these "ideal" pipelines. To facilitate this, the pipeline creation tool may present via a GUI a menu of possible pipelines to deploy. In practice, a user may select one or more of these pipelines and provide to the platform 300 a user input indicating a desire to deploy the selected pipeline, such as by selecting a button or the like. Other ways to automatically establish a pipeline are possible as well.

Figure 8:
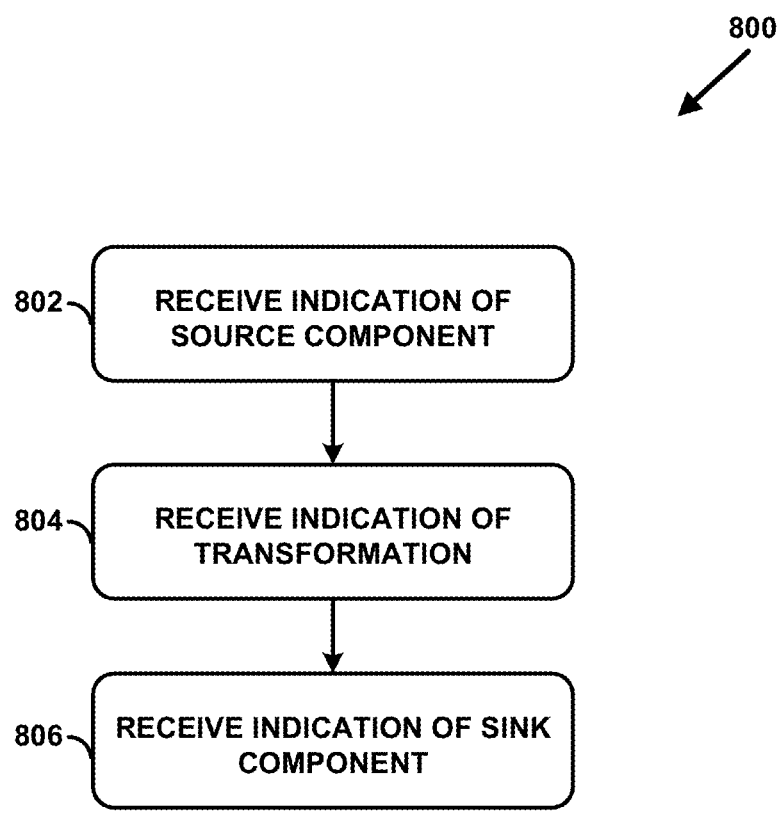
FIG. 8 is a flow diagram showing some example operations that may be included in a process for establishing pipelines, according to an example embodiment.

In another respect, the pipeline creation tool may be configured to facilitate the manual establishment of pipelines. To help illustrate this aspect of the pipeline creation tool, FIG. 8 is a flow diagram 800 depicting some example steps.

Turning first to block 802, the pipeline creation tool may facilitate the platform's receipt of an indication of a source component to use for the pipeline. One way the pipeline creation tool may do this is by providing via a GUI a graphical pipeline builder. The graphical pipeline builder may enable a user to graphically assemble a pipeline as well as customize each component of the pipeline, namely the source component, an optional transformation or transformations, and the sink component.

Figure 9:
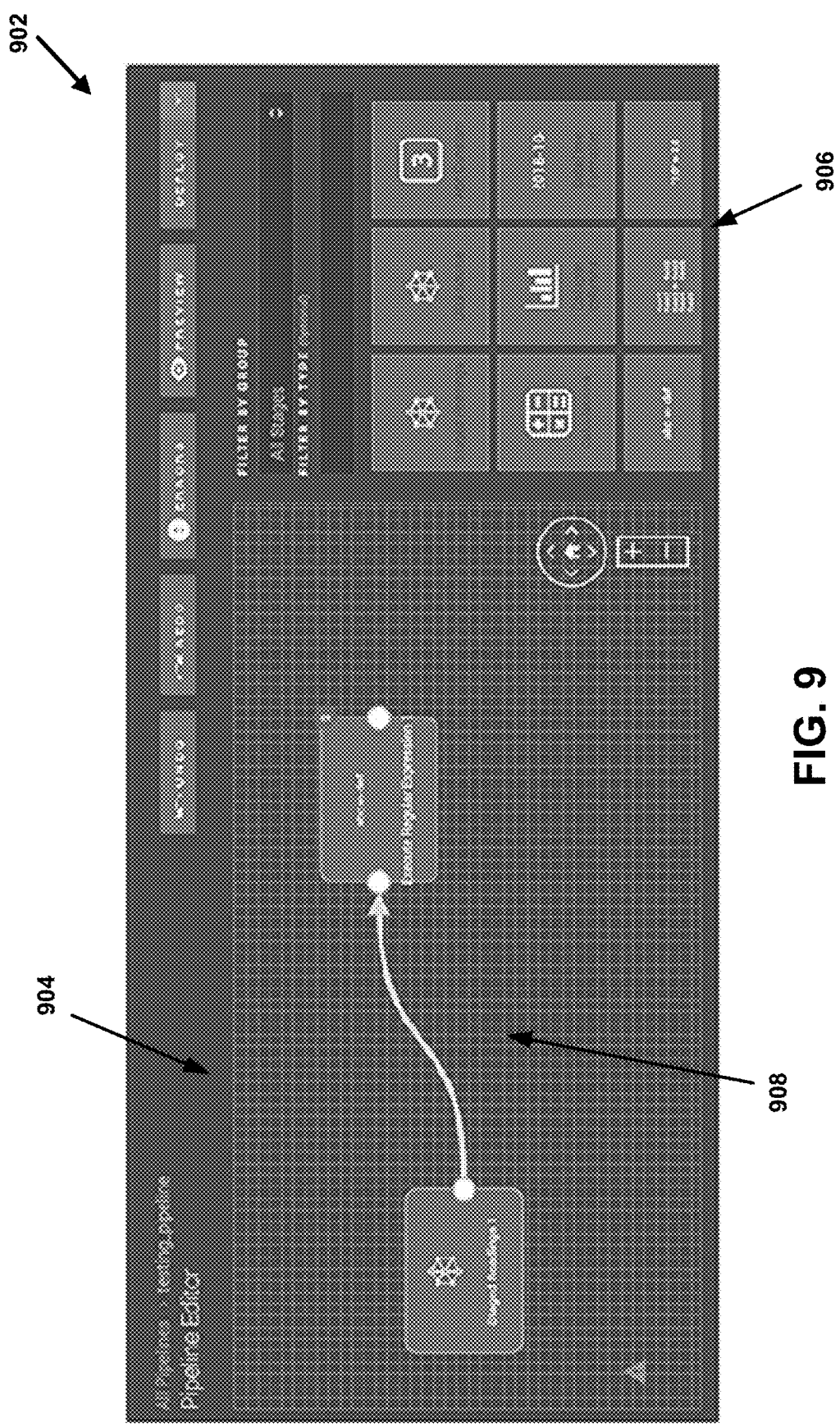
FIG. 9 is a snapshot of a GUI that may be provided by an example pipeline builder tool, according to an example embodiment.

To help illustrate this, FIG. 9 is a depiction of an example graphical pipeline builder 902 that may be provided by the pipeline builder tool via GUI. As depicted the graphical pipeline builder 902 may include a workspace 904, a component pool 906, and a graphical representation 908 of a pipeline under construction depicted within the workspace. In operation, a user may use the graphical pipeline builder 902 to provide an indication of a source component to use for the pipeline by dragging and dropping from the component pool 906 and onto the workspace a particular source icon that represents the desired type of source. As depicted, various types of source components may be represented by respective source icons. As explained above, these sources may include staged readings data, instantaneous readings data, and/or non-readings data, although other examples are possible.

The graphical pipeline builder 902 may also provide the ability to configure the source component, such as by limiting the source component to one or more data channels from among all the possible data channels at the data source. For instance, for a non-readings source, a given tenant may have hundreds of data channels that are stored as non-readings data in the staging data store, including for instance data channels relating to asset fault codes, work orders, repair data, etc. In the event the tenant desires to apply a transformation to just some of the available data channels, then the tenant may provide additional configuration data specifying the desired data channels for the source component (such as by clicking on the source icon, which may bring up a screen with various form fields for providing configuration information). Other ways for the pipeline creation tool to receive an indication of a source component to use for the pipeline are possible as well.

Turning next to block 804, the pipeline creation tool may facilitate the platform's receipt of an indication of what transformation or transformations to use for the pipeline. One way the pipeline creation tool may do this is via the graphical pipeline builder 902, an example of which is depicted in FIG. 9. In operation, a user may use the graphical pipeline builder 902 to provide an indication of what transformation or transformations to use for the pipeline by dragging and dropping from the component pool 906 and onto the workspace 904 a particular source icon that represents the type of transformation desired. As indicated above, example types of transformations may include adding a constant; performing a calculation; omitting or truncating certain data fields; changing the format; changing the name; selectively filtering one or more data values; changing the unit of measure; aggregating values over certain periods of time; de-duplicating data; sorting data that may be out of a particular desired order; and/or rolling-up one or more data values, among other possibilities.

The graphical pipeline builder may also provide the ability to configure the various transformations (such as by clicking on a transformation icon, which may bring up a screen with various form fields for providing configuration information). For instance, for a transformation that functions to change the unit of measure, the graphical pipeline builder may provide the ability to configure what unit of measure to use (e.g., for temperature, the options may include Celsius, Fahrenheit, Kelvin); for a transformation that applies a calculation, the transformation tool may provide the ability to input the calculation to use. Other ways for the pipeline creation tool to receive an indication of what transformation or transformations to use for the pipeline are possible as well.

As depicted in example graphical pipeline builder 902 in FIG. 9, the workspace 904 depicts a graphical representation 908 of a pipeline under construction. The graphical pipeline builder may modify the graphical representation 908 as components are added into of removed from the workspace (e.g., by a user dragging and dropping a component from the component pool or by selecting a component in the workspace and then selecting a delete option or the like). For instance, as a user adds a transformation component into a workspace that already includes a source component, the graphical pipeline builder may add an arrow indicator extending from the source component to the transformation component to represent the direction of the flow of data. The graphical pipeline builder is generally supportive of the platform's underlying capabilities to compose and curate data.

In some embodiments, the graphical pipeline builder 902 may also provide the ability to review in graphical form a saved and deployed pipeline in a read-only view. In such a view, all components displayed on the interface are in a read-only mode in which the graphical pipeline builder 902 may not permit modification. The graphical pipeline builder may also provide the ability to switch between editing, previewing, and read-only views over the lifetime of the pipeline. Other examples of providing a graphical representation of a pipeline under construction are possible as well.

Turning next to block 806, the pipeline creation tool may facilitate the platform's receipt of an indication of a sink component to use for the pipeline. One way the pipeline creation tool may do this is via the graphical pipeline builder 902, an example of which is depicted in FIG. 9. In operation, a user may use the graphical pipeline builder to provide an indication of a sink component to use for the pipeline by dragging and dropping from the component pool 906 and onto the workspace 904 a particular sink icon that represents the type of sink desired. As depicted, various types of sink components may be represented by respective source icons. Other ways for the pipeline creation tool to receive an indication of a sink component to use for the pipeline are possible as well.

As explained above, a sink component may represent a sink location, which corresponds to various locations in the core data store module within which ingested asset-related data may be stored. By way of example, possible sink locations may include (but are not limited to) a readings sink for storing high-volume time-series data readings, a windowed readings sink for storing windowed derivations of readings data, and a non-readings sink for storing all other non-readings data.

Once a pipeline is complete, the pipeline creation tool may present an option to save the pipeline and/or deploy the pipeline. Upon receiving a user input selecting to save and/or deploy the pipeline, the pipeline creation tool may cause the pipeline to be stored in the non-readings data store 308b, which as described above may take the form of the pipeline creation tool storing in the non-readings data store 308b descriptions of the various components (e.g., the source component, an optional transformation or transformations, and the sink component) of the pipeline.

Advantageously, the pipeline creation tool allows users of the platform to easily curate new derived data sets using existing data and/or capture new insight data generated by the platform. The pipeline creation tool may provide functionality other than that described above.

As one possibility, the pipeline creation tool may provide the ability to query the staging data store 304 and to view the results of such queries. It may be desirable to query the staging data store 304 in order to identify the type and format of certain asset-related data ingested into the staging data store 304. Such an identification may be useful to aid in a determination of what, if any, transformations would be useful to employ in order to utilize certain data science models and/or certain applications. Returning to the example presented above, if a particular data science model expects to receive hourly Fahrenheit engine temperature readings in order to produce engine-failure prediction alerts but a tenant does not recall the type and format of its engine temperature data channel(s), then a user may issue a query (such as an SQL query) to the staging data store to determine the type and format of its engine temperature data channels. If, for instance, such a query indicates that the tenant's engine temperature data is in units of Celsius and collected with a grain size of one minute, then, a user may use this information to determine that a particular transformation should be employed in order to utilize the desired data science model, namely (i) a unit-conversion transformation (to convert its Celsius readings to Fahrenheit readings), and (ii) a calculation transformation (to roll the engine temperature readings up into a grain size of one hour). Other example uses for querying the staging data store are possible as well.

C. Data Analytics Tools

Another type of tool provided by the platform 300 may be a model creation tool that facilitates the creation of a new data science model. The tool may provide various functionality to guide a user through the steps of creating a new data science model, including prompting the user at various times to provide various model configuration data. In this respect, the platform may make the model creation tool accessible to users via a GUI where the tool may include various screens and menus through which the platform may present various model configuration options to a user and may accordingly receive user inputs. The available options presented via these GUIs may not directly expose underlying mechanisms like particular machine learning algorithms or statistical techniques, but may instead provide the ability to receive some related inputs which are expressed to users of the platform in "plain language."

Figure 10:
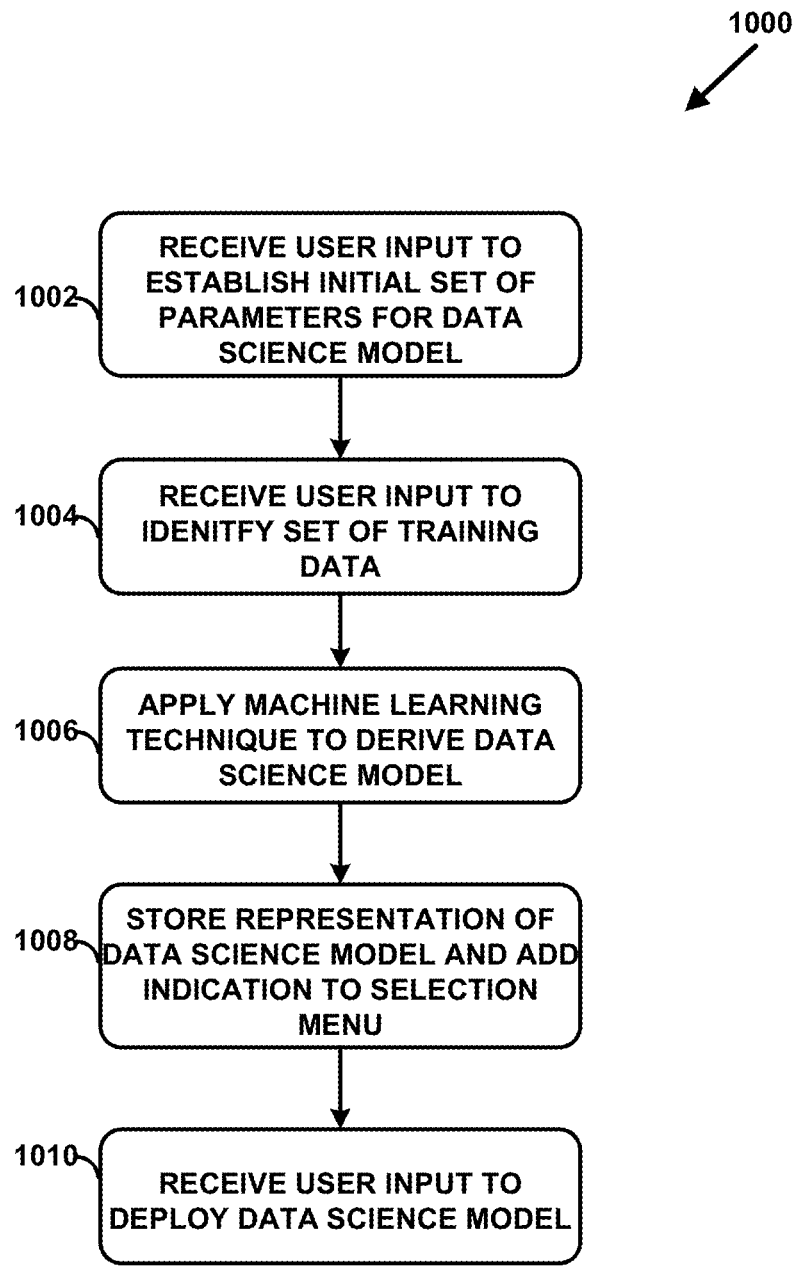
FIG. 10 is a flow diagram showing some example operations that may be included in a process for creating data science models, according to an example embodiment.

To help illustrate the possible functionality of the model creation tool, FIG. 10 is a flow diagram 1000 that depicts several example steps that may be carried out by the platform. As a general matter, the model creation tool may engage in the same set of underlying steps as described above in connection with the functionality carried out by the data analytics module 310 when creating a new data science model. As described here, the model creation tool may engage in some additional functionality to receive user input(s) to facilitate creating new data science models.

Turning first to block 1002, the model creation tool may receive a user input or a set of user inputs to establish an initial set of parameters for the new data science model. As explained above, this initial set of model parameters may take various forms, which may depend on the type of data science model being created.

For example, if an event prediction model is being created, the initial set of model parameters for the event prediction model may include a name and/or description of the model, an identification of the given type of event to be predicted, an identification of the type(s) of assets for which events of the given type are to be predicted, an identification of the set of data channels that are to serve as inputs for the event prediction model, an identification of the event duration for the event prediction model, and threshold criteria to use for deriving insights based on the output of the model, among other possibilities.

Figure 11A:
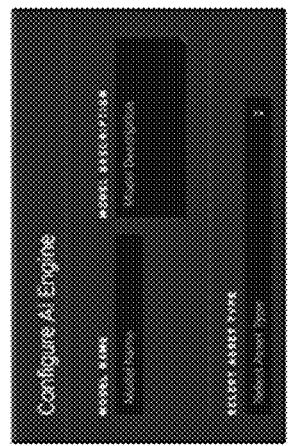
FIG. 11A is a snapshot of a GUI that may be provided by an example model creation tool, according to an example embodiment.
Figure 11B:
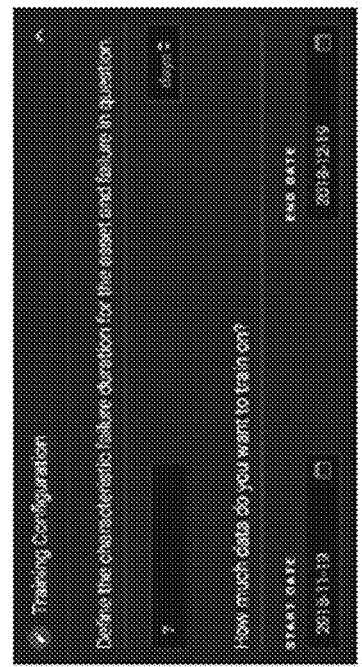
FIG. 11B is a snapshot of a GUI that may be provided by an example model creation tool, according to an example embodiment.

To facilitate receiving a set of user inputs establishing this initial set of model parameters for an event prediction model, the model creation tool may present to a user via a GUI a series of screens through which a user may input some or all of the initial set of model parameters. To help illustrate some examples for receiving these model parameters, FIGS. 11A-B depict an example set of screens that may be provided to a user by platform 300 to facilitate receiving some of the initial set of model parameters for a new event creation model. FIG. 11A, for instance, depicts an example initial information screen 1102 through which a user may provide a name and/or description of the model, an identification of the given type of event to be predicted, and/or a section of the type(s) of assets for which events of the given type are to be predicted. FIG. 11B, for instance, depicts a configuration screen 1104 through which a user may provide an indication of an event duration to use for the event prediction model. It should be appreciated that these screens are merely examples, and in other implementations, other screens for receiving other initial model parameters are possible as well.

For instance, in some implementations of the model creation tool, the tool may provide a screen through which a user may provide a user input identifying a set of data channels that are to serve as inputs for the event prediction model. As indicated above, the data sinks created as part of establishing the one or more pipelines used by data transformation module 306 may serve as the set of possible inputs for a given data science model. Thus, in one implementation, the model creation tool may provide a screen that accepts a user input to specify a set of data channels that are to serve as inputs for the event prediction model, or, alternatively, the model creation tool may present a screen though which a user could input a query for one or more data channels to use as inputs for the event prediction model. Based on the user input specifying the data channels that are to serve as inputs, the model creation tool automatically selects the appropriate data sinks that were established via the pipeline creation tool and configures the data science model to use these data sinks as inputs to the data science model without requiring the user to make any connection or selection of the data sinks themselves. Other examples of a user providing a user input identifying a set of data channels that are to serve as inputs for the event prediction model are possible as well.

As another example, if an anomaly detection model is being created, the initial set of model parameters for the anomaly detection model may include a name and/or description of the model, an identification of the type(s) of assets for which anomalies are to be detected, and an identification of the set of data channels that are to serve as inputs for the anomaly detection model, a "sensitivity" level of the model (e.g., in terms of how the model reacts to variability in the input data, how the model determines what qualifies as an exceedance, or both), and threshold criteria to use for deriving insights based on the output of the model, among other possibilities.

Figure 11C:
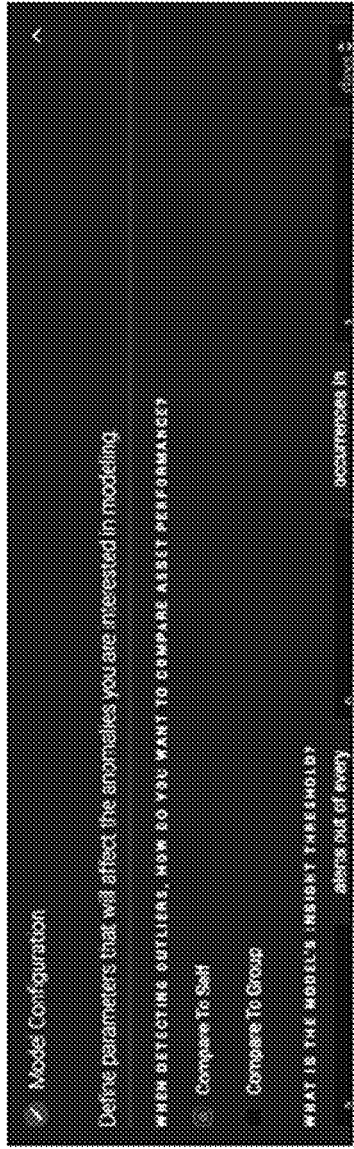
FIG. 11C is a snapshot of a GUI that may be provided by an example model creation tool, according to an example embodiment.

As described above, to facilitate receiving a set of user inputs establishing this initial set of model parameters for an anomaly detection model, the model creation tool may present to a user via a GUI a series of screens through which a user may input some or all of the initial set of model parameters. To help illustrate some examples for receiving these model parameters, FIGS. 11A and 11C depict example screens that may be provided to a user by platform 300 to facilitate receiving some of the initial set of model parameters for a new anomaly detection model. FIG. 11A, for instance, depicts an example initial information screen 1102 through which a user may provide a name and/or description of the model, an identification of the given type of event to be predicted, and/or a section of the type(s) of assets for which events of the given type are to be predicted. FIG. 11C, for instance, depicts a configuration screen 1106 through which a user may provide an indication of whether the anomaly detection model should detect anomalies by comparing asset performance for just one asset or for a group of similar assets. For example, for an anomaly detection model designed to detect engine temperature anomalies for one specific delivery truck, one option for creating such a model may be to have the model detect anomalies for the engine temperature for the specific delivery truck relative to just that specific delivery truck's historic engine temperature readings, which may be referred to as a "compare-to-self" option. Alternatively, another option would be to have the model detect anomalies for the engine temperature for the specific delivery truck relative to all of the delivery trucks' historic engine temperature readings (i.e., including, but not limited to the specific delivery truck for which the model is designed to detect engine temperature anomalies), which may be referred to as a "compare-to-group" option. Advantageously, the platform's ability to configure both compare-to-self and compare-to-group options allows for more sophisticated alerting and preemptive predictions (e.g., a specific engine temperature might be an outlier for a certain engine, but not for a group of engines, as may be the case for a truck that is assigned a new route with more challenging terrain within the same fleet, for instance).

The configuration screen 1106 also may include various form fields through which a user may provide an indication of threshold criteria to use for deriving insights based on the output of the model. Generally, an insight threshold may reflect the model's threshold number of abnormal behaviors required for the model to classify a pattern of behavior as anomalous. A higher threshold may indicate that the model would require more abnormal behaviors from the data channel before outputting an indication that the data inputs' behavior is anomalous. Likewise, a lower threshold may indicate that the model would require fewer abnormal indicators from the data channels before outputting an indication that the data inputs' behavior is anomalous. In some implementations, the platform 300 may receive an indication of threshold criteria to use by receiving an indication of a threshold number of alerts out of a threshold number of occurrences in a threshold number of days. Other indications of threshold criteria to use may be possible in other implementations as well.

It should be appreciated that these screens are merely examples, and in other implementations, other screens for receiving other initial model parameters are possible as well. For instance, in some implementations of the model creation tool, the tool may provide a screen through which a user may provide a user input identifying a set of data channels that are to serve as inputs for the anomaly detection model. As indicated above, upon receiving a selection or other input specifying a set of data channels to use as input, the model creation tool may automatically select the appropriate data sinks created as part of establishing the one or more pipelines used by data transformation module 306. Other examples of a user providing a user input identifying a set of data channels that are to serve as inputs for the anomaly detection model are possible as well.

As yet another example, if an outlier detection model is being created, the initial set of model parameters for the outlier detection model may include a name and/or description of the model, an identification of the type(s) of assets for which outliers are to be detected, an identification of the particular data channel that is to serve as input for the outlier detection model, an identification of the types of outliers that are to be detected by the model (e.g., "high" outliers, "low" outliers, or both), a "sensitivity" level of the model (e.g., in terms of how the model reacts to variability in the input data, how the model determines what qualifies as an exceedance, or both), and threshold criteria to use for deriving insights based on the output of the model, among other possibilities.

Figure 11D:
FIG. 11D is a snapshot of a GUI that may be provided by an example model creation tool, according to an example embodiment.

As described above, to facilitate receiving a set of user inputs establishing this initial set of model parameters for an outlier detection model, the model creation tool may present to a user via a GUI a series of screens through which a user may input some or all of the initial set of model parameters. To help illustrate some examples for receiving these model parameters, FIGS. 11A and 11D depict example screens that may be provided to a user by platform 300 to facilitate receiving some of the initial set of model parameters for a new anomaly detection model. FIG. 11A, for instance, depicts an example initial information screen 1102 through which a user may provide a name and/or description of the model, an identification of the given type of event to be predicted, and/or a section of the type(s) of assets for which events of the given type are to be predicted. FIG. 11D, for instance, depicts a configuration screen 1108 through which a user may provide an indication of how sensitive and how conservative the outlier detection model should be.

As a general matter, the sensitivity of an outlier model reflects how complex and/or how simple the model's representation is of "normal" behavior for the particular input data channel. In general, the greater the sensitivity, the more complicated the representation, whereas the lesser the sensitivity, the more simplified the representation. There may be tradeoffs for selecting a "more sensitive" outlier model over a "less sensitive" outlier model. For instance, with a "more sensitive" outlier model, it should be expected that the outlier model may generate more false alerts but result in more anomalous behavior detected. Likewise, with a "less sensitive" outlier model, it should be expected that the outlier model may generate fewer false alerts but also result in less anomalous behavior detected. In some implementations, the sensitivity threshold may range from 0 to 5, but other ranges are possible as well.

The conservativeness of an outlier model reflects how far from normal the behavior of the data channel must be before the outlier detection model generates an alert. A relatively higher value for how conservative the model should be represents that the data channel behavior must be relatively farther from "normal" before the outlier detection model generates an alert, whereas a relatively lower value for how conservative the model should be represents that the data channel behavior can be relatively closer to "normal" before the outlier detection model generates an alert. As with the sensitivity of the model, selecting a more conservative value over a less conservative value for the model may result in certain tradeoffs. For instance, with a "more conservative" system anomaly model, it should be expected that the system anomaly model may generate more false alerts but result in more anomalous behavior detected. Likewise, with a "less conservative" system anomaly model, it should be expected that the system anomaly model may generate fewer false alerts but also result in less anomalous behavior detected. In some implementations, the value of how conservative to be may range from 0 to 5, but other ranges are possible as well It should be appreciated that these screens are merely examples, and in other implementations, other screens for receiving other initial model parameters are possible as well. For instance, in some implementations of the model creation tool, the tool may provide a screen through which a user may provide a user input identifying the particular data channel that is to serve as input for the outlier detection model. As indicated above, the data sinks created as part of establishing the one or more pipelines used by data transformation module 306 may serve as the set of possible inputs for a given data science model. Thus, in one implementation, the model creation tool may provide a screen that lists the available data sinks from which a user may select a particular data channel from the available data sinks to use as input for the outlier detection model. Alternatively, the data science creator tool may present a screen though which a user could input a query for a data channel to use as input for the outlier detection model. Other examples of a user providing a user input identifying a particular data channel to use as input for the outlier detection model are possible as well.

Returning to the flow diagram 1000 of FIG. 10, at block 1004 the model creation tool may facilitate the platform's receipt of user input that may specify parameters for identifying a set of training data to use in training the data science model. To do this, the model creation tool may present one or more screens through which a user may provide user inputs that identify a set of training data for use in training the model. As discussed above, one possibility for obtaining a set of training data may involve establishing a set of query parameters for use in obtaining the training data, which may include the particular set of one or more data channels that are to be included in the set of training data, the general timeframe of the historical data that is to be included in the set of training data, and other applicable filters that are to be applied to the historical data that is to be included in the set of training data (e.g., data only from times that are known to be associated with past occurrences of the given type of event being predicted, data only from times that are known to be associated with normal behavior, data only from a particular universe of assets, data only from a particular tenant, etc.), among other possibilities. In this respect, as with the initial set of model parameters, the platform 300 may provide via a GUI one or more screens though which a user may provide user inputs to establish at least some aspects of the query parameters.

As one non-limiting example, the example configuration screen 1104 depicted in FIG. 11B provides a start date and end data parameter selection option for receiving a user input identifying the start date and end date of historical data to use as the set of training data. In other examples, the platform 300 may provide other types of screens for receiving user input to identify a set of training data for use in training the model.

At block 1006, a user input may a request into the model creation tool to train the data science model, which may in turn trigger the data analytics module 310 to apply a machine learning technique to the set of training data and thereby derive the data science model in the manner described above.

Figure 12:
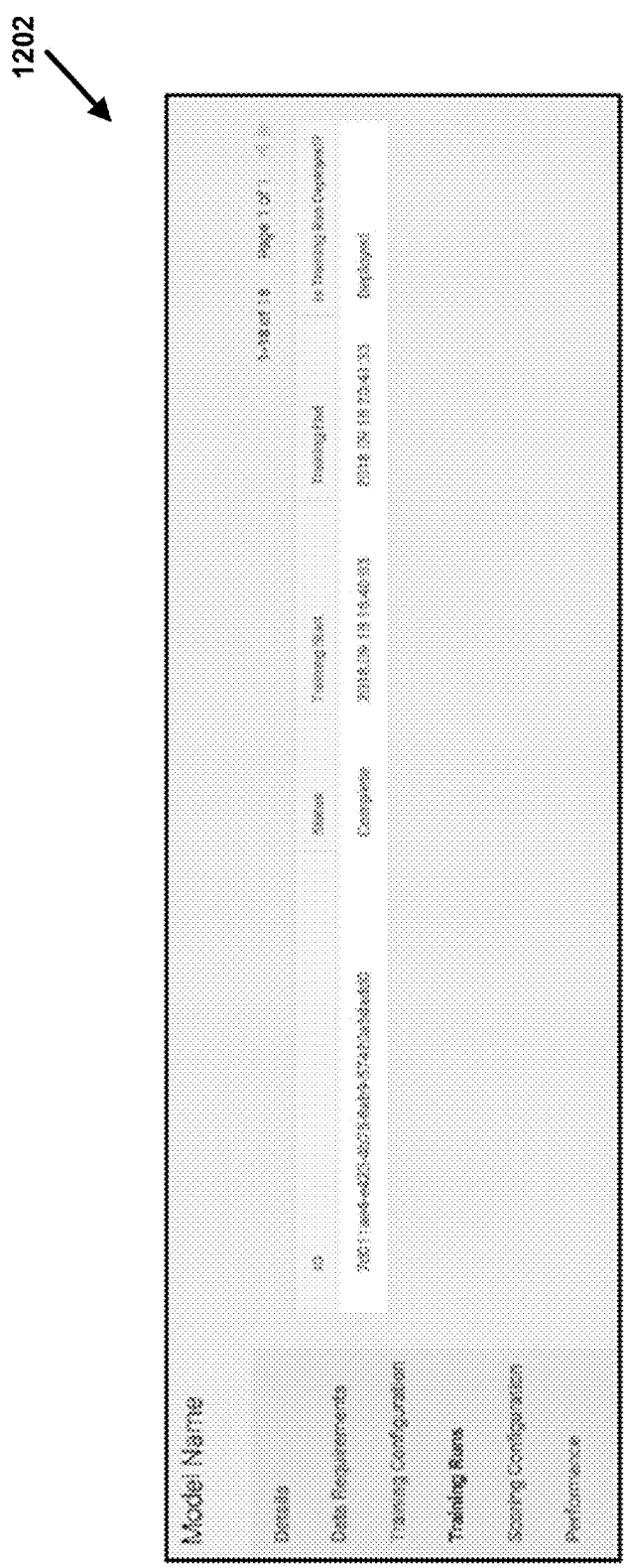
FIG. 12 is a snapshot of a GUI that may be provided by an example model creation tool, according to an example embodiment.

At block 1008, after deriving the data science model, the platform 300 may store a representation of the data science model in core data store module 308 and may add an indication of the data science model to a selection menu that is presented via the model creation tool. The representation of the data science model may take any of a number of various forms, including for example a programmatic description of the model. The model creation tool may store this representation in non-readings data store 308b. As also indicated, the model creation tool may also add an indication of the data science model to a selection menu. As one example of such a menu, FIG. 12 depicts an example data science model selection menu 1202. Through such a selection menu, a user may be able to view data science models that have been created and trained and may provide user inputs via this menu to perhaps select a particular data science model, view various aspects about the data science model, and may deploy the data science model. Other example selection menus are possible as well.

At block 1010, the model creation tool may facilitate the platform's receipt of a user input to deploy the data science model. Deploying a data science model may constitute putting the data science model into service such that the platform 300 passes data inputs to the model and the model produces corresponding output. The model creation tool may facilitate the platform's receipt of a user input to deploy the data science model in various ways. For example, the platform 300 may provide a deployment screen via a GUI through which a user may select a particular data science model and then provide a user input that requests deployment of the data science model. Other examples of receiving a user input to deploy a data science model may be possible as well, including for instance such as an HTTP request to a microservice which manages the domain of data science models".

D. Data Assessment Tools

Platform 300 may provide various tools and processes that facilitate assessing, categorizing, curating the data ingested by the platform 300 as well as produced by platform 300. As a general matter, "data assessments" refers to the asset-centric evaluation, analysis, feature extraction and repeatability characteristics that may be extracted from a particular data set. The outputs of a "data assessment" may be referred to as "artifacts," which may be used to further guide tenants in incorporating data science into their core business with an intent to drive actionable outcomes.

Figure 13A:
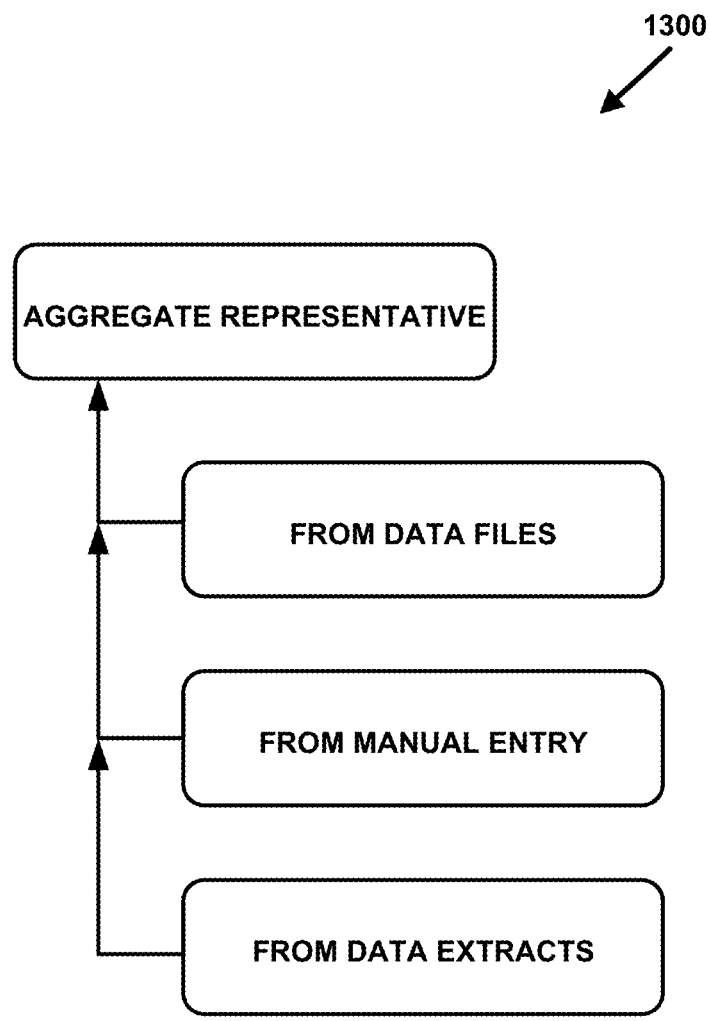
FIG. 13A is a flow diagram showing some example operations that may be included in a process for aggregating representative samples, according to an example embodiment.

FIG. 13A depicts one example of a process 1300 for aggregating representative samples. For instance, during a step referred to as "initial data review," the platform provider may work alongside a tenant to aggregate data in a process that may involve the tenant reviewing the available datasets for their assets. This aggregation serves to orient data around identified assets for the purpose of enabling data science for condition-based monitoring. Data may arrive at platform 300 via data files, which may include but are not limited to files arranged in formats such as CSV, TSV, TIFF, and other tabular data formats. Data may arrive at platform 300 via manual entry, which may include but is not limited to processes wherein tenants use a platform application to onboard their assets and platform operators create a data model and publish tenant-specific data manually. Data may also arrive at platform 300 as a data extract from well-known database and data aggregation systems. This data may include, but is not limited to a database snapshot, database backup, database change data capture log, search index data backup, and other database system formats.

Figure 13B:
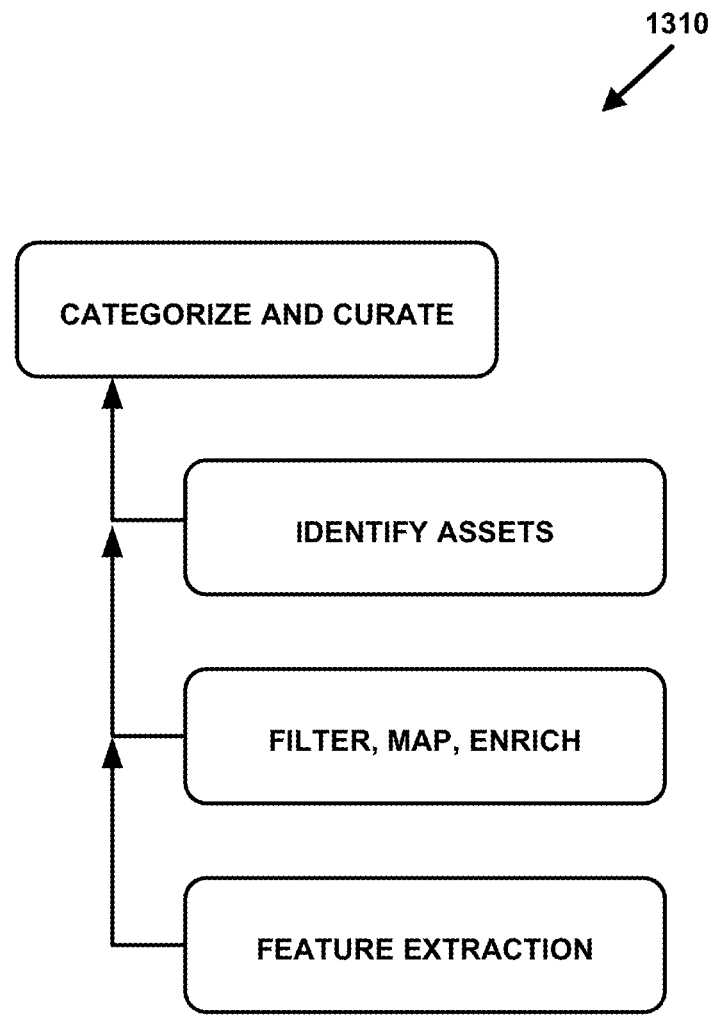
FIG. 13B is a flow diagram showing some example operations that may be included in a process for categorization and curation, according to an example embodiment.

Once data has been aggregated and is available to the platform to begin analysis, a process referred to as "categorization and curation" may commence. FIG. 13B depicts one example of such a process 1310. For instance, data categorization and curation starts with asset identification and is refined such that data is filtered, mapped, and enriched in preparation for feature extraction. A key differentiator in data assessment in platform 300 is asset identification in which a tenant and the platform provider identify key system components and subcomponents for review as predictive indicators for future events. With asset identification at the center, all other feature extraction, data modeling, and data science activities continue to augment and enrich the tenant data sets such that the representative data samples become representative asset modeling data sets.

Figure 13C:
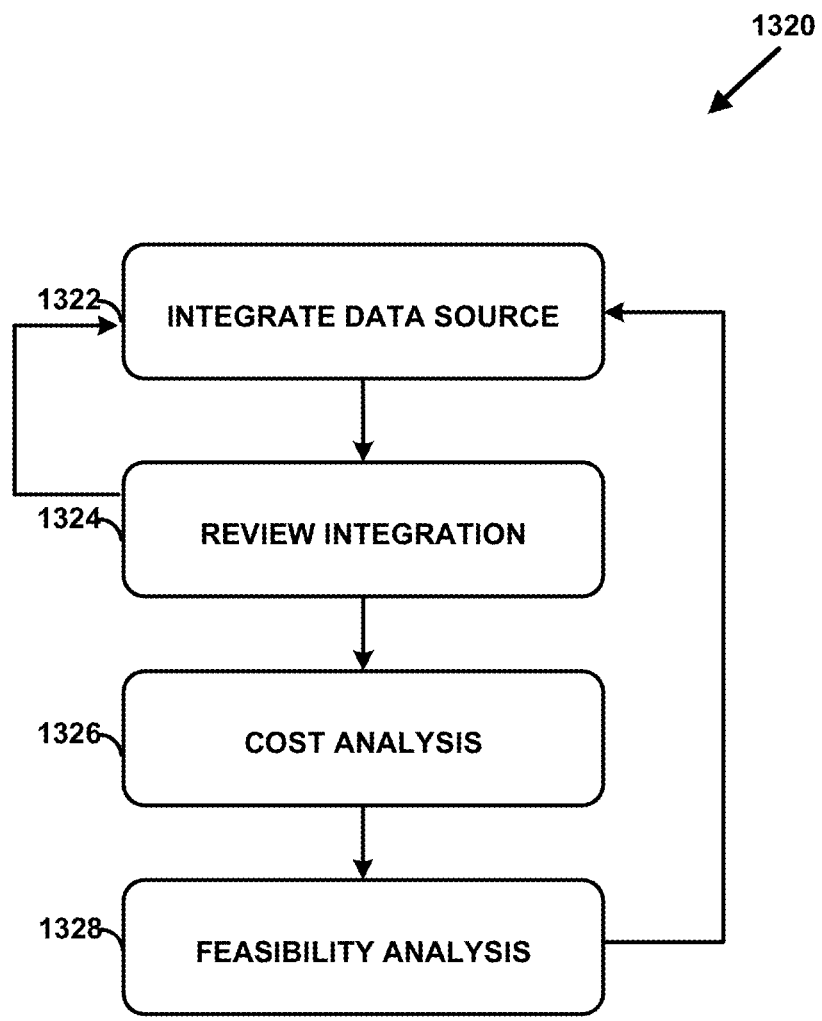
FIG. 13C is a flow diagram showing some example operations that may be included in a process for data assessment, according to an example embodiment.

Finally, it should be noted that a data assessment caters to a one-time review and analysis of tenant data within a particular scope or duration. In many cases, the data files, manual entry, and data extracts received may not be built for repeatable availability or production integration. (For instance, a situation in which a tenant emails an Excel document once a week to a platform operator to thus provide the platform 300 with the tenant's asset-related data is not a sustainable practice for scaling asset centric data science. Accordingly, this email might be converted into an automated file upload, for instance.) During a data assessment various data operations teams and data modeling teams work to integrate the tenant's data sources, as illustrated by the flow diagram 1320 in FIG. 13C. For instance, starting at block 1322, the tenant's data sources are integrated and these integrations go through various reviews (depicted at block 1324) may repeat many times before moving on to a cost analyses (as depicted by block 1326) and a feasibility analysis (as depicted by block 1328).

Data integration review processes, such as the ones illustrated with the foregoing flow diagrams, seek to evaluate how maintainable and operable a particular data integration will be as it transitions from a one-time effort to a repeatable data integration. Data reviews may include evaluating a tenant's expectations on data and system availability as well as escalation paths both at the platform provider and at the tenant. Cost analysis picks up after the review and works to gauge the overall operational cost of a data source being integrated over time. The cost analysis is then evaluated to ensure the cost to serve and make failure predictions does not exceed the cost of the failure or mitigations. The feasibility analysis takes the cost analysis and data integration reviews into consideration to determine whether a particular tenant data integration can make a successful transition into a repeatable, always-on, production data integration. Feasibility strives to call out gaps in the process such as calling out risks to data engineering and risks to overall data model efficacy. Those skilled in the art will appreciate that the foregoing description was exemplary in nature and in other embodiments, other examples of engaging in the forgoing process steps may be possible as well.

E. Application Service Tools

Platform 300 may provide various tools that facilitate the selection and execution of pre-defined applications as well as facilitate the creation of new applications.

As mentioned, the application service module 312 may make available to users of the platform 300 certain pre-defined applications or packages of applications from which a user may, from time to time, request to execute. Additionally, the application service module 312 may make available to users of the platform certain application creation tools, which a user may use to create new applications and/or modify existing applications. As will be discussed further herein, an application creator tool may generally provide the user with the option to select certain pre-packaged application elements (e.g., modules, dashboards, reports, doughnut charts, forms, tables, graphs, etc.) and incorporate these pre-packaged elements into a new application. To facilitate this, the application service module 312 may assemble these various pre-packaged application elements into what may be referred to as "application creation packages" and may store these application creation packages in the core data store module 308, and particularly in non-readings data store 308b, for instance. As a general matter, storing an application creation package in the core data store module 308 may take the form of storing the program code (e.g., the JavaScript and/or JSON code) or other platform configuration data that defines the various application elements that comprise the application creation package, although in other examples, storing an application creation package may take other forms as well.

As mentioned, an application created with the application creator tool may incorporate one or more application elements (e.g., modules, dashboards, reports, doughnut charts, forms, tables, graphs, etc.) that are part of an application creation package. The application creator tool may facilitate incorporation of an application element of an application creation package into a new application by establishing program code (e.g., a portion of a JSON script) that, among other functionality, points to the location in the core data store module 308 where the application creation package (and more particularly, where the specific application element of the application creation package) is defined via platform configuration data and stored. In this way, the application service module may, from time to time, provide new versions of application creation packages that change some or all of the underlying application elements, or add new application elements altogether, without rendering obsolete applications created by various tenants using the application creator tool under prior versions of application creation packages. Indeed, because a tenant's application includes program code that points to the location in the core data store module 308 where the application creation package (and more particularly, where the specific application element of the application creation package) is stored, when a new version of that application creation package becomes available (and is thus stored in the core data store module 308), the tenant's application may automatically point to, and thus incorporate, application elements from this new version. Other advantages are possible as well and may become apparent to those of ordinary skill with the benefit of the present disclosure.

Turning now to the functionality of various tools provide by the application service module 312, as one tool for facilitating the selection and execution of pre-defined applications, the platform 300 may prove a menu listing or the like of applications available for execution. Platform 300 may present such a menu listing or the like via a GUI to a user. A user may thus, though such a menu listing or the like, provide a user input requesting to execute one or more of the available applications.

As one tool for facilitating the creation of new applications, the platform 300 may make available for download a software development kit (SDK) or the like that allows a user to create customized applications for platform 300 in one or more programming languages. In this respect, a user may download the SDK, develop an application using the user's own computing device, and execute the application on the user's own computing device. In this way, the application may access the various modules of platform 300 using an application interface module 312. The application service module 312 may provide to such an application, through the interface module 312, any asset-related data, insights, and other associated data and/or instructions.

As another tool for facilitating the creation of new applications, the platform 300 may provide an application creator tool. The application creator tool may provide various functionality for creating and configuring applications. The platform 300 may make this tool be accessible to users via a GUI. By using the application creator tool, a user may create an application, which may be stored by the platform 300 in the core data store module 308 and accessible to users of the platform 300 through a menu listing or the like. Storing an application in the core data store module 308 may take the form of storing the program code (e.g., the JavaScript and/or JSON code) that defines the application, although in other examples, storing an application may take other forms as well.

In some respects, the application creator tool may be configured to facilitate the creation of new applications using what is sometimes referred to as a "low-code" or "no-code" methodology. In a no-code methodology, a user may utilize the application creator tool to create an application without having to manually provide any program code (or pseudocode). In this respect, the application creator tool may facilitate the platform's receipt of user inputs (other than program code or pseudocode), such as user input selections of various GUI elements or other non-code user text inputs, from which the application creator tool may use to automatically establish the program code for the application. Similarly, in a low-code methodology, a user may utilize the application creator tool to create some portions of an application without having to manually provide any program code (or pseudocode), but may ultimately provide (or have the option to provide) some program code (or pseudocode) input to customize or otherwise finalize the application. In either respect, the application creator tool may function to, upon receiving various user inputs, establish program code that defines the configuration, visual appearance, and functionality of an application, including, by way of example, (i) how and from where the application will retrieve from the core data storage module 308 certain any data called for by the application instructions, such as asset-related data, insights, or the like, and/or (ii) how the application will provide some or all of the retrieved data as well as other instructions to a client device (e.g., client station 106A) or other rendering device that defines the visual appearance of the application and/or how the application presents the retrieved data to a user. The program code established by the application creator tool may take the form of a JSON script, although other types of program code are possible. The disclosed application creator tool may be utilized with other methodologies as well.

Figure 14:
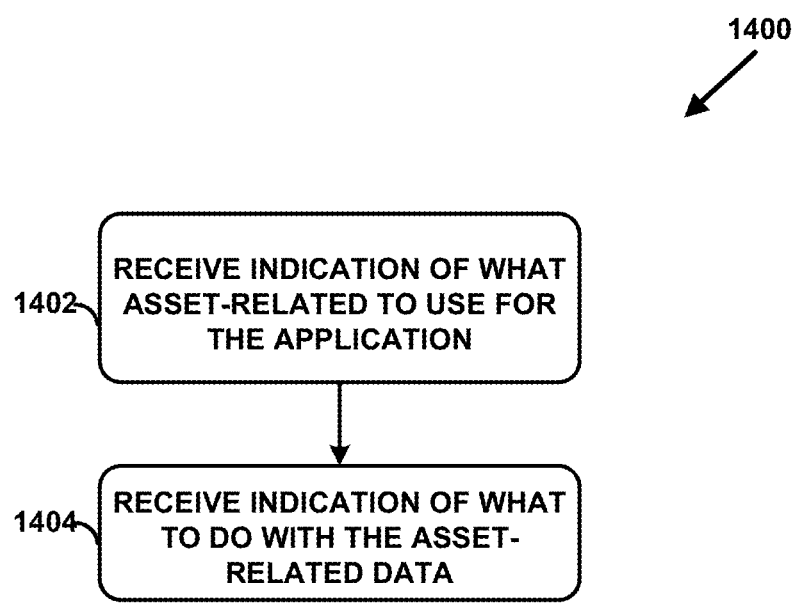
FIG. 14 is a flow diagram showing some example operations that may be included in a process for creating applications, according to an example embodiment.

To help illustrate some of the functionality provided by this tool, FIG. 14 is a flow diagram 1400 depicting some example steps that may be taken by the application creator tool. Turning first to block 1402, the application creator tool may facilitate the platform's receipt of an indication of the what asset-related data to use for an application being created. To facilitate this, the application creator tool may provide via a GUI a listing of the possible asset-related data that is available for use in an application. Such a listing may include, asset-related data available through data sinks of pipelines used by the data transformation module 306, outputs of data analytics operations produced by data analytics module 310, insights produced as a result of running one or more data science models, and/or data describing a tenant's schema, such as objects or records. Though such a GUI, a user may provide a user input to the platform 300 that selects the desired asset-related data that is available for use in an application. Other ways to receive an indication of the what asset-related data to use for an application being created are possible as well.

Figure 15:
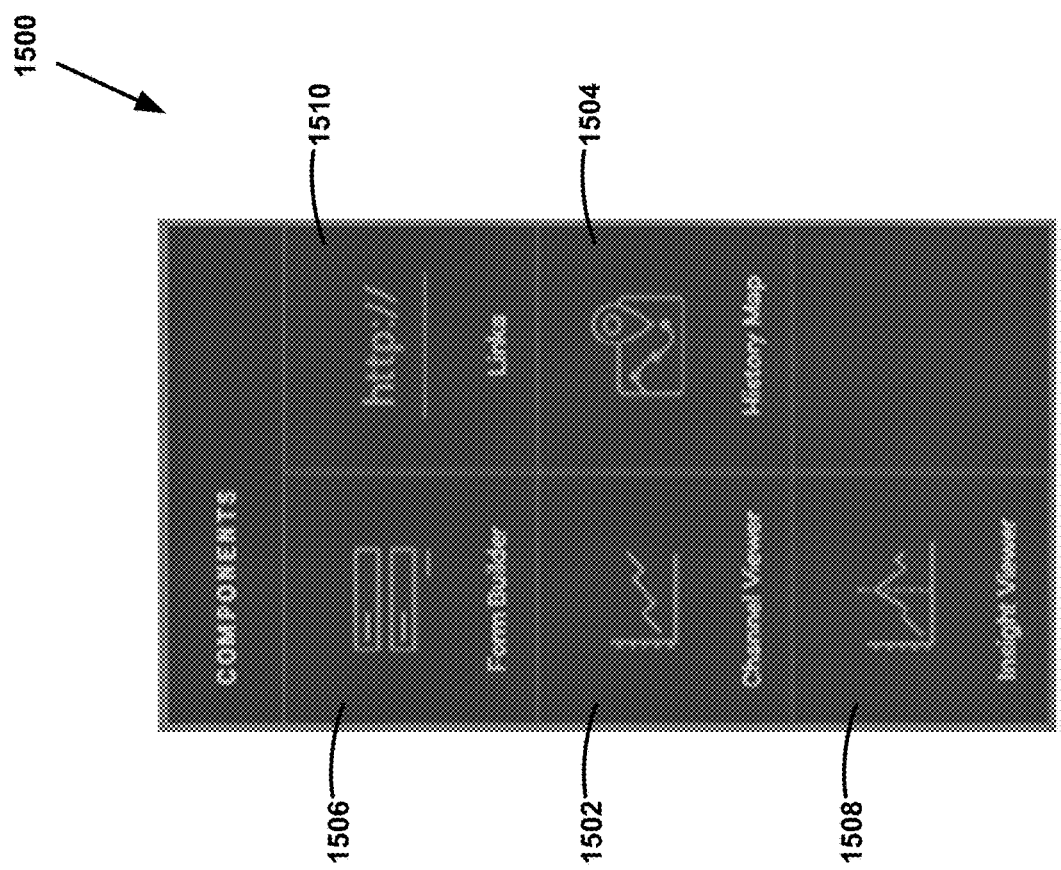
FIG. 15 is a snapshot of a GUI that may be provided by an example application creator tool, according to an example embodiment.

Turning next to block 1404, the application creator tool may facilitate the platform's receipt of an indication of what the application should do with the data identified for use in the application. To facilitate this, the application creator tool may provide via a GUI a menu of possible components for a user to add to an application. To illustrate one example of such a menu, FIG. 15 depicts an example menu 1500. Via this menu, for instance, a user may select one or more of the available components to provide the application creator tool with an indication of what the application should do with the data identified for use in the application.

Depending on the implementation, selection of one or more of these application components may cause the application creator tool to establish the program code that defines configuration, visual appearance, and functionality associated with the selected application components. For instance, the application creator tool may retrieve from core data store system 308 a default set of program code that defines a default configuration, visual appearance, and/or functionality of a specific application component. The application creation tool may then modify some or all of this retrieved default program code to customize the configuration, visual appearance, and functionality of the application element based on user inputs received via the application creator tool. The application creator tool may then associate this established program code with the new application being created or otherwise assemble this established program code into a package that defines the new application being created, and this package may be stored in core data store module 308. In some implementations, any modifications made to some or all of the retrieved default program code can be thought of as a "delta," or difference, between the default implementation and the tenant-specific or user-customized version. The delta, or difference, may be stored separately by the application creator tool in the core data store module 308.

As one possible application component, for instance, the application creator tool may provide through the menu 1500 a channel viewer component 1502. Using a channel-viewer component in an application may enable the application to provide an indication of the current and/or historical values of a data channel. Such an indication can take on any form, including a numeric form, an analog form, a graphical form, and a tabular form, among other possibilities.

As another possibility, the application creator tool may provide through the menu a history map component 1504. Using a history map component in an application may enable the front—and application to present a map depicting historical locations of an asset (such as a delivery truck) over time.

As another possibility, the application creator tool may provide through the menu a form builder component 1506 to establish certain forms for use in an application. Using forms in an application may enable the front—and application to receive user input via the forms. This may further enable applications to allow users to edit certain information in the platform 300, such as aspects of the tenant's schema, among other possibilities.

As another possibility, the application creator tool may provide through the menu an insight viewer component 1508. Using an insight viewer component in an application may enable the application to present insights that are produced by the data science platform 300. For instance, for insights produced by an event prediction data science model, an insight viewer may enable an application to present an indication of a prediction of the event occurrence. As indicated above, such predictions make take the form of (i) a metric reflecting a likelihood that an event occurrence is forthcoming, (ii) a binary indication of whether or not the model has predicted that an event occurrence is forthcoming, (iii) an indicator that reflects an affirmative prediction of the event occurrence to be forthcoming, (iv) a categorization of a predicted event occurrence, or (v) a "recommended operating mode" for an asset, among other possibilities.

As another possibility, the application creator tool may provide through the menu a link component 1510. Using a link component in an application may enable the application to provide a link that, when selected by a user may navigate from one application to another application. Those skilled in the art will realize that other application creation tools that allow for the creation of applications having other components are possible as well.

Examples of applications that may be created by the application creator tool may include a dashboard that includes one or more widgets or modules that represent asset-related data in visual form (such as through the use of a graph, table, roll-up chart, etc.), a performance management application, a service optimization application, and/or an asset dealer operations application, among other possibilities.

Another tool that may be provided by the application service module may be a model performance tool. The model performance tool may be used to analyze the performance of the platform's deployed data science models, including identifying what data science models have been deployed by the platform 300, determining how many insights the data analytics module 310 has derived based on the outputs of each deployed data science model, determining the effectiveness of those insights as determined by user interactions with them, and determining the statistical performance of a model by calculating one or more orthodox model measurement metrics (e.g., F1, Precision, Recall for classification tasks, RMSE, MAE, or MAPE for regression tasks, among other possibilities) against some target space. The model performance tool may be configured to present such information in one or ways via GUI.

VI. CONCLUSION

One of ordinary skill in the art will appreciate that the example platform shown in FIGS. 2-3 is but one example of a simplified representation of the structural components and/or functional modules that may be included in a platform, and that numerous others are also possible. For instance, other platforms may include structural components and/or functional modules not pictured and/or more or less of the pictured structural components and/or functional modules. Moreover, a given platform may include multiple, individual platforms that are operated in concert to perform the operations of the given platform. Other examples are also possible.

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans", "operators", "users" or other entities, this is for purposes of example and explanation only. The claims should not be construed as requiring action by such actors unless explicitly recited in the claim language.

What is claimed is:
1. A computing system comprising:
a communication interface;
at least one processor;
a non-transitory computer-readable medium; and
program instructions stored on the non-transitory computer-readable medium that are executable by the at least one processor to cause the computing system to perform functions comprising:
receiving, from a first client station associated with an entity that is involved in managing assets, connection information that facilitates connection to a data source;
establishing, based on the connection information, a connection to the data source and ingesting from the data source asset-related data;
storing the ingested asset-related data in a first data store location;
receiving, from a second client station associated with the entity, pipeline configuration information that indicates (i) one or more transformations to apply to portions of the ingested asset-related data and (ii) a sink component that is associated with a second data store location, wherein the second data store location is different than the first data store location, and wherein the pipeline configuration information comprises an indication of a user selection of the sink component from a pool of available sink components comprising one or more readings sinks and a non-readings sink, and wherein the pipeline configuration information indicates for each given sink component of the pool of available sink components a pipeline and a corresponding type of asset-related data to come through the pipeline into the given sink component;
deploying, based on the pipeline configuration information, at least one pipeline that operates to (i) retrieve, from the first data store location, a portion of the asset-related data, (ii) apply, to the portion of the asset-related data, the one or more transformations, thereby resulting in transformed asset-related data, and (iii) store the transformed asset-related data in the second data store location;
receiving, from a third client station associated with the entity, data science model configuration information including (i) an indication of a type of data science model to be created, (ii) an indication of a set of asset-related data to use as training data for the data science model to be created, and (iii) an indication of a portion of the transformed asset-related data stored in the second data store location to use as inputs for the data science model to be created;
based on the data science model configuration information, applying a set of one or more machine learning techniques to create a new data science model;
receiving, from a fourth client station associated with the entity, application configuration information that defines one or more ways to visually render asset-related data;
executing the created data science model by using the indicated portion of the transformed asset-related data stored in the second data store location as inputs to the data science model; and causing at least of portion of an output of the data science model to be rendered according to the application configuration information.

2. The computing system of claim 1, wherein the transformed asset-related data is readings data, and wherein the sink component is a readings sink.

3. The computing system of claim 1, wherein the transformed asset-related data is non-readings data, and wherein the sink component is the non-readings sink.

4. The computing system of claim 1, further comprising program instructions that are executable by the at least one processor to cause the computing platform to perform functions comprising:
   causing the first client station associated with the entity to present a first interface for creating and deploying connections for ingesting the entity's asset-related data;
   causing the second client station associated with the entity to present a second interface for creating and deploying pipelines for transforming the entity's asset-related data into a desired format; and
   causing the third client station associated with the entity to present a third interface for creating and deploying data science models for analyzing the entity's asset-related data.

5. The computing system of claim 4, further comprising program instructions that are executable by the at least one processor to cause the computing platform to perform functions comprising:
   causing the first client station to present indications of a plurality of predefined connections, wherein receiving the connection information that facilitates connection to the data source comprises receiving an indication of a user selection of one or more predefined connections from the plurality of predefined connections.

6. The computing system of claim 4, further comprising program instructions that are executable by the at least one processor to cause the computing platform to perform functions comprising:
   causing the second client station to present indications of a plurality of predefined pipelines, wherein receiving the pipeline configuration information comprises receiving an indication of a user selection of one or more predefined pipelines from the plurality of predefined pipelines.

7. The computing system of claim 4, further comprising program instructions that are executable by the at least one processor to cause the computing platform to perform functions comprising:
   causing the third client station to present indications of a plurality of predefined model parameters each associated with one or more types of data science models being created, wherein receiving the data science model configuration information comprises receiving an indication of a user selection of one or more predefined model parameters from the plurality of predefined model parameters.

8. The computing system of claim 4, further comprising program instructions that are executable by the at least one processor to cause the computing platform to perform functions comprising:
   causing the fourth client station associated with the entity to present a fourth interface for creating and deploying applications for presenting the entity's asset-related data and insights derived therefrom; and
   storing a plurality of predefined application creation packages in a non-readings data store associated with the non-readings sink.

9. The computing system of claim 1, wherein at least two of the first, second, third, and fourth client stations are a same client station.

10. The computing system of claim 1, wherein the transformed asset-related data comprises readings data and the second data store location is a readings data store, and wherein the computing system further comprises program instructions that are executable by the at least one processor to cause the computing platform to perform functions comprising:
    storing, in a non-readings data store, information related to the readings data; and
    during an intake process of the readings data, sampling the readings data using the stored information that is related to the readings data and stored in the non-readings data store.

11. The computing system of claim 1, wherein the transformed asset-related data is readings data and the second data store location is a readings data store, and wherein the computing system further comprises program instructions that are executable by the at least one processor to cause the computing platform to perform functions comprising:
    obtaining, from a non-readings data store, information identifying where in the readings data store the readings data is located; and
    utilizing the obtained information to engage in a read operation of the readings data store.

12. A method performed by a computing system, the method comprising:
    receiving, from a first client station associated with an entity that is involved in managing assets, connection information that facilitates connection to a data source;
    establishing, based on the connection information, a connection to the data source and ingesting from the data source asset-related data;
    storing the ingested asset-related data in a first data store location;
    receiving, from a second client station associated with the entity, pipeline configuration information that indicates (i) one or more transformations to apply to portions of the ingested asset-related data and (ii) a sink component that is associated with a second data store location, wherein the second data store location is different than the first data store location, and wherein the pipeline configuration information comprises an indication of a user selection of the sink component from a pool of available sink components comprising one or more readings sinks and a non-readings sink, and wherein the pipeline configuration information indicates for each given sink component of the pool of available sink components a pipeline and a corresponding type of asset-related data to come through the pipeline into the given sink component;
    deploying, based on the pipeline configuration information, at least one pipeline that operates to (i) retrieve, from the first data store location, a portion of the asset-related data, (ii) apply, to the portion of the asset-related data, the one or more transformations, thereby resulting in transformed asset-related data, and (iii) store the transformed asset-related data in the second data store location;
    receiving, from a third client station associated with the entity, information including (i) an indication of a type of data science model to be created, (ii) an indication of a set of asset-related data to use as training data for the data science model to be created, and (iii) an indication of a portion of the transformed asset-related data stored in the second data store location to use as inputs for the data science model to be created;

based on the data science model configuration information, applying a set of one or more machine learning techniques to create a new data science model;

receiving, from a fourth client station associated with the entity, application configuration information that defines one or more ways to visually render asset-related data;

executing the created data science model by using the indicated portion of the transformed asset-related data stored in the second data store location as inputs to the data science model; and causing at least of portion of an output of the data science model to be rendered according to the application configuration information.

13. The method of claim 12, wherein the transformed asset-related data is readings data, and wherein the sink component is a readings sink.

14. The method of claim 12, wherein the transformed asset-related data is non-readings data, and wherein the sink component is the non-readings sink.

15. The method of claim 12, further comprising:
causing the first client station associated with the entity to present a first interface for creating and deploying connections for ingesting the entity's asset-related data;
causing the second client station associated with the entity to present a second interface for creating and deploying pipelines for transforming the entity's asset-related data into a desired format; and
causing the third client station associated with the entity to present a third interface for creating and deploying data science models for analyzing the entity's asset-related data.

16. The method of claim 15, further comprising:
causing the first client station to present indications of a plurality of predefined connections, wherein receiving the connection information that facilitates connection to the data source comprises receiving an indication of a user selection of one or more predefined connections from the plurality of predefined connections.

17. The method of claim 15, further comprising:
causing the second client station to present indications of a plurality of predefined pipelines, wherein receiving the pipeline configuration information comprises receiving an indication of a user selection of one or more predefined pipelines from the plurality of predefined pipelines.

18. The method of claim 15, further comprising:
causing the third client station to present indications of a plurality of predefined model parameters each associated with one or more types of data science models being created, wherein receiving the data science model configuration information comprises receiving an indication of a user selection of one or more predefined model parameters from the plurality of predefined model parameters.

19. A non-transitory computer-readable storage medium having program instructions stored thereon that are executable to cause a computing system to:
receive, from a first client station associated with an entity that is involved in managing assets, connection information that facilitates connection to a data source;
establish, based on the connection information, a connection to the data source and ingest from the data source asset-related data;
store the ingested asset-related data in a first data store location;
receive, from a second client station associated with the entity, pipeline configuration information that indicates (i) one or more transformations to apply to portions of the ingested asset-related data and (ii) a sink component that is associated with a second data store location, wherein the second data store location is different than the first data store location, and wherein the pipeline configuration information comprises an indication of a user selection of the sink component from a pool of available sink components comprising one or more readings sinks and a non-readings sink, and wherein the pipeline configuration information indicates for each given sink component of the pool of available sink components a pipeline and a corresponding type of asset-related data to come through the pipeline into the given sink component;
deploy, based on the pipeline configuration information, at least one pipeline that operates to (i) retrieve, from the first data store location, a portion of the asset-related data, (ii) apply, to the portion of the asset-related data, the one or more transformations, thereby resulting in transformed asset-related data, and (iii) store the transformed asset-related data in the second data store location;
receive, from a third client station associated with the entity, information including (i) an indication of a type of data science model to be created, (ii) an indication of a set of asset-related data to use as training data for the data science model to be created, and (iii) an indication of a portion of the transformed asset-related data stored in the second data store location to use as inputs for the data science model to be created;
based on the data science model configuration information, apply a set of one or more machine learning techniques to create a new data science model;
receive, from a fourth client station associated with the entity, application configuration information that defines one or more ways to visually render asset-related data;
execute the created data science model by using the indicated portion of the transformed asset-related data stored in the second data store location as inputs to the data science model; and
cause at least of portion of an output of the data science model to be rendered according to the application configuration information.

20. The non-transitory computer-readable storage medium of claim 19, wherein the program instructions are further executable to cause a computing system to:
cause the first client station associated with the entity to present a first interface for creating and deploying connections for ingesting the entity's asset-related data;
cause the second client station associated with the entity to present a second interface for creating and deploying pipelines for transforming the entity's asset-related data into a desired format; and
cause the third client station associated with the entity to present a third interface for creating and deploying data science models for analyzing the entity's asset-related data.

* * * * *